(12) United States Patent
Geyser et al.

(10) Patent No.: US 12,682,537 B2
(45) Date of Patent: Jul. 14, 2026

(54) THREE-DIMENSIONAL AVATAR GENERATION SYSTEM

(71) Applicant: 2wai Inc., Bal Harbour, FL (US)

(72) Inventors: Russell Geyser, Los Angeles, CA (US); Alex Finden, Encinitas, CA (US); Mason Geyser, West Hills, CA (US); Jonathan Knapper, Aberdeen (GB); James Robert Pyers, New River, AZ (US); Gary Shoefield, Beverly Hills, CA (US); Calum David Webster Worthy, Victoria (CA)

(73) Assignee: 2wai Inc., Bal Harbour, FL (US)

( * ) Notice: Subject to any disclaimer, the term of this patent is extended or adjusted under 35 U.S.C. 154(b) by 0 days.

(21) Appl. No.: 19/319,128

(22) Filed: Sep. 4, 2025

(65) Prior Publication Data

US 2026/0065567 A1     Mar. 5, 2026

Related U.S. Application Data

(60) Provisional application No. 63/804,974, filed on May 13, 2025, provisional application No. 63/690,372, filed on Sep. 4, 2024.

(51) Int. Cl.
*G06T 13/40*     (2011.01)
*G06T 13/20*     (2011.01)
     (Continued)

(52) U.S. Cl.
CPC ............ *G06T 13/40* (2013.01); *G06T 13/205* (2013.01); *G06V 10/82* (2022.01); *G06V 40/174* (2022.01);
     (Continued)

(58) Field of Classification Search
CPC ....... G06T 13/205; G06T 13/40; G06V 10/82; G06V 40/174; G06V 40/20; H04L 9/50; H04L 2209/608
See application file for complete search history.

(56) References Cited

U.S. PATENT DOCUMENTS 8,423,366 B1 * 4/2013 Foster ..................... G10L 13/06
                                                              704/266
2011/0066860 A1 * 3/2011 Dettinger .............. H04L 67/131
                                                              713/176
(Continued)

FOREIGN PATENT DOCUMENTS

WO     2019217531 A1     11/2019

OTHER PUBLICATIONS

International Search Report and Written Opinion for Application No. PCT/US2025/044887, mailed on Dec. 16, 2025, 12 pages.
(Continued)

*Primary Examiner* — Daniel F Hajnik
*Assistant Examiner* — Jed-Justin Imperial
(74) *Attorney, Agent, or Firm* — DLA Piper LLP (US)

(57)     ABSTRACT

A computing system receives video data and non-video data from a user device for generation of an avatar corresponding to a user of the user device. The computing system generates an avatar reflective of the appearance and the behavior of the user by inputting the video data and non-video data to a generative machine learning model trained to generate highly realistic avatars for users. The avatar may look, behave, sound, and interact like the user. The video data is pre-processed to remove background information from the video data and isolate the user within the video data. The computing system clones a voice of the user for use with the avatar. The computing system stores the avatar and the cloned voice of the user in a network accessible location. The computing system deploys the avatar in a third-party
(Continued)

application for real-time or near real-time interaction with a second user.

22 Claims, 46 Drawing Sheets

(51) Int. Cl.
| | |
|---|---|
| *G06V 10/82* | (2022.01) |
| *G06V 40/16* | (2022.01) |
| *G06V 40/20* | (2022.01) |
| *H04L 9/00* | (2022.01) |

(52) U.S. Cl.
CPC ................ *G06V 40/20* (2022.01); *H04L 9/50* (2022.05); *H04L 2209/608* (2013.01)

(56) References Cited

U.S. PATENT DOCUMENTS

| | | | | |
|---|---|---|---|---|
| 2020/0202597 | A1* | 6/2020 | Stokking | ............... G06T 19/003 |
| 2021/0027759 | A1 | 1/2021 | Ogawa et al. | |
| 2022/0384027 | A1* | 12/2022 | Kaleal, III | ............... A61B 5/11 |
| 2023/0009304 | A1 | 1/2023 | Jakobsson et al. | |
| 2023/0090253 | A1* | 3/2023 | Meadows | ............... H04L 67/12 |
| | | | | 345/419 |
| 2023/0418365 | A1 | 12/2023 | Alexander et al. | |
| 2024/0212248 | A1* | 6/2024 | Vendrow | ................. G10L 17/22 |
| 2024/0273793 | A1 | 8/2024 | DeCharms | |
| 2024/0362968 | A1* | 10/2024 | Lyons | .................... G06N 20/00 |
| 2024/0420084 | A1* | 12/2024 | Rakshit | .................. G06Q 50/01 |

OTHER PUBLICATIONS

International Search Report and Written Opinion for Application No. PCT/US2025/044874, mailed on Nov. 21, 2025, 9 pages.
International Search Report and Written Opinion for Application No. PCT/US2025/044878, mailed on Nov. 24, 2025, 10 pages.

* cited by examiner

500

Begin

Receive a prompt from a secondary user device — 502

Generate a response based on the received prompt — 504

Generate instructions for animating the avatar based on the response by the large language model — 506

Cause the avatar to respond to the prompt based on the generated instructions — 508

End

600

Customization Tool 144

Data Ingestion Tool 702

Content Ingestion Engine 720

Text Pre-Processing Engine 722

Multimodal Processing Engine 724

Contextual Filtering Engine 726

LLM Generation Engine 704

License Free Model Optimization Engine 706

Fine Tuning Engine 708

Ethics and Bias Reduction Engine 710

Deployment Engine 712

Policy Engine 714

Data Ownership Module 716

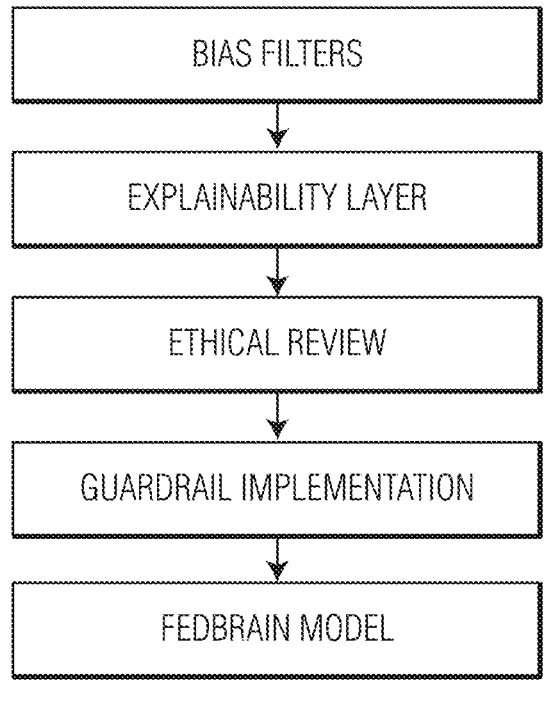

```
┌─────────────────────────────┐
│         BIAS FILTERS        │
└─────────────────────────────┘
              │
              ▼
┌─────────────────────────────┐
│     EXPLAINABILITY LAYER    │
└─────────────────────────────┘
              │
              ▼
┌─────────────────────────────┐
│        ETHICAL REVIEW       │
└─────────────────────────────┘
              │
              ▼
┌─────────────────────────────┐
│   GUARDRAIL IMPLEMENTATION   │
└─────────────────────────────┘
              │
              ▼
┌─────────────────────────────┐
│        FEDBRAIN MODEL       │
└─────────────────────────────┘
```

FIG. 8E

```
                    ┌─────────────────────┐
        ┌───────────│    MODEL EXPORT     │───────────┐
        │           └─────────────────────┘           │
        │                     │                        │
        ▼                     ▼                        ▼
┌────────────────┐  ┌────────────────────┐  ┌────────────────────┐
│CLOUD INTEGRATION│  │  EDGE INTEGRATION  │  │ AVATAR INTEGRATION │
│    SERVICES     │  │     DEPLOYMENT     │  │       SYSTEM       │
└────────────────┘  └────────────────────┘  └────────────────────┘
        │                     │                        │
        │                     ▼                        │
        │           ┌────────────────────┐             │
        └──────────▶│ INTEGRATION INTERFACE│◀───────────┘
                    └────────────────────┘
```

FIG. 8F

TEXT TO VOICE

VOICE MODELING

PROSODY CONTROL

ACCENT PERSONALIZATION

VOICE SYNTHESIS

AUDIO DELIVERY

USER REACTION

QUALITY FEEDBACK

MACHINE LEARNING

PERFORMANCE METRICS

CONTINUOUS TRAINING

KNOWLEDGE EXPANSION

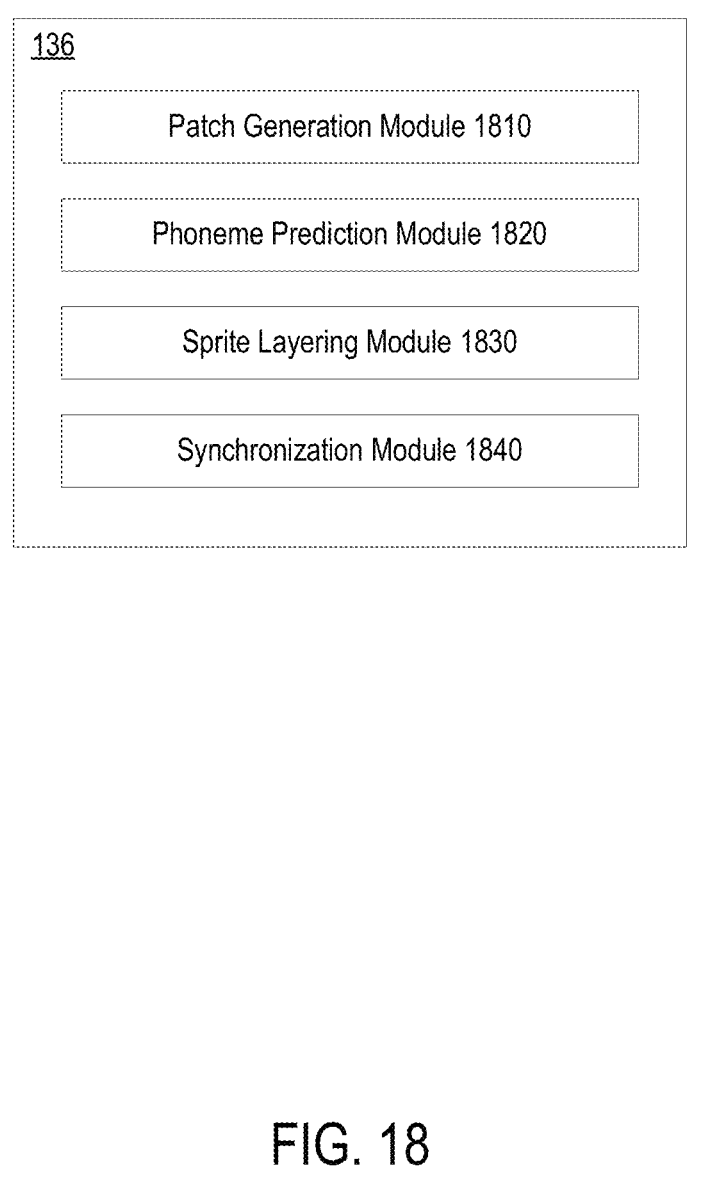

136

Patch Generation Module 1810

Phoneme Prediction Module 1820

Sprite Layering Module 1830

Synchronization Module 1840

FIG. 18

THREE-DIMENSIONAL AVATAR GENERATION SYSTEM

CROSS-REFERENCE TO RELATED APPLICATIONS

This application claims priority to U.S. Provisional Application No. 63/804,974, filed on May 13, 2025, and U.S. Provisional Application No. 63/690,372, filed on Sep. 4, 2024, which are incorporated by reference in their entirety.

FIELD OF DISCLOSURE

The present disclosure generally relates to a system and method of generating a three-dimensional avatar and facilitating a communication session with the three-dimensional avatar.

BACKGROUND

Avatars broadly refer to a digital representation of a graphical representation of a user that can be deployed or used in a virtual environment. Avatars can take the form of a cartoon representation of a user or, in some circumstances, a hyper realistic virtual representation of the user.

SUMMARY

In some embodiments, a method is provided. A computing system receives video data and non-video data from a user device for generation of an avatar corresponding to a user of the user device. The video data includes a video of the user of the user device. The non-video data includes information associated with a desired appearance and behavior of the avatar. The computing system generates an avatar reflective of the appearance and the behavior of the user by inputting the video data and non-video data to a generative machine learning model trained to generate highly realistic avatars for users, wherein the avatar looks, behaves, sounds, and interacts like the user. The video data may be preprocessed to remove background information from the video data and isolate the user within the video data. The computing system clones a voice of the user for use with the avatar. The cloning may include extracting audio data from the video data and generating a synthetic voice for the avatar using a model trained on voice characteristics of the user. The speech output of the avatar may match one or more of a tone, pace, inflection, or accent of the user. The computing system stores the avatar and the cloned voice of the user in a network accessible location. The computing system deploys the avatar in a third-party application for real-time or near real-time interaction with a second user. The responses of the avatar may be generated using a large language model and are delivered with synchronized lip movements generated by a lip sync module based on learned speech patterns of the user.

In some embodiments, a system is provided. The system may include a non-transitory storage medium storing computer program instructions and a processor configured to execute the computer program instructions to cause operations. A computing system receives video data and non-video data from a user device for generation of an avatar corresponding to a user of the user device. The video data includes a video of the user of the user device. The non-video data includes information associated with a desired appearance and behavior of the avatar. The computing system generates an avatar reflective of the appearance and the behavior of the user by inputting the video data and non-video data to a generative machine learning model trained to generate highly realistic avatars for users, wherein the avatar looks, behaves, sounds, and interacts like the user. The video data may be preprocessed to remove background information from the video data and isolate the user within the video data. The computing system clones a voice of the user for use with the avatar. The cloning may include extracting audio data from the video data and generating a synthetic voice for the avatar using a model trained on voice characteristics of the user. The speech output of the avatar may match one or more of a tone, pace, inflection, or accent of the user. The computing system stores the avatar and the cloned voice of the user in a network accessible location. The computing system deploys the avatar in a third-party application for real-time or near real-time interaction with a second user. The responses of the avatar may be generated using a large language model and are delivered with synchronized lip movements generated by a lip sync module based on learned speech patterns of the user.

In some embodiments, a non-transitory storage medium storing computer program instructions is provided. The computer program instructions when executed may cause a computing system to perform operations. A computing system receives video data and non-video data from a user device for generation of an avatar corresponding to a user of the user device. The video data includes a video of the user of the user device. The non-video data includes information associated with a desired appearance and behavior of the avatar. The computing system generates an avatar reflective of the appearance and the behavior of the user by inputting the video data and non-video data to a generative machine learning model trained to generate highly realistic avatars for users, wherein the avatar looks, behaves, sounds, and interacts like the user. The video data may be preprocessed to remove background information from the video data and isolate the user within the video data. The computing system clones a voice of the user for use with the avatar. The cloning may include extracting audio data from the video data and generating a synthetic voice for the avatar using a model trained on voice characteristics of the user. The speech output of the avatar may match one or more of a tone, pace, inflection, or accent of the user. The computing system stores the avatar and the cloned voice of the user in a network accessible location. The computing system deploys the avatar in a third-party application for real-time or near real-time interaction with a second user. The responses of the avatar may be generated using a large language model and are delivered with synchronized lip movements generated by a lip sync module based on learned speech patterns of the user.

BRIEF DESCRIPTION OF THE DRAWINGS

The accompanying drawings, which are incorporated herein and form part of the specification, illustrate the present disclosure and, together with the description, further serve to explain the principles of the present disclosure and to enable a person skilled in the relevant art(s) to make and use embodiments described herein.

FIGS. 8A-8H illustrate exemplary workflows performed by customization tool, according to example embodiments.

FIG. 18 is a block diagram illustrating lip-sync module, according to example embodiments.

Figure 1:
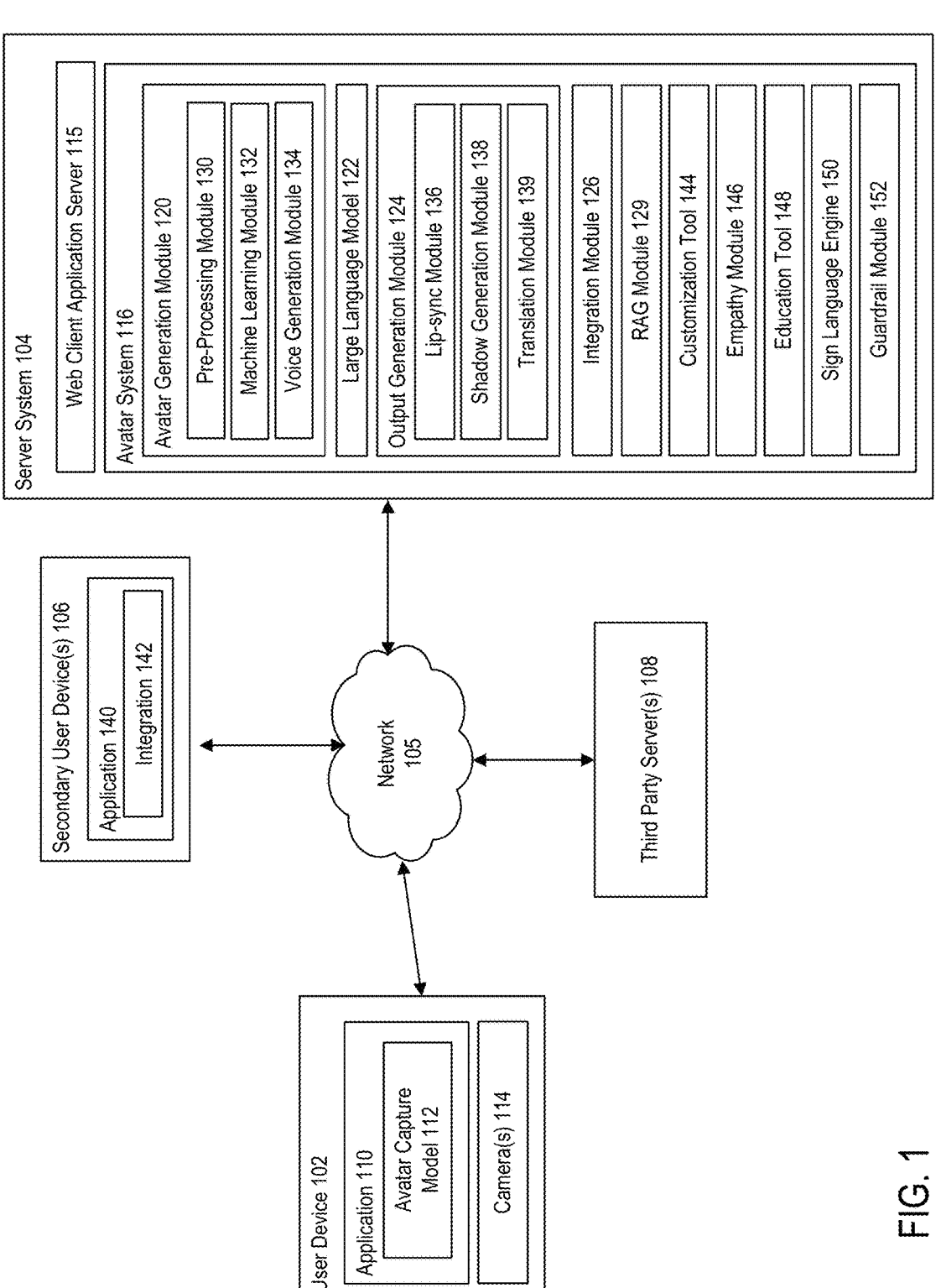
FIG. 1 is a block diagram illustrating a computing environment, according to example embodiments.

The features of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

Hyper realistic avatars that are nearly indistinguishable from their associated users are no longer a technology of the future. Currently, there are various entities that generate and deploy hyper realistic avatars that look, sound, and feel like their human counterparts. Although this avatar technology exists, it currently suffers in two aspects. First, the current state of this technology is limited to merely reproducing a script that was uploaded or pre-generated by the human counterpart or an operator with control over the avatar. As a result, current hyper realistic avatars are limited in their use case and are unable to act as a stand-in for users in contexts beyond those that are trivial. Second, the current state of this technology is not scalable. The processing specifications required to generate and host hyper realistic avatars typically require the use of sophisticated computer technology that is inaccessible to the masses. Further, current hyper realistic avatars require input from high-definition cameras that capture the human counterpart at a variety of angles, which typically requires the human counterpart to visit a studio for this data generation. Thus, the current state of technology surrounding hyper realistic avatars is only available to a select few.

One or more techniques disclosed herein improve upon the current state of hyper realistic avatar technology by providing a solution to the foregoing limitations. For example, one or more techniques disclosed herein forego pre-generated or canned responses in favor of a hyper realistic avatar that can communicate with other users as if the human counterpart was present. The present disclosure achieves this functionality through a combination of large language model technology and lip-sync technology such that responses to questions can be generated in real-time or near real-time and surfaced to users through the avatar themselves. Further, one or more techniques disclosed herein address the scalability limitations currently present by allowing users to record videos of themselves using technology as simple as their own mobile devices, such as a smartphone. Through the use of various generative machine learning models, the present approach can generate a hyper realistic avatar with a simple video input that can be stored and replicated for various use cases, such as integration with third party systems. In this manner, the current disclosure provides an avatar generation system that will be highly accessible to end users.

Furthermore, existing language translation tools, such as Google Translate or Microsoft Translator, offer textual or robotic audio output, which lacks realism, personalization, and nonverbal context. Real-time interpreters are costly and limited in availability. While artificial intelligence (AI) assistants exist, they do not combine speech-to-speech translation with emotionally intelligent holographic presentation, lip-syncing, or gesture replication. Current avatar systems lack personalization and secure ownership transfer mechanisms.

To account for this gap in technology, one or more techniques disclosed herein may enable users to create AI-powered holographic avatars that function as real-time multilingual interpreters. These avatars may receive speech input, translate it using NLP models, and then present the translated message using realistic lip-syncing, facial expressions, and body gestures. The avatars may be user-generated and customized, securely linked to verified identities using blockchain protocols. The present disclosure may support both live and pre-recorded interaction modes across AR, VR, and enterprise communication systems.

With the increasing demand for domain-specific AI solutions, there remains a significant barrier for creators and consumers to generate custom large language models without substantial technical expertise, infrastructure, or licensing complications. Current solutions offered by large technology firms typically require centralized resources, proprietary licenses, and involve complex processes that are inaccessible to the average user. To account for the technical deficiencies in the field, one or more techniques described herein may include a simplified and automated framework to generate large language models (LLMs), which may enable users to ingest large volumes of domain-specific structured and unstructured data. Exemplary structured and unstructured data may include, for example, but is not limited to religious texts, literature, proprietary documents, and media content. The one or more techniques disclosed herein may rely upon a modular and privacy-preserving architecture that processes the data to produce personalized, license-free LLMs deployable on standard consumer hardware; thus, providing a solution to the conventional approach of developing LLMs.

Typical AI systems receive a prompt and generate a response based on the data they were trained on. These AI systems may be asked to respond in certain ways but may not be limited in accessing all the data available to them. To account for this gap in technology, one or more techniques disclosed herein may enable users to restrict access to certain data on which the AI system has been trained in order to dynamically customize the AI system. Thus, the same AI system may be configured to act as a custom LLM for several domains and may be dynamically reassigned to different domains.

Furthermore, existing AI chatbots and voice assistants are primarily transactional and lack emotional depth, long-term memory, and the capacity for emotionally resonant engagement. Systems such as Replika or Woebot offer digital companionship, but do not operate in immersive, expressive environments or use holographic representations with adaptive memory and multimodal empathy. Elder care robots and voice assistants provide reminders and basic interaction, but do not simulate emotionally intelligent companionship or therapeutic support.

To account for this gap in technology, one or more techniques disclosed herein may enable an AI generated avatar to function as an empathic companion. For example, one or more techniques disclosed herein may rely upon emotional intelligence, adaptive memory, and multimodal sensing (voice, facial expression, language) to provide ongoing mental health support, companionship, and behaviorally aware guidance. The avatar may be configured to remember previous interactions, recognize emotional cues in voice and facial expressions, and tailor its behavior accordingly. Such functionalities are particularly useful for daily mood tracking, elderly wellness support, and grief or stress assistance.

One use case for this technology may be in the context of education. Traditional e-learning platforms often lack adaptability, emotional intelligence, and engaging interfaces. Many existing solutions rely on pre-scripted content that does not adjust to a learner's pace, style, or mood. AI tutoring systems like ChatGPT or Duolingo are not embodied, and VR tools do not personalize in real time.

To account for this gap in technology, one or more techniques disclosed herein may provide an AI-powered holographic tutor that delivers one-on-one adaptive instruction. The tutor may integrate emotion recognition, real-time NLP, user feedback, and dynamic lesson customization into a visual, interactive avatar. This system may be suitable for K-12, higher education, corporate training, and language learning. The avatar may be configured to adapt teaching methods based on student responses, behavior, and progress.

One use case for this technology may be in the context of hearing-impaired individuals. Current solutions for bridging communication between hearing-impaired and hearing-abled individuals are limited in scalability, expressiveness, and accessibility. Text captioning systems fail to capture the grammar, emotion, and nuance of sign languages. Existing sign recognition tools do not offer real-time holographic output or bidirectional translation. Professional interpreters are effective but not always available.

To account for this gap in technology, one or more techniques disclosed herein may provide a bidirectional communication interface using a realistic, expressive holographic avatar that can interpret spoken language into sign language and vice versa. The system may use AI-driven voice recognition, gesture synthesis, and sign language datasets to animate a holographic avatar. The system may support emotional expression through facial animation and may be tailored for use in public spaces, education, healthcare, and media.

One use-case for this technology may be in the context of celebrities. For example, through one or more techniques disclosed herein, celebrities may be able to create a hyper realistic digital avatar that mimics the behavior and characteristics of the underlying celebrity. In this manner, a celebrity may deploy their digital avatar as a stand-in for themselves. Further, based on the scalability of the system, the celebrity may be able to generate multiple copies of their hyper realistic avatar, such that the celebrity could effectively be in multiple places at a given time. Through the techniques described below, celebrities may be able to record the input video to generate the hyper realistic avatar in the comfort of their homes, without being required to visit a studio, thus increasing the likelihood of engagement.

Techniques disclosed herein described with respect to cloud-based environments can be performed on, in, or by edge components. For example, a module that exists in or on a cloud-based environment can exist in or on an edge device. Accordingly, functionality described herein as being performed in a cloud environment can also be performed in an edge environment separately or in conjunction with the cloud environment.

FIG. 1 is a block diagram illustrating a computing environment 100, according to example embodiments. Computing environment 100 may include user device 102, server system 104, and secondary user device(s) 106 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate that one or more of these types of connections be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be the Internet, a private data network, virtual private network using a public network and/or other suitable connection(s) that enables components in computing environment 100 to send and receive information between the components of computing environment 100.

User device 102 may be operated by a user, such as, for example, a user associated with an organization. User device 102 may be representative of a mobile device, a tablet, a desktop computer, or any computing system having the capabilities described herein. User device 102 may include an application 110 executing thereon. Application 110 may be representative of an application associated with server system 104. For example, application 110 may be representative of an application that generates a three-dimensional avatar of an individual, such as the user of user device 102, and allows the user to manage use of the three-dimensional avatar. In some embodiments, application 110 may be a standalone application associated with server system 104, such as a mobile application, tablet application, desktop application, or, more generally, a software application affiliated with an entity associated with server system 104. In some embodiments, application 110 may be representative of a web browser configured to communicate with server system 104, such that an end user may gain access to avatar system 116 of server system 104 via a web browser. More generally, application 110 may be configured to provide an interface between user device 102 and server system 104 for the purpose of allowing a user to access functionality of the avatar system 116 of server system 104. Via application 110, a user can create an account with avatar system 116, which may allow the end user to create and manage a three-dimensional avatar that looks, behaves, sounds, and interacts, like the user.

Application 110 may include avatar capture module 112. Avatar capture module 112 may include one or more software modules. The one or more software modules may be collections of code, or instructions stored on a media (e.g., memory of user device 102) that represent a series of machine instructions (e.g., program code) that implements one or more algorithmic steps. The machine instructions may be the actual computer code the processor of user device 102 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions. Avatar capture module 112 may be configured to interface with one or more cameras 114 of user device 102 to capture a video of the user. In some embodiments, avatar capture module 112 may provide real-time or near real-time instructions to the user for capturing a high-quality video of themselves for the purpose of generating a three-dimensional avatar that looks like the user. In some embodiments, avatar capture module 112 may be configured to capture a video of the user that is minimal length (e.g., three minutes). In some embodiments, avatar capture module 112 may prompt the user to perform one or more movements while recording the video of themselves. For example, avatar capture module 112 may prompt the user to turn their heads or bodies, raise their arms or hands, and the like. In some embodiments, avatar capture module 112 may prompt the user to speak to the camera, such that avatar capture module 112 can capture the sound of the user's voice, as well as the manner in which the user moves their lips or emotes while speaking.

In some embodiments, during the avatar creation process, application 110 may further prompt the user to provide non-video input for the creation of their avatar. For example, application 110 may prompt the end user to answer a series of questions that can be used to train an artificial intelligence system to interact with other users in a manner consistent with the user's actual interactions.

In some embodiments, the questions the user is prompted with during the avatar generation may be highly industry-dependent and tailored to the specific application. For example, for dating applications, the questions may be related to one or more of the user's values and beliefs, personality traits, hobbies and interests, relationship preferences (e.g., casual, long-term), deal-breakers or non-negotiables, and/or life goals and aspirations. In another example, for industrial applications, the questions may be related to one or more of the intended commercial purpose of the avatar, preferred training methods for AI integration, customer support requirements, real-time database integration needs, emergency procedures and protocols, and/or logistics information (e.g., departure and arrival details). In another example, such as for social media applications, the questions may be related to one or more of personal background information, links to existing social media profiles, preferred data sources for avatar personality training, and/or privacy preferences and data sharing comfort levels.

In some embodiments, application 110 may further prompt the user to customize their avatar. For example, avatar capture module 112 may be configured to generate a local preview of their avatar such that an end user can customize the appearance and behavior of their avatar. In some embodiments, appearance customizations may include, but are not limited to, accurate representation of user's clothing from capture session, optional special effects for adding 3D clothing or accessories, product placement overlay capabilities for monetization, ad-funded content integration, and/or customizable 3D backgrounds reflecting user's preferences or environment. In some embodiments, behavior customizations may include, but are not limited to, memory capabilities (e.g., the ability to remember names and details of interactions), visual recognition (e.g., identifying people and objects via device camera), multilingual support (e.g., ability to communicate in multiple languages), personality adjustment (e.g., option to modify base answers shaping avatar's personality), and/or skill set expansion (e.g., ability to add or enhance specific capabilities based on user needs).

Server system 104 may be representative of one or more servers configured to communicate with one or more user devices, such as user device 102 and secondary user device 106. Server system 104 may include web client application server 115 and avatar system 116. Avatar system 116 may be configured to generate and manage avatars for end users.

As shown, avatar system 116 may include avatar generation module 120, large language model 122, output generation module 124, integration module 126, customization tool 144, empathy module 146, education tool 148, sign language engine 150, and/or guardrail module 152. Each of avatar generation module 120, large language model 122, output generation module 124, integration module 126, customization tool 144, empathy module 146, education tool 148, sign language engine 150, and/or guardrail module 152 may include one or more software modules. The one or more software modules may be collections of code, or instructions stored on a media (e.g., memory of server system 104) that represent a series of machine instructions (e.g., program code) that implements one or more algorithmic steps. The machine instructions may be the actual computer code which the processor of server system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Avatar generation module 120 may be configured to generate an avatar corresponding to an individual based on at least the captured video of the user. Avatar generation module 120 may include pre-processing module 130, machine learning module 132, and voice generation module 134.

Pre-processing module 130 may be configured to receive the video generated by avatar capture module 112 at user device 102. Pre-processing module 130 may include one or more algorithms for removing background information from the uploaded video. By removing the background information from the uploaded video, pre-processing module 130 may effectively isolate the user within the video, which may assist machine learning module 132 in generating an avatar corresponding to the user. In some embodiments, for example, the background removal algorithm may be a customized version of the Segment Anything Model (SAM) to extract the user from the background across every frame of the capture module video. This approach may provide high-quality segmentation and clean separation of the subject from the surrounding environment.

Pre-processing module 130 may be configured to receive audio via user device 102. Pre-processing module 130 may be configured to perform one or more preprocessing operations to the audio data, such as, but not limited to noise reduction, audio conditioning, speaker recognition, automatic speech recognition, language identification, text transcription, or transcription correction in order to properly understand the received audio.

Machine learning module 132 may be configured to generate an avatar of the user based at least on the uploaded video of the user. In some embodiments, machine learning module 132 may further be configured to generate the avatar of the user based on the non-video data provided by the user, such as, but not limited to, information associated with the appearance and/or behavior of their avatar. In operation, the video data and the non-video data may be provided to a machine learning model of machine learning module 132 to generate, as output, an avatar that looks, behaves, sounds, and interacts, like the user. In some embodiments, the machine learning model utilized by machine learning module 132 may be a generative-type model, such as, but not limited to a generative adversarial network (GAN). In some embodiments, the machine learning model utilized by machine learning module 132 may be representative of a generative diffusion model. In those embodiments in which GANs are used over other types of models, such as diffusion models, the benefit of doing so may be one of cost-effectiveness. For example, by using a GAN model, the approach may be significantly less expensive for ongoing generation and running of avatars compared to alternatives like diffusion models, although, as discussed above, diffusion models could alternatively be used. In some embodiments, Unreal Engine or Unity Engine may be used to generate stylized characters.

The machine learning model implemented by machine learning module 132 may be trained to generate avatars that are reflective of the look and behavior of their users based on a training process. In some embodiments, the training process is a supervised training process in which the machine learning model is trained to generate an avatar of a user based on a training data set that includes example videos of users and their corresponding avatars. Through this process, the machine learning model learns relationships between the input data (e.g., videos of users) and the output data (e.g., corresponding avatars). The training process may continue until the machine learning model reaches a threshold level of accuracy.

For GANs, the training process may be slightly different due to the underlying architecture of these types of models. For example, GANs typically include two networks: a generator network and a discriminator network. The generator network and the discriminator network undergo an adversarial process in which the generator attempts to generate output data that is accurate enough to trick the discriminator into thinking the output data from the generator is real data versus fake or generated data. During this process, the generator network is trained to generate more accurate outputs that may be capable of tricking the discriminator network into thinking the output is actual data. Further, the discriminator network may also be trained to better decipher between the artificially generated data and the real data. In the context of this particular use case, the generator network may be trained to generate avatars based on the input video data and the discriminator may be trained to determine whether the input received is a generated avatar or an actual video of the user.

As output from machine learning model, avatar generation module 120 may receive an avatar of a user that may be deployed and manipulated by components of avatar system 116 as described in further detail below.

Voice generation module 134 may be configured to analyze and clone the voice of the user from the video data. Voice generation module 134 may include one or more algorithms or machine learning models configured to receive, as input, the video data uploaded by the user and generate, as output, characteristics of the user's voice. In some embodiments, voice generation module 134 may not receive the entire video but may only receive the audio from the video, which was isolated by pre-processing module 130. In some embodiments, for example, voice generation module 134 may use the 11labs (11L) API for the voice generation process. In some embodiments, for example, voice generation module 134 may implement an open-source solution, such as, for example, the Coqui framework, for more customized voice synthesis. By identifying the characteristics of the user's voice, subsequent modules (described below) may create output for the avatar by applying the characteristics to conform the sound of the avatar's speech to that of the user.

Once generated, the user's avatar may be stored in a database or storage location associated with server system 104. In this manner, multiple copies of the user's avatar may be generated such that the user's avatar may be able to exist in multiple places at a given time, thus providing the effect of the physical user existing in multiple places at one time.

Output generation module 124 may be configured to generate output for the avatar based on one or more prompts received. For example, as discussed above, once the user's avatar is generated, the user's avatar may be deployed in various applications to essentially act as a stand-in for the user. Using a simple example, the user's avatar may act as a stand in for the user during a video conferencing session. As such, the user's avatar needs to be able to receive input from other individuals, understand the input, and generate an output that conforms to that of the user. Output generation module 124 may include various modules to assist with this process.

In some embodiments, output generation module 124 may generate a response to a prompt directed towards the avatar by interfacing with large language model 122. Large language model 122 may be representative of one or more large language models affiliated with server system 104 or external to server system 104 (e.g., ChatGPT, Claude, Llama, etc.). In operation, output generation module 124 may receive a prompt directed to the avatar. In some embodiments, the prompt may be a voice prompt. In the case that the prompt is a voice prompt, output generation module 124 may convert the audio into a text-based format and may provide the text of the audio to large language model 122 for a response generation. For example, the text of the audio may act as the prompt to large language model 122 for generating an output. In some embodiments, output generation module 124 may provide additional context to large language model 122 to conform the output to the user's characteristics. For example, as additional context to the prompt, output generation module 124 may provide large language model 122 with the non-video information related to the behavior of the user. In some embodiments, large language model 122 may be able to handle a variety of language inputs and generate, as output, a variety of language outputs.

In some embodiments, output generation module 124 may have access to a plurality of large language models 122. The large language models 122 may include LLMs of different speeds and depths of analysis. Output generation module 124 may be configured to determine which LLM to use based on a determination of the depth of research required to respond to the query. In some embodiments, output generation module 124 may respond that the avatar needs more time to consider the query and may be configured to utilize a slower LLM for deeper research. When output generation module 124 has generated a response, avatar system 116 may be configured to notify the user that a response has been prepared and/or may bring it up in a future conversation.

In some embodiments, the output of the large language model 122 may be optimized through a retrieval-augmented generation (RAG) process. For example, in some embodiments, avatar system 116 may include a RAG module 129. RAG module 129 may be configured to specify the retrievers of information prior to the retrieval. RAG module 129 may be configured to specify hierarchical indexes for performing the retrieval and/or specify how fresh the information for retrieval should be or what version of the information to retrieve. For example, RAG module 129 may instruct large language model 122 to base a response on the latest breaking news of day. In some embodiments, RAG module 129 may be configured to operate on-device, including when the device is offline. RAG module 129 may be configured to specify safety filters before and/or after large language model 122 retrieves information. This may ensure that only appropriate information is retrieved and used to generate a response. The generation of the response may also be filtered for safety to ensure that the large language model 122 did not include inappropriate information in the response. The safety filters may be specified by a user and/or administrator. RAG module 129 may be configured to route queries based on specific policies, which may include the safety filters. For example, a parent may specify that their child's avatar is to use only clean information for generating a response and also that the response itself must be clean.

Once the response for the avatar is generated, output generation module 124 may control the avatar to deliver the response. For example, output generation module 124 may generate an audible response based on the output from large language model 122 applying the characteristics of the user's voice, as identified by voice generation module 134, to the audio. In this manner, output generation module 124 may conform the sound of the avatar's speech to that of the user. In some embodiments, output generation module 124 may be configured to operate on-device such that the output may be generated while the device is offline. Output generation module 124 may be configured to include a prosody control vector to vary the speech being synthesized.

Output generation module 124 may include lip-sync module 136, shadow generation module 138, and translation module 139. Lip-sync module 136 may be configured to animate the lips of the avatar based on the output generated by output generation module 124 and/or large language model 122. In some embodiments, lip-sync module 136 may apply lip movement characteristics learned by machine learning module 132 during the avatar generation process. In this manner, the user's avatar may appear to both sound like the user and also move their lips like the user. In some embodiments, output generation module 124 may be configured to integrate a patch generated by lip-sync module 136 onto a head of an avatar. In some embodiments, lip-sync module 136 may be configured to be executed at least partially on an edge component.

In some embodiments, lip-sync module 136 may use the Wav2Lip framework as a foundation to animate the lips of the avatar based on the output generated by output generation module 124 and/or large language model 122. In some embodiments, Wav2Lip may be customized for real time generation process. In some embodiments, the process may include input processing in which lip-sync module 136 may take the generated audio (speech) and the avatar's base video as inputs. Lip-sync module 136 may utilize the Wav2Lip model to extract relevant features from both the audio and video inputs. Based on the audio features, Wav2Lip may predict the corresponding lip movements. Based on the real-time customizations, Wav2Lip may process the inputs in real-time to reduce latency and improve the overall efficiency of the system. Lip-sync module 136 may then apply the predicted lip movements to the avatar's face, creating a synchronized video output. In some embodiments, lip-sync module 136 may fine-tune the output by making continuous adjustments to ensure smooth and natural-looking lip movements that match the audio precisely. This approach allows for highly accurate and responsive lip-syncing, crucial for creating believable and engaging avatar interactions in real-time applications.

Shadow generation module 138 may be configured to generate artificial shadows for inclusion in the output generated by output generation module 124. For example, shadow generation module 138 may generate one or more shadows around the avatar to enhance the realism of the avatar itself. In some embodiments, to generate shadows for the avatar, shadow generation module 138 may duplicate the layer containing the human figure following a rotoscoping process. In some embodiments, shadow generation module 138 may position the duplicated layer behind the original human layer. Shadow generation module 138 may fill the duplicated layer with black and reduce its opacity. Shadow generation module 138 may then map the shadow to the background, with its angle adjusted to create a perception of depth. In some embodiments, shadow generation module 138 may apply the same principles when creating reflections. An automated image processing pipeline may handle the creation and adjustment of reflections to ensure consistency and realism.

Translation module 139 may be configured to implement a real-time or near real-time speech-to-speech translation pipeline. For example, translation module 139 may be configured to process audio data via speech recognition and utilize a transformer-based NLP model to translate the text. Translation module 139 may then pass the translated speech to voice generation module 134 tuned to match the user's voice of default language persona. In this manner, an avatar can be configured to speak or interact in any language.

Translation module 139 may be configured to receive audio captured via user device 102. The captured audio may be processed by pre-processing module 130. The captured audio may be analyzed based on an identified language of the audio. For example, if the language is identified as German, the semantic analysis may be performed consistent with the German language. Translation module 139 may be configured to detect cultural references, regional dialects, or the like in the captured audio. Translation module 139 may include one or more rules for translation based on the detected cultural background of the user. One or more of the detected cultural references, regional dialects, cultural translation rules, or the like may be assembled into a cultural understanding. In some embodiments, avatar system 116 may determine a location of the user device 102. Avatar system 116 may be configured to use the location information to contextualize answers geographically. The cultural understanding may help translation module 139 to perform natural language understanding. Translation module 139 may be configured to translate speech and/or text based on an analysis of the context of each word in the speech and/or text.

Translation module 139 may be configured to detect idioms in received and/or translated speech or text. The idioms may be detected by translation module 139 analyzing the context of each word such that the translation may not be a literal translation. This may improve the quality of the translation. For example, if something is said to be "up in the air," translation module 139 may analyze the context to determine if something is really up in the air or just undecided. If translation module 139 determines that something is undecided, it may select words that convey undecidedness rather than literally translating "up in the air." In some embodiments, the translation may be optimized for the target language. For example, if the target language has its own idiom for being undecided, translation module 139 may use it when translating "up in the air."

Translation module 139 may be configured to interface voice generation module 134 to generate speech in a target language. Output generation module 124 may be configured to synthesize speech for translated text using the user's vocal characteristics, such as tone, pace, inflection, prosody, and/or accent. This may enable the avatar's speech delivery to be realistic for the user.

Translation module 139 may interface with machine learning module 132, such that machine learning module 132 may be subject to a continual or continuous learning process. For example, based on one or more of a user reaction to the translation, a user reaction to the delivery, a translation quality analysis, or the like, machine learning module 132 may generate one or more performance metrics, and machine learning module 132 may subsequently use the performance metrics to train translation module 139, thereby expanding the knowledge of translation module 139. For example, if based on user feedback machine learning module 132 determines that the cultural understanding of the user was incorrect, machine learning module 132 may gather additional data for translation module 139 to use in making its cultural determination. In some embodiments, translation module 139 may be configured to execute the translation on one or more edge components. The edge translation may provide increased privacy and speed of the translation.

Exemplary workflows executed by translation module 139 are illustrated across FIGS. 15A-15H.

Integration module 126 may be configured to manage one or more third party integrations for deployment of a user's avatar. For example, integration module 126 may provide the generated output of the user's avatar to one or more third party systems (e.g., Apple FaceTime, Zoom, Google Meet, Tinder, etc.). For example, avatar system 116 may create and store a base avatar for each user. For real time interactions, instructions may be received on how to animate the avatar, any ad hoc text generation may be processed by the large language model 122, decisions about which pre-generated response to use (from a vector database) may be made, and animation instructions may be sent to user device 102, server system 104, and/or secondary user device 106. To optimize cost and performance, in some embodiments, one or more steps or functionalities described above may be performed on user device 102 and/or secondary user device 106, while reserving cloud resources (e.g., resources of server system 104) for complex computations and decision-making. This approach may provide for efficient and responsive avatar interactions while balancing the load between cloud and local resources. In some embodiments, integration module 126 may be configured to concurrently run multiple copies of the same user's avatar across different third party systems. In some embodiments, integration module 126 may be configured to allow the avatar on each third party system to have different permissions or guardrails which may be restricted to the specific session of the avatar on the third party system.

In some embodiments, server system 104 may include a customization tool 144. Customization tool 144 may be configured to assist users in generating a customized large language model for localized deployment to various targeted applications. For example, customization tool 144 may provide users with a simplified and automated framework to generate LLMs configured to ingest large volumes of domain-specific structured and unstructured data. In this manner, customization tool 144 may enable users to produce personalized, license-free LLMs deployable on their user device 102. Customization tool 144 may include dynamic offload policies that enable transition of the avatar between their user device 102, edge servers, and cloud servers.

In some embodiments, server system 104 may include an avatar empathy module 146. Avatar empathy module 146 may be configured to enable an AI generated avatar to function as an empathic companion. For example, avatar empathy module 146 may provide an AI generated avatar with emotional intelligence, adaptive memory, and multimodal sensing (voice, facial expression, language) to provide ongoing mental health support, companionship, and behaviorally aware guidance. Empathy module 146 may allow the avatar to remember previous interactions, recognize emotional cues in voice and facial expressions, such that the avatar's output can be tailored accordingly.

In some embodiments, server system 104 may include an education tool 148. Education tool 148 may be configured to assist users in generating an AI-powered holographic tutor that delivers one-on-one adaptive instructions. Education tool 148 may be configured to integrate emotion recognition, real-time NLP, user feedback, and dynamic lesson customization into a visual, interactive tutor avatar. Education tool 148 may enable the tutor avatar to adapt teaching methods based on student responses, behavior, and progress.

In some embodiments, server system 104 may include a sign language engine 150. Sign language engine 150 may be configured to support bidirectional communication with hearing impaired individuals using a realistic and expressive holographic avatar that can interpret spoken language into sign language and vice versa. Sign language engine 150 may use AI-driven voice recognition, gesture synthesis, and sign language datasets to animate a holographic avatar. Sign language engine 150 may support emotional expression through facial animation and may be tailored for use in public spaces, education, healthcare, and media.

In some embodiments, server system 104 may include a guardrail module 152. Guardrail module 152 may be configured to restrict the large language model 122 in generating responses. Guardrail module 152 may be configured by a user and/or administrator to focus the response based on a given scope. Guardrail module 152 may be configured to limit the databases used by large language model 122 for generating a response.

In some embodiments, server system 104 may employ a blockchain based verification system to ensure that deepfake or unauthorized avatars are not generated. For example, in some embodiments, each avatar may be minted as a non-fungible token (NFT) linked to a user's verified identity. Smart contracts may be used to handle permissions and usage rights for each avatar. Through the use of a blockchain system, interactions with the avatar may be logged and stored to establish a trail of communication with the avatar.

In addition or in lieu of blockchain-based verification, server system 104 may employ one or more deepfake prevention techniques to prevent unauthorized use of avatars. For example, server system 104 may rely on one or more of biometric data, timestamping, and/or digital watermarking to validate avatar authenticity. In some embodiments, server system 104 may apply watermarking to one or more of the avatar, avatar accessories, avatar clothing, avatar hairstyles, specific avatar modes, or the like. In some embodiments, one or more watermarks may be bound to a session such that the watermark is recoverable after re-encoding. Such watermarking may provide authentication of each aspect based on its origin. In some embodiments, the watermarking may include one or more of text watermarking, audio watermarking, or video watermarking.

As shown, computing environment 100 may further include secondary user devices 106 and one or more third party servers 108. Secondary user devices 106 may be representative of user devices that are configured to interact with an avatar generated by avatar system 116. As shown, secondary user devices 106 may include application 140. Application 140 may be representative of a third-party application associated with one or more third party servers 108. Exemplary third-party applications may include, but are not limited to, FaceTime from Apple, Zoom from Zoom Video Communications, Teams from Microsoft, Tinder from Match Group, and the like.

Application 140 may include integration 142. Integration 142 may be representative of a script or software module that is configured to interface with integration module 126 of server system 104. In this manner, integration 142 may manage the deployment of the user's avatar for communication with secondary user device 106. For example, integration 142 may be configured to provide relay voice or text prompts from secondary user device 106 to avatar system 116 for processing. Similarly, integration 142 may be configured to surface responses generated by avatar system 116 to users of secondary user device 106 within application 140.

In some embodiments, avatars may be compatible with one or more external devices, such as, but not limited to, smart glasses, mobile augmented reality, virtual reality headsets, web and enterprise platforms that integrate avatars via API and streaming layers, and the like.

Figure 2:
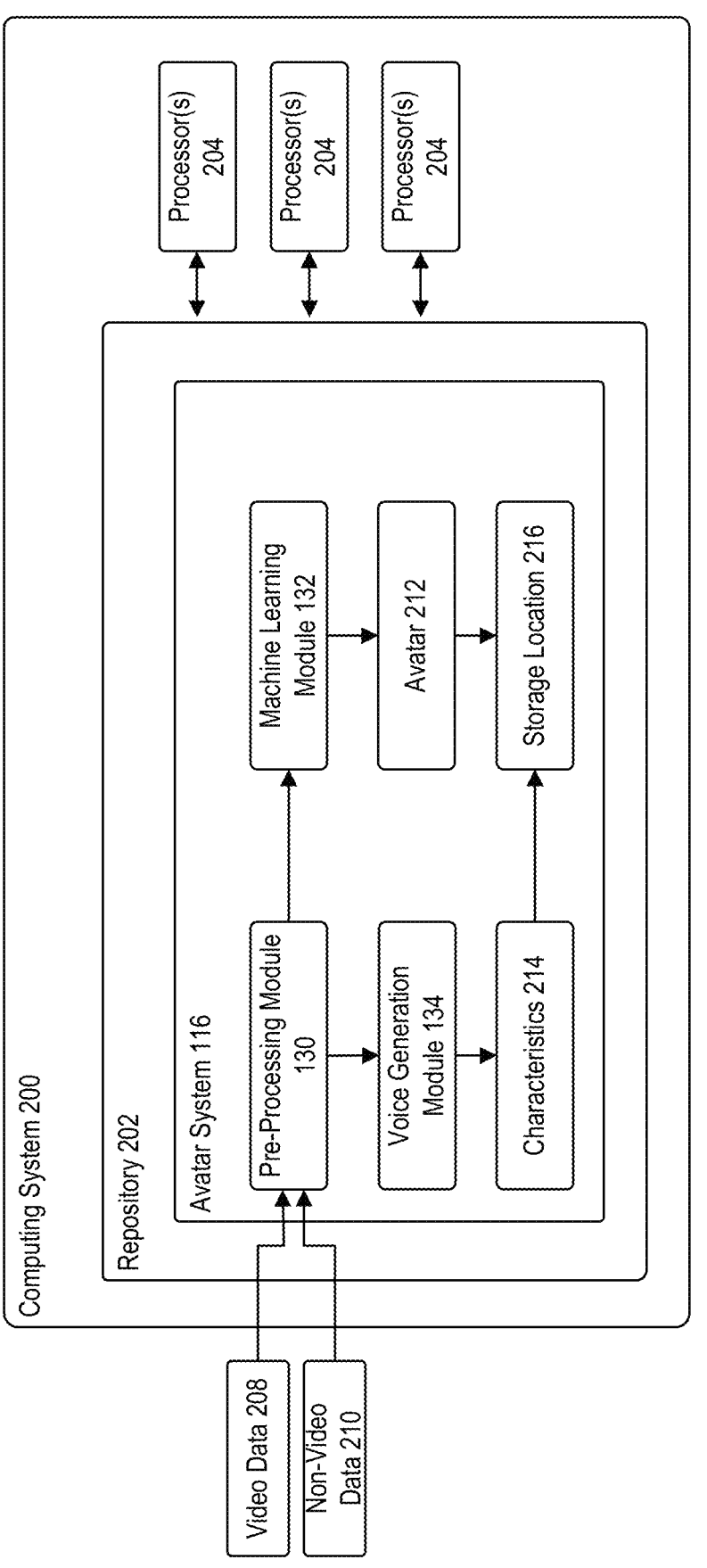
FIG. 2 is a block diagram illustrating a computing environment, according to example embodiments.

FIG. 2 is a block diagram illustrating computing system 200, according to example embodiments. As shown, FIG. 2 may represent an example environment in which avatar system 116 may generate an avatar. Computing system 200 may include a repository 202 and one or more computer processors 204.

Repository 202 may be representative of any type of storage unit and/or device (e.g., a file system, database collection of tables, or any other storage mechanism) for storing data. In some embodiments, repository 202 may include multiple different storage units and/or devices. The multiple different storage units and/or devices may or may not be of the same type and may or may not be located at the same physical site. As shown, repository 202 may include avatar system 116.

In operation, avatar system 116 may receive video data 208 and non-video data 210 from user device 102. In some embodiments, video data 208 may correspond to a video of the user captured using user device 102. In some embodiments, video data 208 may be video data of minimal length (e.g., three minutes). Video data 208 may generally be representative of video data of the user performing one or more movements and/or uttering one or more phrases. For example, video data 208 may generally include information such that avatar system 116 can identify nuances in the user's voice and movements. Non-video data 210 may be representative of information that allows the user to customize their avatar's appearance or behavior. For example, non-video data 210 may take the form of a plurality of answers to a series of questions related to the user's personality or behavior.

Pre-processing module 130 may receive video data 208 and non-video data 210 for processing. Pre-processing module 130 may utilize one or more algorithms to remove, for example, background information from the uploaded video to isolate the user within the video, which may assist machine learning module 132 in generating an avatar corresponding to the user. In some embodiments, pre-processing module 130 may also isolate the audio from video data 208.

Pre-processing module 130 may provide the isolated video data 208 and non-video data 210 to machine learning module 132 for generation of avatar 212. For example, machine learning module 132 may generate an avatar of the user based on video data 208 and non-video data 210 such that machine learning module 132 generates, as output, avatar 212 that looks, behaves, sounds, and interacts, like the user.

Pre-processing module 130 may provide the audio data from video data 208 to voice generation module 134. Voice generation module 134 may analyze and clone the voice of the user based on the audio data. For example, voice generation module 134 may utilize one or more algorithms or machine learning models that receives, as input, audio data and generates, as output, characteristics 214 of the user's voice. Characteristics 214 may be applied to output from avatar 212 to conform the sound of the avatar's speech to that of the user.

Once generated, avatar 212 and characteristics 214 may be stored in storage location 216 for subsequent retrieval.

Figure 3:
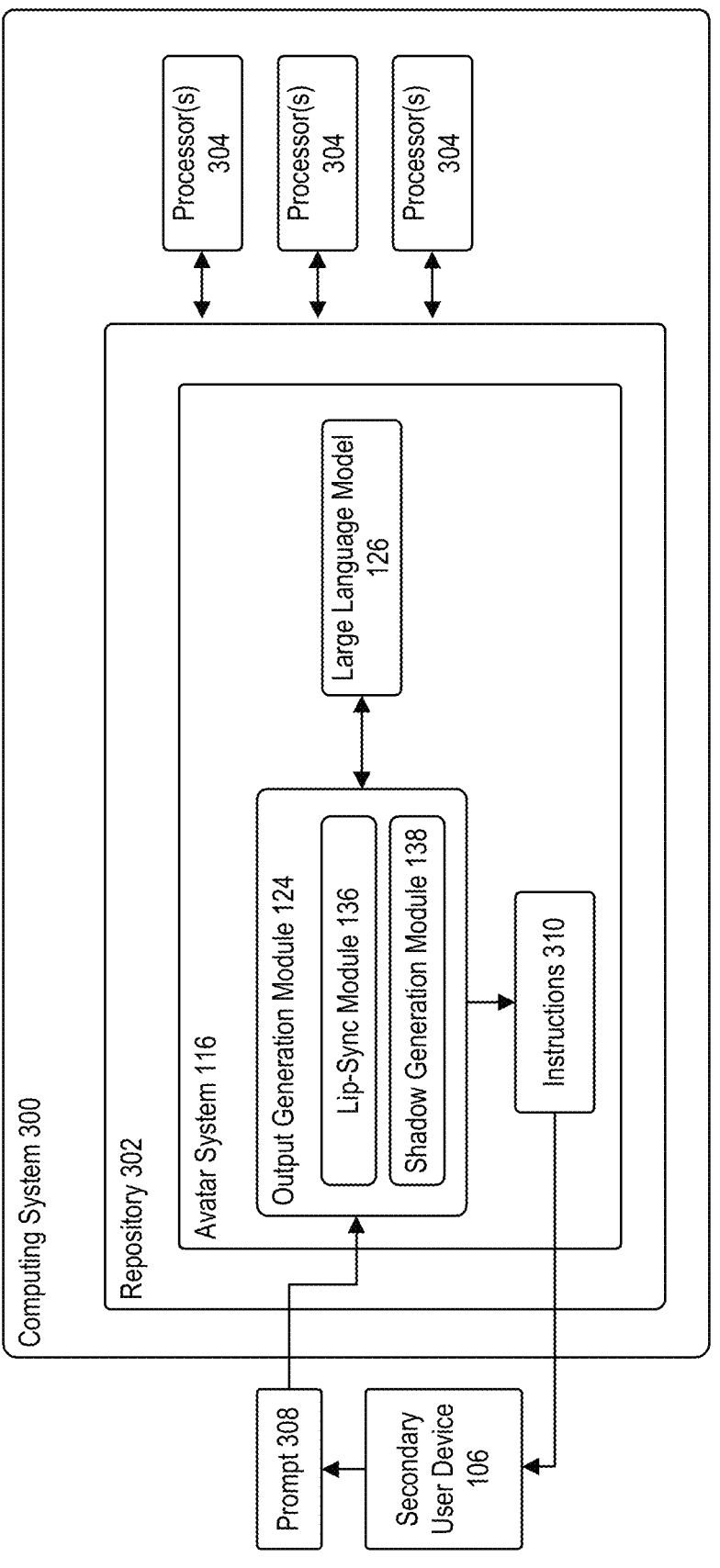
FIG. 3 is a block diagram illustrating a computing environment, according to example embodiments.

FIG. 3 is a block diagram illustrating computing system 300, according to example embodiments. As shown, FIG. 2 may represent an example environment in which avatar system 116 may animate a deployed avatar responsive to receiving a prompt from secondary user device 106. Computing system 300 may include a repository 302 and one or more computer processors 304.

Repository 302 may be representative of any type of storage unit and/or device (e.g., a file system, database collection of tables, or any other storage mechanism) for storing data. In some embodiments, repository 302 may include multiple different storage units and/or devices. The multiple different storage units and/or devices may or may not be of the same type or located at the same physical site. As shown, repository 302 may include avatar system 116.

As shown, avatar system 116 may receive a prompt 308 from secondary user device 106 that is interacting with a user's avatar (e.g., avatar 212) via a third-party application. In some embodiments, prompt 308 may be received from secondary user device 106 via integration module 126. Integration module 126 may forward prompt 308 to output generation module 124 for processing.

Output generation module 124 may generate a response to prompt 308 by interfacing with large language model 122. In some embodiments, such as when prompt 308 is a voice-based prompt, output generation module 124 may utilize one or more voice-to-text algorithms to convert prompt 308 from a voice-based prompt to a text-based prompt. Output generation module 124 may forward or provide prompt 308 to large language model 122 for generating a response to prompt 308. In some embodiments, output generation module 124 may provide additional context to large language model 122 to conform the output to the user's characteristics. For example, as additional context to the prompt, output generation module 124 may provide large language model 122 with the non-video information related to the behavior of the user. Based on prompt 308 and/or the non-video information related to the behavior of the user, large language model 122 may generate an output and provide the output back to output generation module 124.

Output generation module 124 may provide the output generated by large language model 122 to lip-sync module 136. Lip-sync module 136 may generate instructions to animate the lips of the avatar based on the output generated by output generation module 124 and/or large language model 122. In some embodiments, output generation module 124 may further interface with shadow generation module 138 to generate artificial shadows for inclusion in the output generated by output generation module 124. In this manner, the output generated by output generation module 124 may appear more realistic through the use of various shadowing effects that are not present from an avatar alone.

Based on the output from large language model 122, the lip movement instructions from lip-sync module 136, and/or the shadow generation information from shadow generation module 138, avatar system 116 may generate instructions 310 for animating an avatar responsive to prompt 308. Avatar system 116 may provide instructions 310 to secondary user device 106, which may be applied to the avatar by the avatar integration 142 installed on the third-party application 140.

Figure 4:
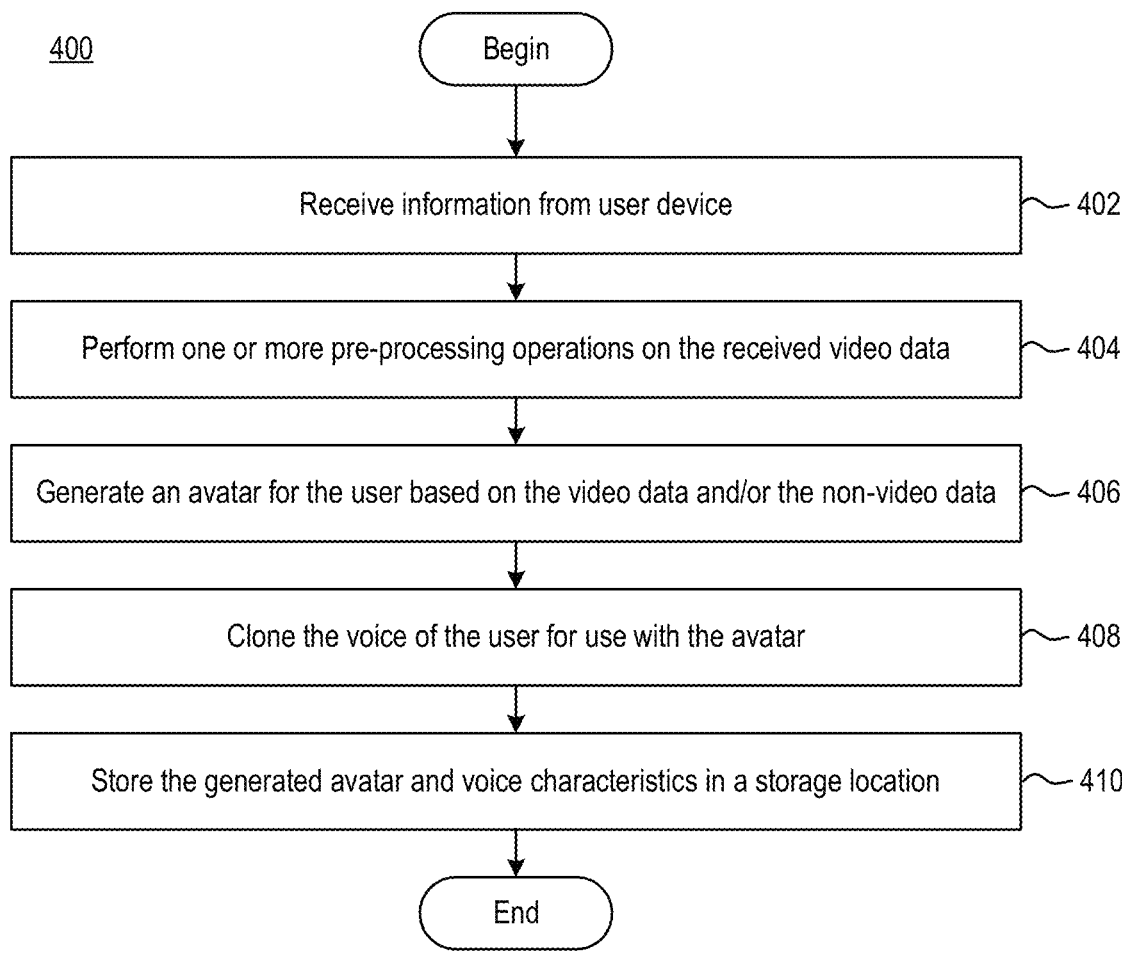
FIG. 4 is a flow diagram illustrating a method of generating an avatar, according to example embodiments.

FIG. 4 is a flow diagram illustrating a method 400 of generating an avatar for a user, according to example embodiments. Method 400 may begin at step 402.

At step 402, server system 104 may receive information from user device 102. In some embodiments, the information received from user device 102 may include video data and non-video data. Video data may correspond to a video of the user captured using user device 102. In some embodiments, video data may be video data of minimal length (e.g., three minutes). Video data may generally be representative of video data of the user performing one or more movements and/or uttering one or more phrases. For example, video data may generally include information such that avatar system 116 can identify nuances in the user's voice and movements. Non-video data may be representative of information that allows the user to customize their avatar's appearance of behavior. For example, non-video data may take the form of a plurality of answers to a series of questions related to the user's personality or behavior.

At step 404, server system 104 may perform one or more pre-processing operations on the received video data. For example, pre-processing module 130 may utilize one or more algorithms to remove, for example, background information from the uploaded video to isolate the user within the video, which may assist machine learning module 132 in generating an avatar corresponding to the user. In some embodiments, pre-processing module 130 may also isolate the audio from the video data.

At step 406, server system 104 may generate an avatar for the user based on the video data and/or the non-video data. For example, machine learning module 132 may generate an avatar of the user based on video data and non-video data such that machine learning module 132 generates, as output, an avatar that looks, behaves, sounds, and interacts, like the user.

At step 408, server system 104 may clone the voice of the user for use with the avatar. For example, voice generation module 134 may analyze and clone the voice of the user based on the audio data extracted from the video data or directly from the video data. For example, voice generation module 134 may utilize one or more algorithms or machine learning models that receives, as input, the audio data and/or the video data and generates, as output, characteristics of the user's voice. Characteristics may be applied to audible output from the avatar when deployed in order to conform the sound of the avatar's speech to that of the user.

At step 410, server system 104 may store the generated avatar and voice characteristics in a storage location for subsequent retrieval.

Figure 5:
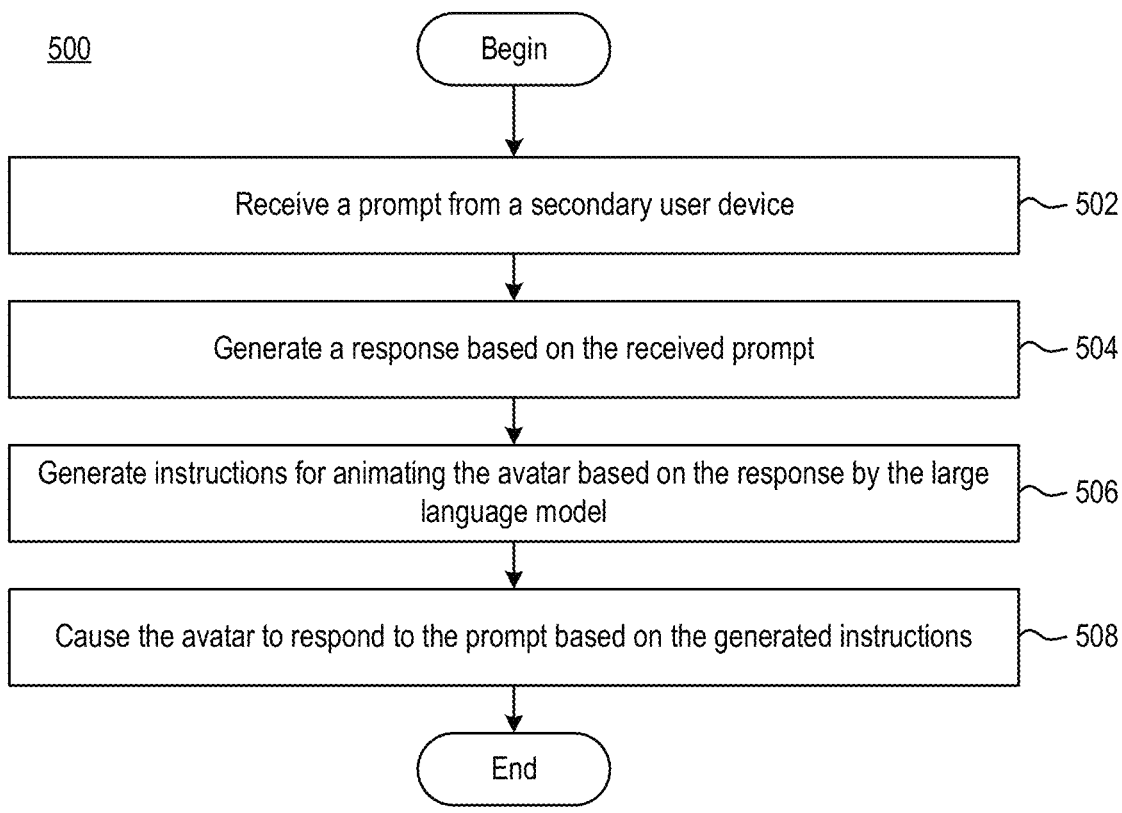
FIG. 5 is a flow diagram illustrating a method of animating an avatar responsive to a prompt, according to example embodiments.

FIG. 5 is a flow diagram illustrating a method 500 of animating an avatar responsive to receiving a prompt directed to the avatar, according to example embodiments. Method 500 may begin at step 502.

At step 502, server system 104 may receive a prompt from a secondary user device 106 that is interacting with a user's avatar. In some embodiments, secondary user device 106 may be interacting with the user's avatar that is deployed via a third-party application executing on secondary user device 106 that includes an integration with avatar system 116. In some embodiments, the prompt may be a voice-based prompt, such as when the user of secondary user device 106 is interacting with the avatar via video conferencing functionality. In some embodiments, the prompt may be text-based.

At step 504, server system 104 may generate a response based on the received prompt. In some embodiments, such as when the prompt is a voice-based prompt, server system 104 may convert the voice-based prompt into a text-based representation. To generate a response based on the received prompt, avatar system 116 may interface with large language model 122. For example, output generation module 124 may forward or provide the prompt to large language model 122 for generating a response. In some embodiments, output generation module 124 may provide additional context to large language model 122 to conform the output to the user's characteristics. For example, as additional context to the prompt, output generation module 124 may provide large language model 122 with the non-video information related to the behavior of the user. Avatar system 116 may receive a response to the prompt from large language model 122.

At step 506, server system 104 may generate instructions for animating the avatar based on the response generated by large language model 122. In some embodiments, output generation module 124 may provide the output generated by large language model 122 to lip-sync module 136. Lip-sync module 136 may generate instructions to animate the lips of the avatar based on the output generated by output generation module 124 and/or large language model 122. In some embodiments, output generation module 124 may further interface with shadow generation module 138 to generate artificial shadows for inclusion in the output generated by output generation module 124. In this manner, the output generated by output generation module 124 may appear more realistic through the use of various shadowing effects that are not present from an avatar alone. The response from large language model 122, the lip animation instructions, and/or the shadow information may collectively form the instructions for animating the avatar.

At step 508, server system 104 may cause the avatar to respond to the prompt based on the generated instructions. For example, avatar system 116 may provide the instructions to secondary user device 106, which may be applied to the avatar by the avatar integration 142 installed on the third-party application 140.

This process may continue in real-time or near real-time such that a conversation can occur between the avatar and the user, as if the user is interacting with the real person corresponding to the avatar.

Figure 6:
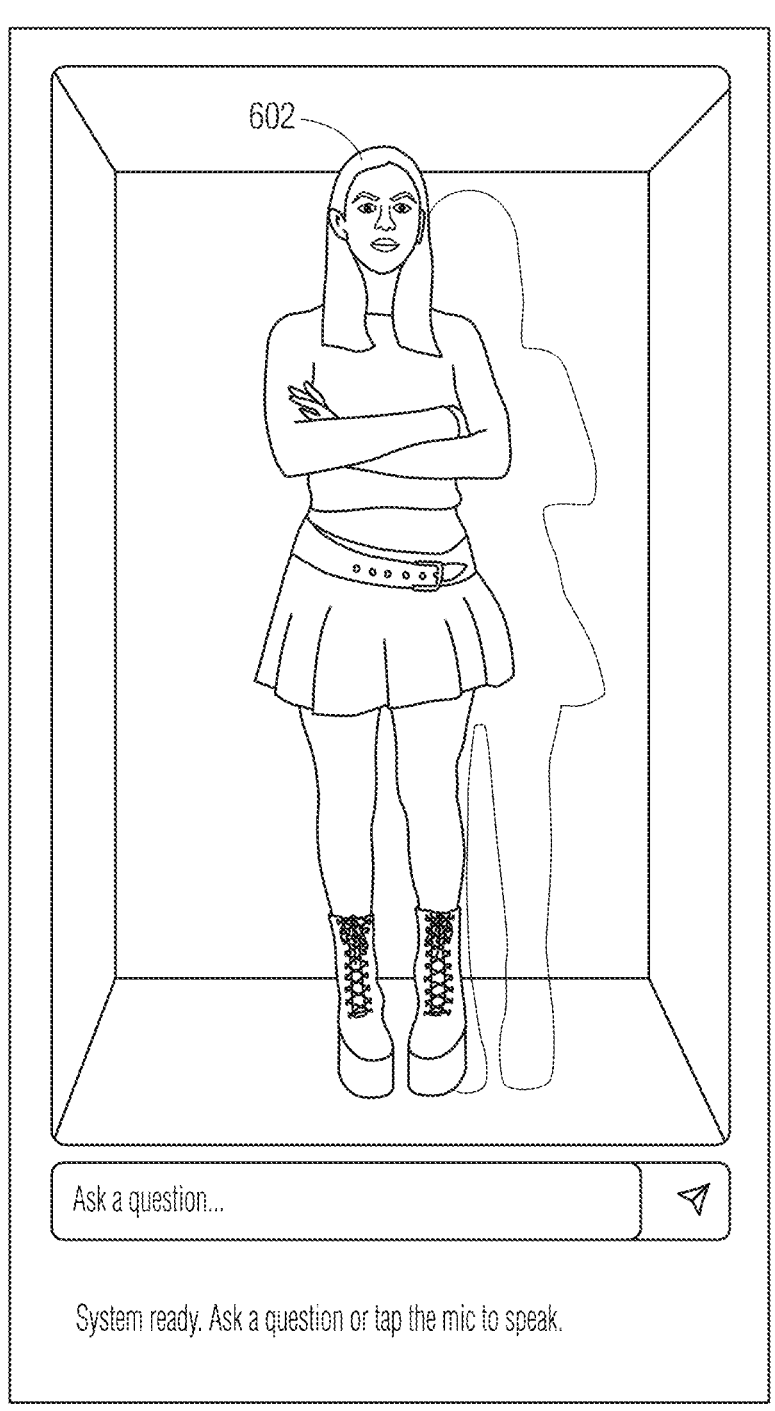
FIG. 6 is a graphical user interface depicting an avatar created by an avatar system, according to example embodiments.

FIG. 6 illustrates a graphical user interface (GUI) 600 that includes an avatar 602 generated by avatar system 116, according to example embodiments. As shown, avatar 602 is a highly realistic looking digital version of a user that can exist virtually in multiple places at a given time.

Figure 7:
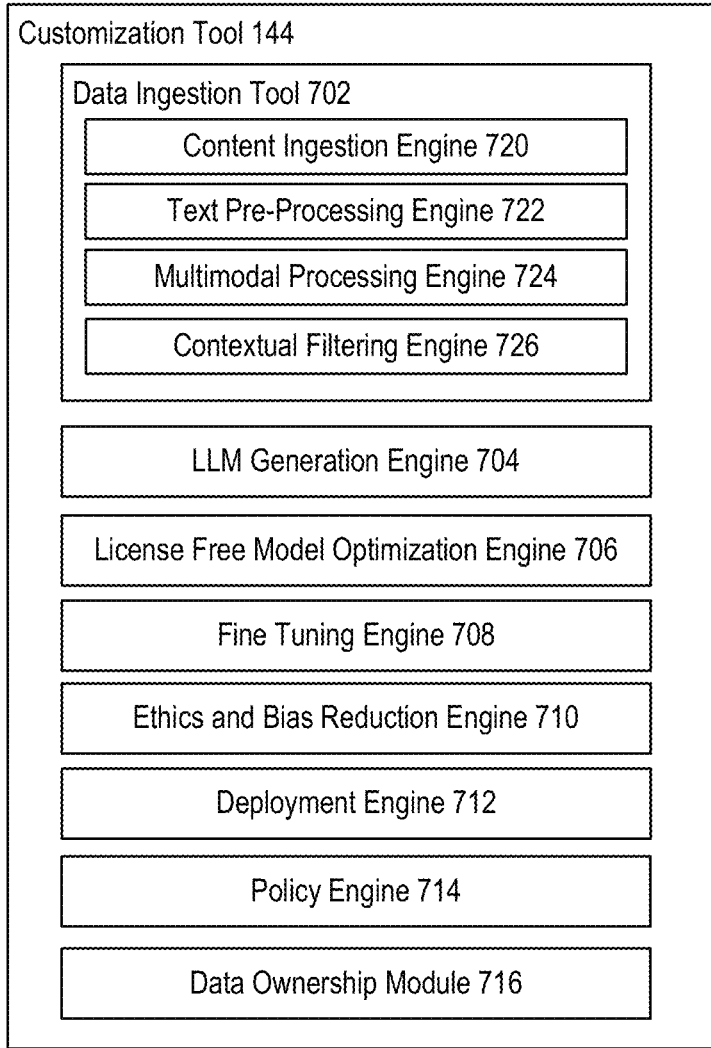
FIG. 7 is a block diagram illustrating customization tool, according to example embodiments.
Figure 8A:
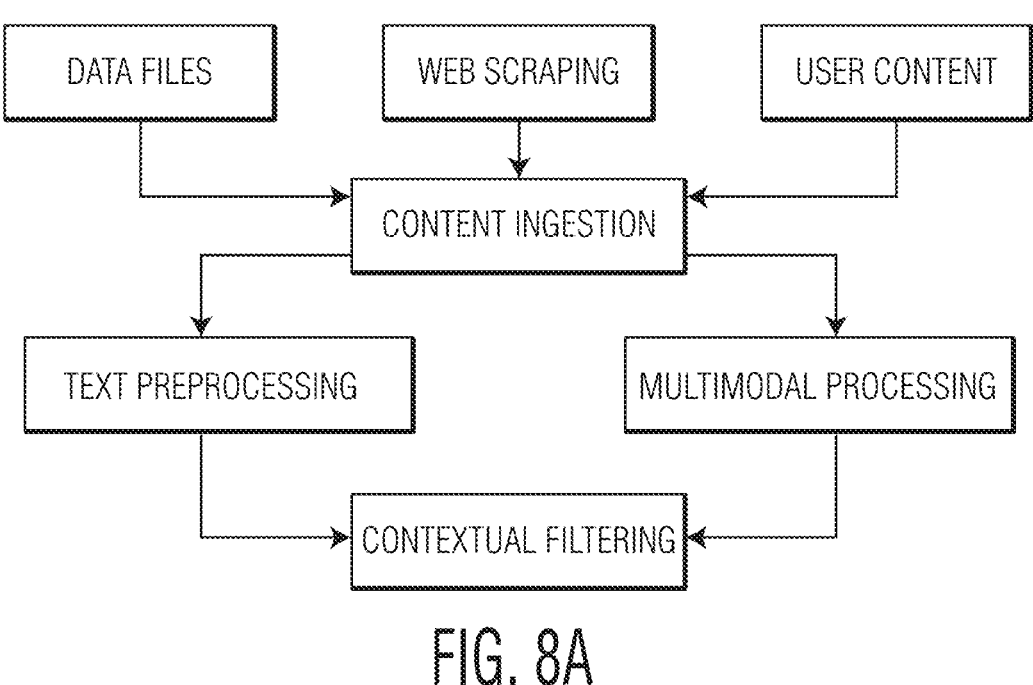
Figure 8B:
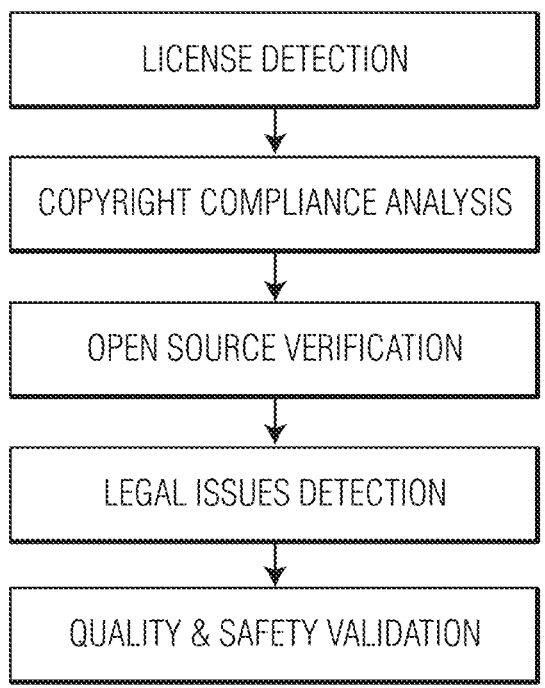
Figure 8C:
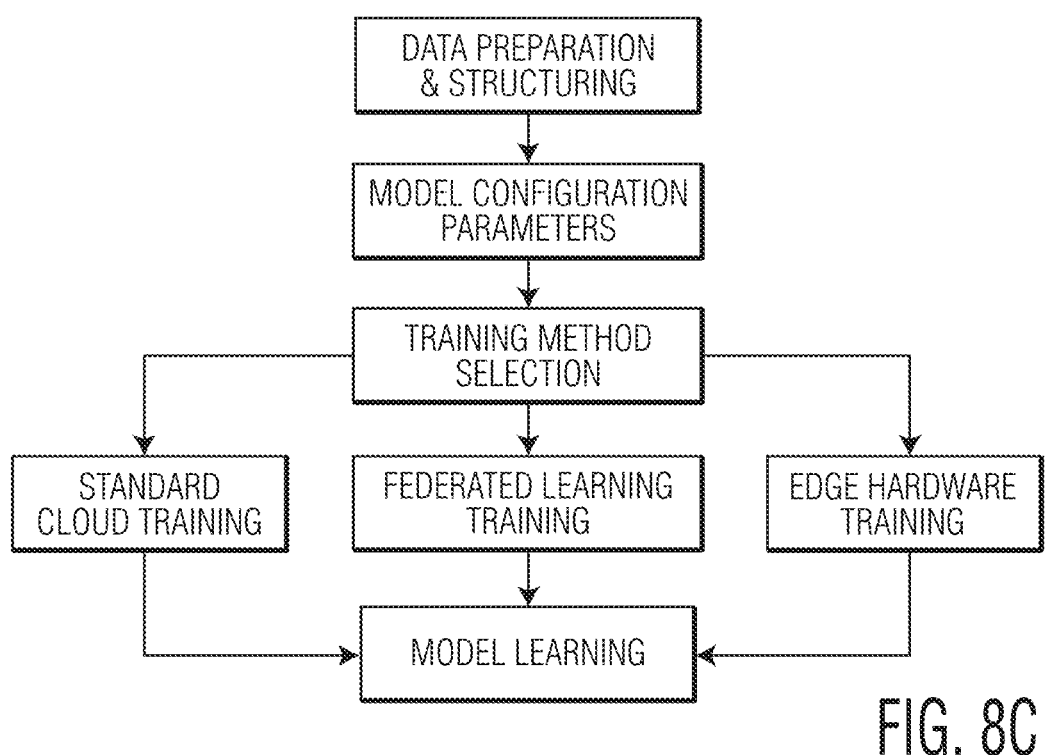
Figure 8D:
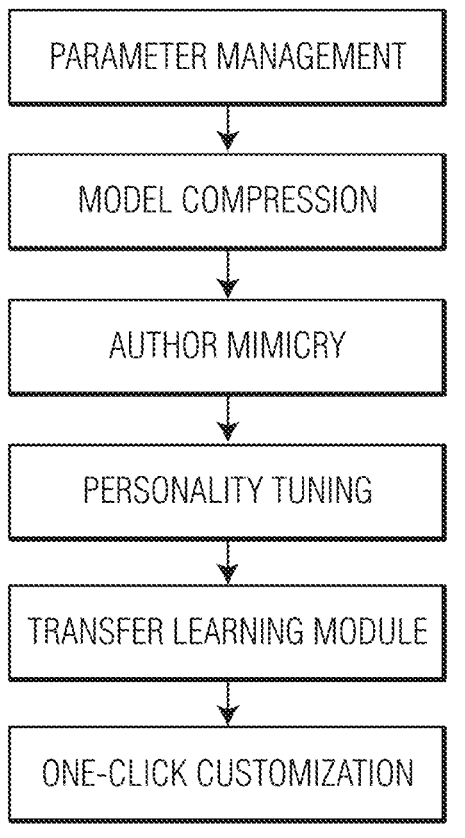
Figures 8G, 8H:
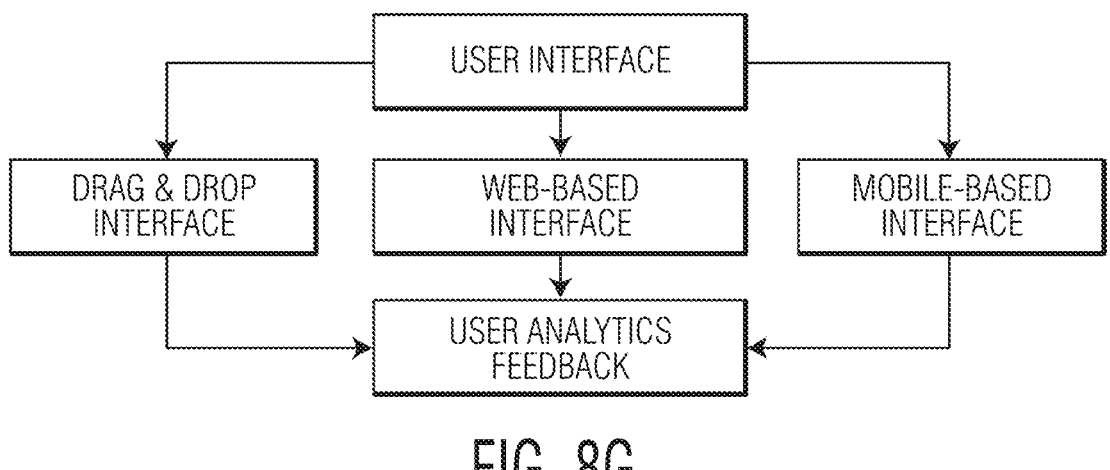

FIG. 7 is a block diagram illustrating customization tool 144, according to example embodiments. As discussed above, customization tool 144 may be configured to assist users in generating a customized LLM for localized deployment to various targeted applications. Customization tool 144 may include one or more modules. The one or more modules may include one or more of data ingestion tool 702, LLM generation engine 704, license-free model optimization engine 706, fine-tuning engine 708, ethics and bias reduction engine 710, deployment engine 712, policy engine 714, and/or data ownership module 716. Each of data ingestion tool 702, LLM generation engine 704, license-free model optimization engine 706, fine-tuning engine 708, ethics and bias reduction engine 710, deployment engine 712, policy engine 714, and data ownership module 716 may include one or more software modules. The one or more software modules may be collections of code, or instructions stored on a media (e.g., memory of server system 104) that represent a series of machine instructions (e.g., program code) that implements one or more algorithmic steps. The machine instructions may be the actual computer code that the processor of server system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Data ingestion tool 702 may be configured dynamically ingest a corpus of data for training an LLM. Data ingestion tool 702 may include one or more sub-modules. For example, data ingestion tool 702 may include content ingestion engine 720, text pre-processing engine 722, multimodal processing engine 724, and contextual filtering engine 726.

Data ingestion engine 720 may be configured to dynamically ingest data that includes, but is not limited to one or more of text data, audio data, or image data. In some embodiments, data ingestion engine 720 may ingest data fed to data ingestion tool 702 from user device 102 in the form of data files. In some embodiments, data ingestion tool 702 may ingest data by scraping websites or webpages provided by or indicated by a user of user device 102.

Text pre-processing engine 722 may be configured to pre-process the textual data provided to data ingestion engine 720. For example, text pre-processing engine 722 may be configured to perform one or more operations on the text-based data to clean, structure, or organize the text-based data for downstream processes.

Multimodal processing engine 724 may be configured to pre-process the data ingested by data ingestion engine 720. For example, multimodal processing engine 724 may be configured to ingest, interpret, and/or align data from multiple different data modalities (e.g., text, image, audio, video, etc.). Through this process, multimodal processing engine 724 may preserve the relationship between data types for downstream training.

Contextual filtering engine 726 may be configured to use one or more techniques to automatically select, reject, prioritize, or modify data being ingested into its training pipeline based on one or more of relevance, quality, or meaning in context. For example, contextual filtering engine 726 may receive the outputs from text pre-processing engine 722 and/or multimodal processing engine 724 and select, reject, prioritize, or modify the data accordingly.

LLM generation engine 704 may be configured to generate an LLM based on the data ingested by data ingestion tool 702. LLM generation engine 704 may employ an automated model training pipeline that reduces the need for the end user to have deep AI expertise to create customized models. LLM generation engine 704 may include an adaptive LLM framework where users can define the scope (e.g., historical text, author-specific writing styles, religious scriptures, etc.) before generating an optimized model. LLM generation engine 704 may utilize one or more training methods for the automated model training pipeline. In some embodiments, the one or more training methods may include standard cloud training, federated learning, and/or edge hardware training. LLM generation engine 704 may employ efficient, low-resource training algorithms, allowing models to be trained on standard consumer-grade hardware.

License-free model optimization engine 706 may be utilized to train models across multiple decentralized devices while maintaining privacy. License-free model optimization engine 706 may include an automated copyright/license detection module configured to ensure that ingested data remains open-source or falls within fair use. To accomplish the copyright/license detection, license-free model optimization engine 706 may be configured to perform copyright compliance analysis. In some embodiments, the copyright compliance analysis may include web-scraping to check if there are any listed copyrights for substantially identical material. In some embodiments, the copyright compliance analysis may include verifying whether material is open source. In some embodiments, the copyright compliance analysis may include hash matching and policy rules. License-free model optimization engine 706 may be configured to perform the analysis at least partially with on-device models. License-free model optimization engine 706 may be configured to detect potential legal issues based on the findings of the copyright compliance analysis. Making these determinations may enable license-free model optimization engine 706 to ensure the quality and/or the legality of the avatar. In some embodiments, license-free model optimization engine 706 may be configured to provide parameter-efficient model compression, allowing for lightweight deployment while preserving model accuracy.

Fine-tuning engine 708 may be configured to allow users to easily fine-tune their LLMs. For example, fine-tuning engine 708 may include one-click functionality that allows users to adjust tone, complexity, or domain specificity for their generated LLM. In some embodiments, fine-tuning engine 708 may employ an on-the-fly transfer learning mechanism where small updates can be made to the generated LLM without requiring the user to retrain the entire model. In some embodiments, fine-tuning engine 708 may include an author mimicry module that may be configured to capture and reproduce distinct writing styles from specific texts.

Ethics and bias reduction engine 710 may be configured to analyze trained LLMs for the purpose of detecting any ethical biases. For example, ethics and bias reduction engine 710 may include a fairness filter configured to ensure that generated models do not inherit or amplify biases from training data. In some embodiments, ethics and bias reduction engine 710 may include a transparent explainability layer where users can track how their LLM interprets and structures responses. In some embodiments, ethics and bias reduction engine 710 may include a self-regulating model evaluation system that may be configured to continuously refine generated text for accuracy and coherence. For example, ethics and bias reduction engine 710 may include one or more guardrails to constrain the LLMs in generating responses. In some embodiments, ethics and bias reduction engine 710 may be configured to perform adversarial evaluation to detect any ethical bias. The adversarial evaluation may include automated safety scoring and/or drift or outlier detection. In some embodiments, ethics and bias reduction engine 710 may include one or more policies to escalate the evaluation to a human. In some embodiments, ethics and bias reduction engine 710 may be configured to evaluate the truthfulness of the avatar's response. If the generated response surpasses a threshold of "truth", ethics and bias reduction engine 710 may be configured to modify the response to tell the truth, continue with the lie, and/or qualify their uncertainty—for example, by stating "I'm not sure if I'm remembering correctly, but . . . ."

Deployment engine 712 may be configured to provide a drag-and-drop interface for dataset input, simplifying the model generation process for non-technical users. In some embodiments, the interface may include various options for training the LLM, such as cloud-native and offline training options, allowing for flexible model creation based on user resources. Deployment engine 712 may further be configured to allow users to export chatbot APIs, embedded systems, or enterprise software.

In some embodiments, deployment engine 712 may allow for deployment of the generated LLM across several use cases. Exemplary use cases may include, but are not limited to avatar education, avatar gaming, avatar retail, avatar social, avatar entertainment media, and the like.

Policy engine 714 may be configured to provide one or more policies on efficiently transitioning a generated avatar between user device 102, edge components, and cloud servers. In some embodiments, policy engine 714 may utilize standardized exportation via open neural network exchange (ONNX) and/or machine learning compilation (MLC). Policy engine 714 may be configured to dynamically transition the avatar between user device 102, edge servers, and/or cloud servers. For example, while a user is interacting with an avatar on user device 102, if policy engine 714 determines that user device 102 is unable to perform one or more functions required in generating responses for the avatar, policy engine 714 may transition the avatar to be generated via edge computing and/or cloud computing. To execute the transition, policy engine 714 may be configured to perform one or more of quantization or distillation of the avatar. In some embodiments, the quantization and/or distillation may reduce the avatar to be using 8-bit (int8) or 4-bit (int4) representations. This may allow the avatar and/or its responses to be computed off the device and delivered to the device efficiently. Being able to transition the computing for the avatar off the device to one or more of edge computing or cloud computing may be desirable in order to reduce the computing power and memory necessary for the device. In some embodiments, avatar system 116 may be configured to monitor thermal and power telemetry of an edge component and estimate a cost per operation for the system in order to make the determination. In some embodiments, the transition from on-device to off-device may be a transition from one edge component to a peer edge component. Some devices, such as mobile devices, may have reduced computing power as compared to other devices, such as desktop computers. Accordingly, policy engine 714 may enable the avatar to be integrated and deployed on a wider range of devices with minimal to no reduction in avatar quality. In some embodiments, memory of a device may be freed up by determining which avatar assets have not been used in a certain amount of time. The assets that have not been used recently may be off-loaded to the cloud instead of being stored on the device. This may help with the speed of an avatar responding to queries that the user most frequently asks about. In some embodiments, the user may select which assets should remain on-device.

Data ownership module 716 may be configured to enforce consent and usage policies during ingestion, retrieval, training, and inference. In some embodiments, enforcing usage policies may include data ownership module 716 emitting cryptographic receipts and driving redactions and/or re-indexing in response to revocation of ownership rights. Data ownership module 716 may be configured to provide an end-to-end ledger of the dataset and model provenance all the way from the capture data to the preprocessing to the training of the model to the model artifacts. In some embodiments, the ledger may include verifiable audits and/or signed attestations to verify the ownership and consent at each stage of the avatar generation. The ledger may be incorporated onto the blockchain system of server system 104 such that the information is tied to the other information on the blockchain. Data ownership module 716 may be configured to enforce consent policies before training or inference for the model such that user data that the user wishes to keep secret, such as personally identifiable information, is protected. In some embodiments, even if consent was previously given, data ownership module 716 may be configured to retract information after a revocation of consent for the model to train on certain information. In some embodiments, server system 104 may use the data ownership information for determining one or more contributor royalties based on one or more data contracts. The contributor royalties may be based on a determination of model and/or feature usage. Server system 104 may be configured to enforce any data contracts regarding the use of the models and/or features.

Exemplary workflows executed by customization tool 144 are illustrated across FIGS. 8A-8H.

Figure 9:
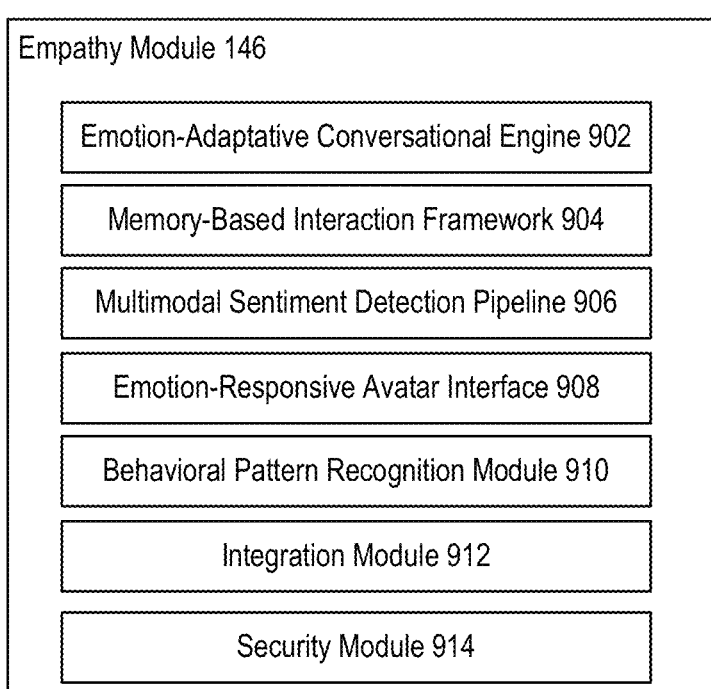
FIG. 9 is a block diagram illustrating avatar empathy module, according to example embodiments.
Figure 10A:
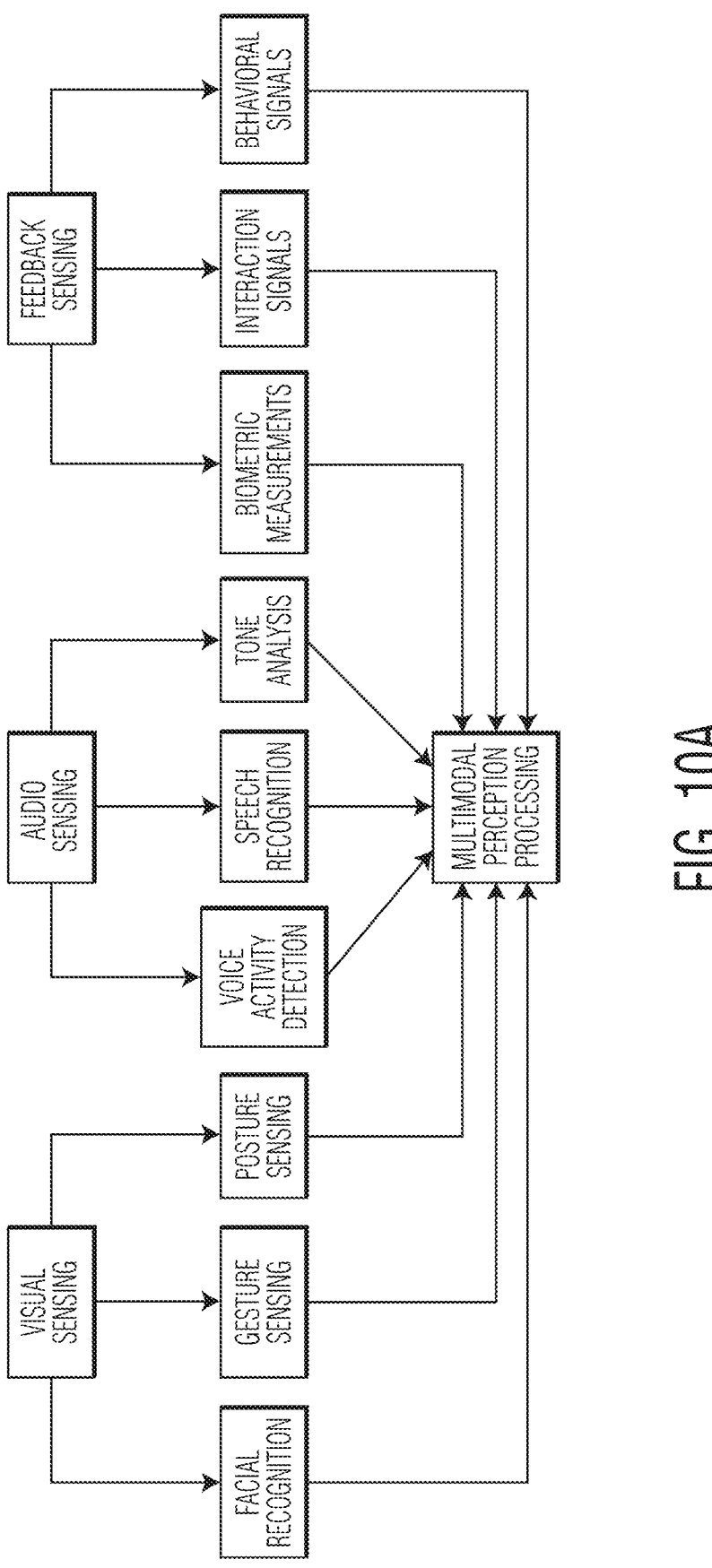
FIGS. 10A-10H illustrate exemplary workflows performed by avatar empathy module, according to example embodiments.
Figure 10B:
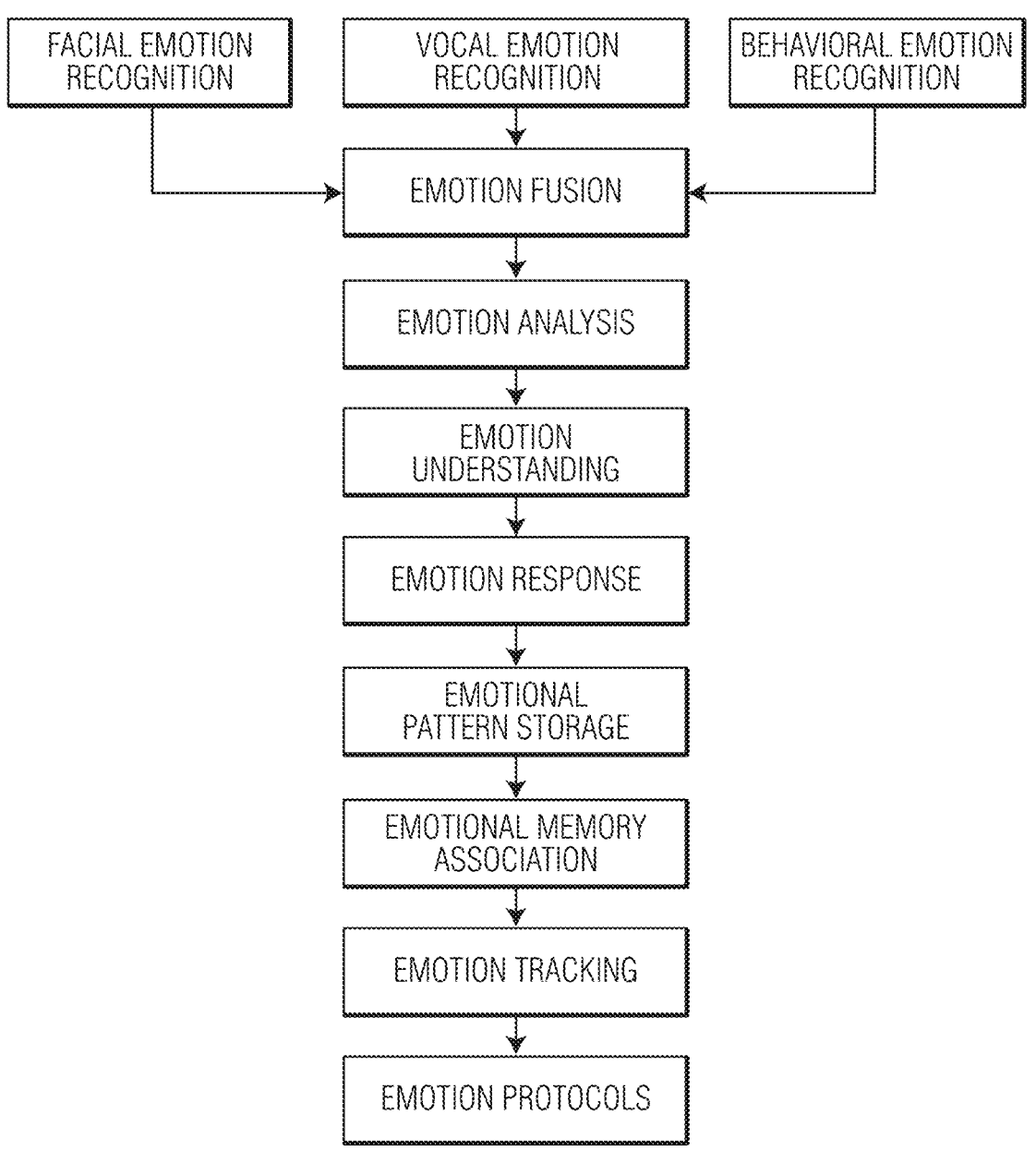
Figure 10C:
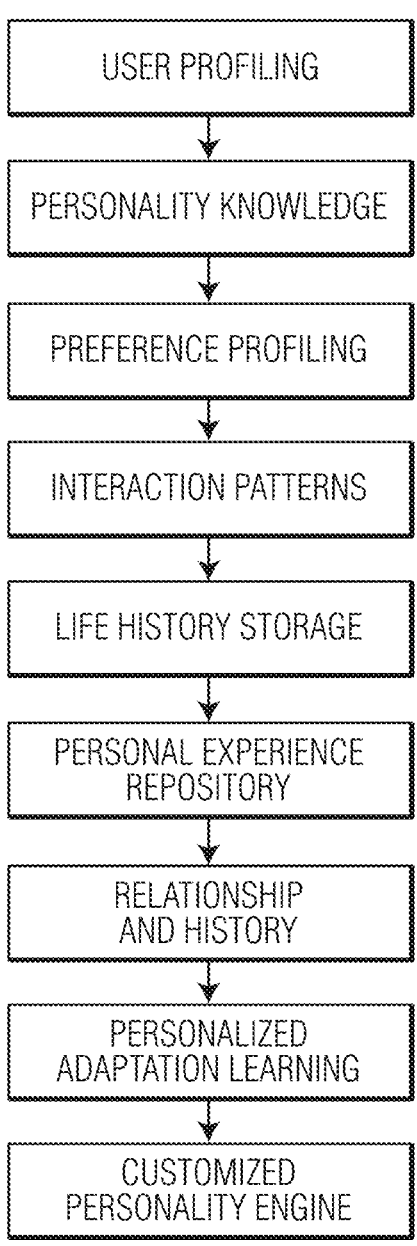
Figure 10D:
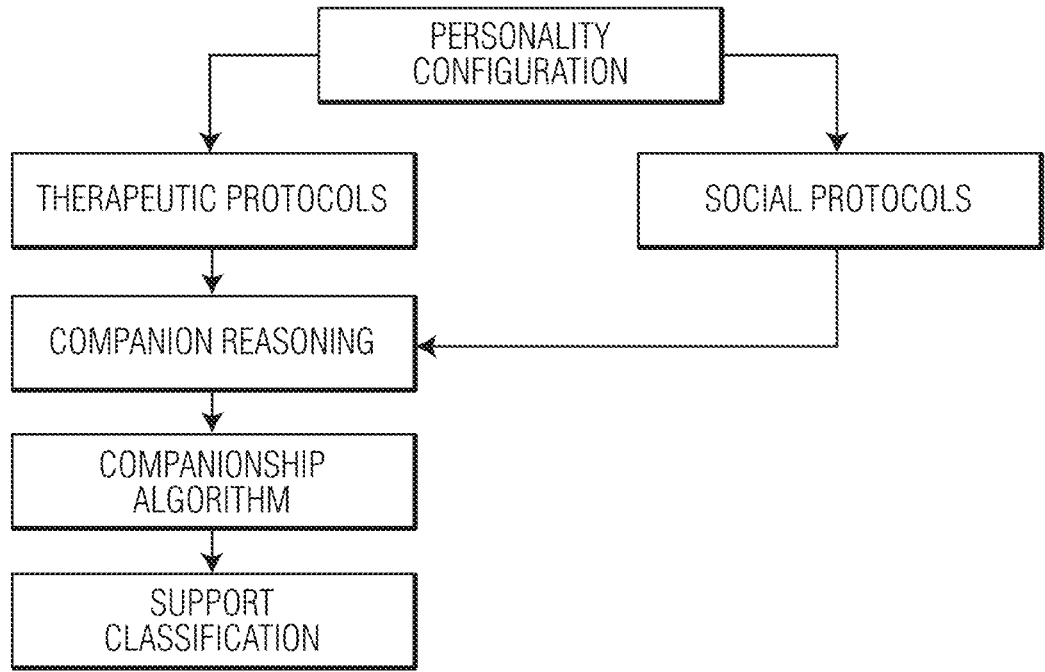
Figure 10E:
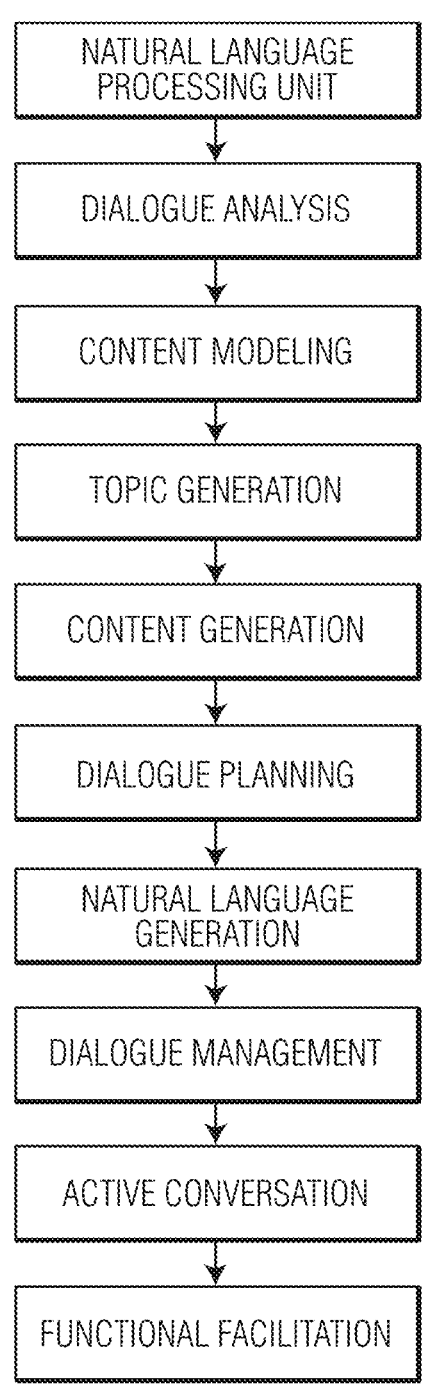
Figure 10F:
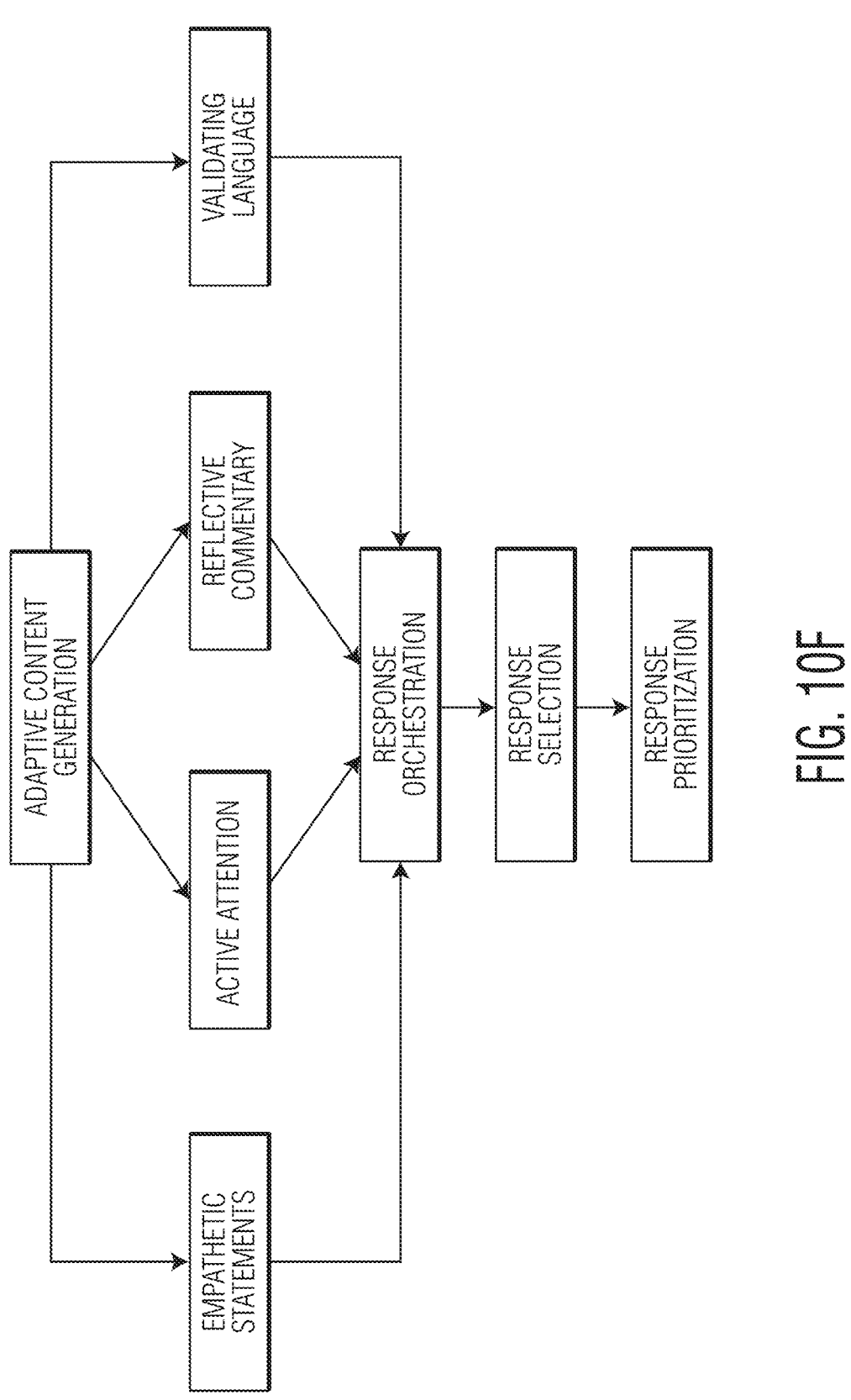
Figure 10G:
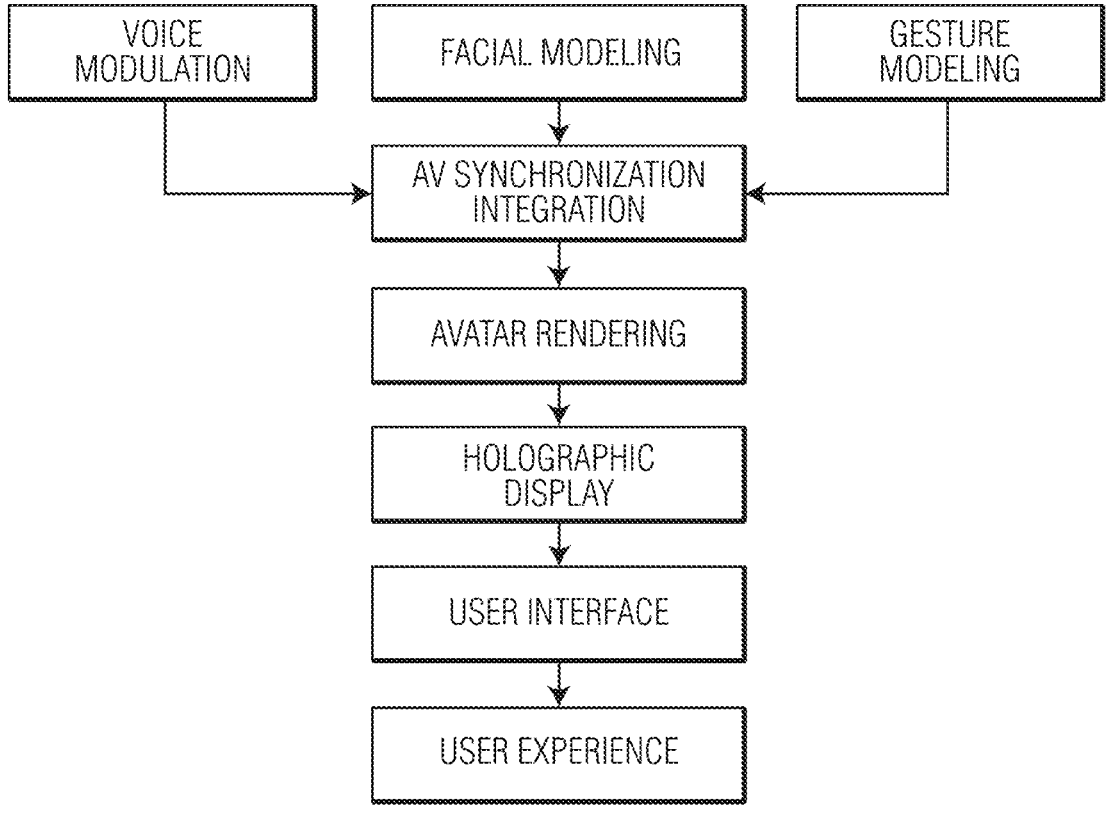
Figure 10H:
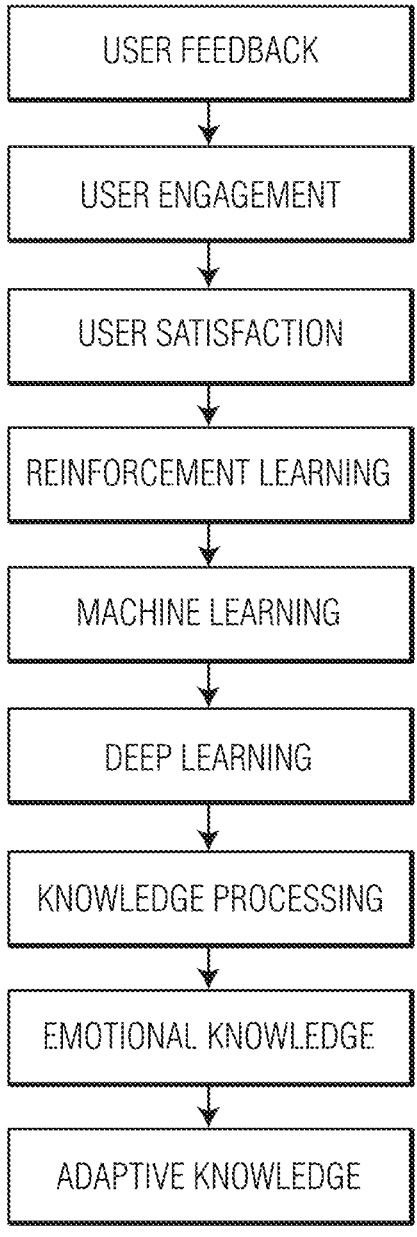

FIG. 9 is a block diagram illustrating avatar empathy module 146, according to example embodiments. As discussed above, avatar empathy module 146 may be configured to enable an AI generated avatar to function as an empathic companion. Avatar empathy module 146 may include emotion-adaptive conversational engine 902, memory-based interaction framework 904, multimodal sentiment detection pipeline 906, emotion-responsive avatar interface 908, behavioral pattern recognition module 910, integration module 912, and security module 914. In some embodiments, avatar empathy module 146 may be configured to operate on one or more edge components with one or more on-device models configured to analyze a user's emotion based on one or more of arousal, valence, dominance, confidence, pitch, energy, facial actions, gestures, or the like. Avatar empathy module 146 may be configured to generate an uncertainty score of the analysis of the user's emotion.

Each of emotion-adaptive conversational engine 902, memory-based interaction framework 904, multimodal sentiment detection pipeline 906, emotion-responsive avatar interface 908, behavioral pattern recognition module 910, integration module 912, and security module 914 may include one or more software modules. The one or more software modules may be collections of code, or instructions stored on a media (e.g., memory of server system 104) that represent a series of machine instructions (e.g., program code) that implements one or more algorithmic steps. The machine instructions may be the actual computer code the processor of server system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Emotion-adaptive conversational engine 902 may be configured to perform natural language understanding functionality on input directed towards the avatar. For example, based on audio or text input, emotion-adaptive conversational engine 902 may be configured to perform natural language understanding and sentiment analysis to determine a current emotional state or sentiment of the individual or avatar interacting with a given avatar. In some embodiments, emotion-adaptive conversational engine 902 may adapt the tone of the avatar's response based on the mood of the individual or other avatar it is interacting with. In some embodiments, emotion-adaptive conversational engine 902 may be based on a personality configuration of the user associated with a given avatar. For example, the personality configuration may include one or more of therapeutic protocols or social protocols which correspond to the personality of the user. Emotion-adaptive conversational engine 902 may base the avatar algorithm for reasoning at least on one or more of the therapeutic protocols or the social protocols to provide an empathic avatar companion which closely resembles the user and their personality. Emotion-adaptive conversational engine 902 may be configured to facilitate orchestrating a response in a conversation using empathic statements based on an analysis of the dialogue and/or facial expressions received of the input towards the avatar. The analysis and response generation may be done in real-time by one or more of active attention, reflective commentary, or dialogue planning to provide an active conversation approximating a normal conversation speed.

Memory-based interaction framework 904 may enable avatar system 116 to retain key data points from previous interactions with a given target, whether the target be a user or another avatar. For example, based on the information received via or determined by emotion-adaptive conversational engine 902, memory-based interaction framework 904 may update user profiles with detected emotional patterns and preferences, such that that avatar can recall those emotional patterns and/or preferences in subsequent conversations. Through this process, avatar empathy module 146 allows for memory-driven emotional learning and contextual recall.

Multimodal sentiment detection pipeline 906 may be configured to determine a sentiment of a target (e.g., user or other avatar) across multiple different data modalities (e.g., text, image, audio, video, etc.). In some embodiments, multimodal sentiment detection pipeline 906 may utilize one or more computer vision APIs to perform a facial expression analysis based on video or image data of a target. In some embodiments, multimodal sentiment detection pipeline 906 may be configured to analyze one or more of a voice tone, pace, or inflection based on received audio data. In some embodiments, multimodal sentiment detection pipeline 906 may be configured to determine a sentiment based on textual input using linguistic pattern techniques. Through multimodal sentiment detection pipeline 906, avatar empathy module 146 can implement a multimodal emotional recognition technique in which multiple data modalities, such as voice, image (e.g., facial), and text, can be analyzed in conjunction to determine an emotion or sentiment of the target.

Emotion-responsive avatar interface 908 may be configured to generate outputs for the avatar. In some embodiments, the output generated by emotion-responsive avatar interface 908 may be used by avatar system 116 to adjust the output of output generation module 124 in real-time or near real-time. In some embodiments, emotion-responsive avatar interface 908 may be configured to generate 3D rendered avatars projected via AR/VR/XR or holographic displays. In some embodiments, emotion-responsive avatar interface 908 may be configured to control the facial animations and/or gestures of an avatar to account for or react to the determined sentiment of its target. By providing responses to the target in the form of an avatar that conveys emotional responses, the target can interact with a holographic, human-like presence with real expressions.

Emotion-responsive avatar interface 908 may be configured to generate a response using voice modulation, facial modeling, and gesture modeling based on the perceived emotion of the target. Once the response is generated, the avatar may be rendered and displayed via the target's user interface. The target may provide feedback on their experience with the avatar. Emotion-responsive avatar interface 908 may use machine learning module 132 to further train the avatar empathy module 146 based on the feedback of the target. In some embodiments, machine learning module 132 may use one or more of reinforcement learning, machine learning, or deep learning to further fine-tune avatar empathy module 146. In some embodiments, machine learning module 132 may improve the emotional knowledge of avatar empathy module 146 using the target feedback.

Behavioral pattern recognition module 910 may be configured to detect recurring distress signals or escalating emotional changes in the target. In some embodiments, based on the detected recurring distress signals or escalating emotional changes in the target, behavioral pattern recognition module 910 may be configured to suggest mindfulness exercises or notify caregivers if authorized.

Integration module 912 may be configured to integrate avatar empathy module 146 with external calendars, smart home devices, or medication trackers for purposes of obtaining further information for a given target. In some embodiments, integration module 912 may be configured to integrate avatar empathy module 146 in one or more external devices, such as mobile devices, AR glasses, VR headsets, or desktop computers.

Security module 914 may be configured to ensure that the data of the target that is obtained and analyzed is safely secured. For example, security module 914 may be configured to use on-device encryption to encrypt the information obtained from the target and the outputs generated by the system. In some embodiments, security module 914 may implement federated learning to ensure that the underlying avatar model is trained independently from other avatars. In some embodiments, security module 914 may implement data handling techniques that are HIPAA compliant. In some embodiments, security module 914 may optionally store memory logs onto a blockchain for verifiable trust. In some embodiments, security module 914 may include redacting sensitive information. Security module 914 may be configured to identify sensitive information by analyzing the model input and/or output by inference in a secure enclave. Security module 914 may be configured to provide signed and queryable audit trails of the redactions performed. In some embodiments, security module 914 may use an allow list for clinical terminology, for example, while masking identifiers such that only what needs to be redacted is redacted. The audit logs may be hashed and inserted in a ledger and/or blockchain. In some embodiments, security module 914 may be configured to transmit a trusted execution environment attestation to show the trustworthiness of the redactions.

Exemplary workflows executed by avatar empathy module 146 are illustrated across FIGS. 10A-10H.

Figure 11:
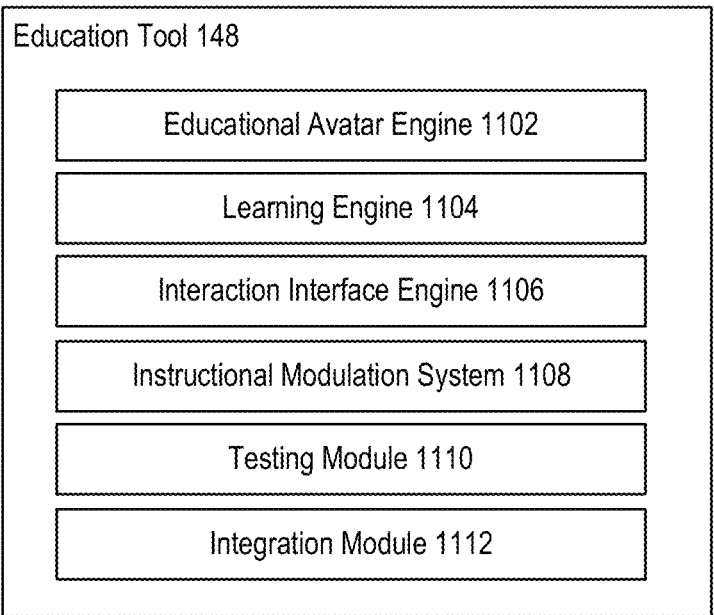
FIG. 11 is a block diagram illustrating education tool, according to example embodiments.
Figure 12A:
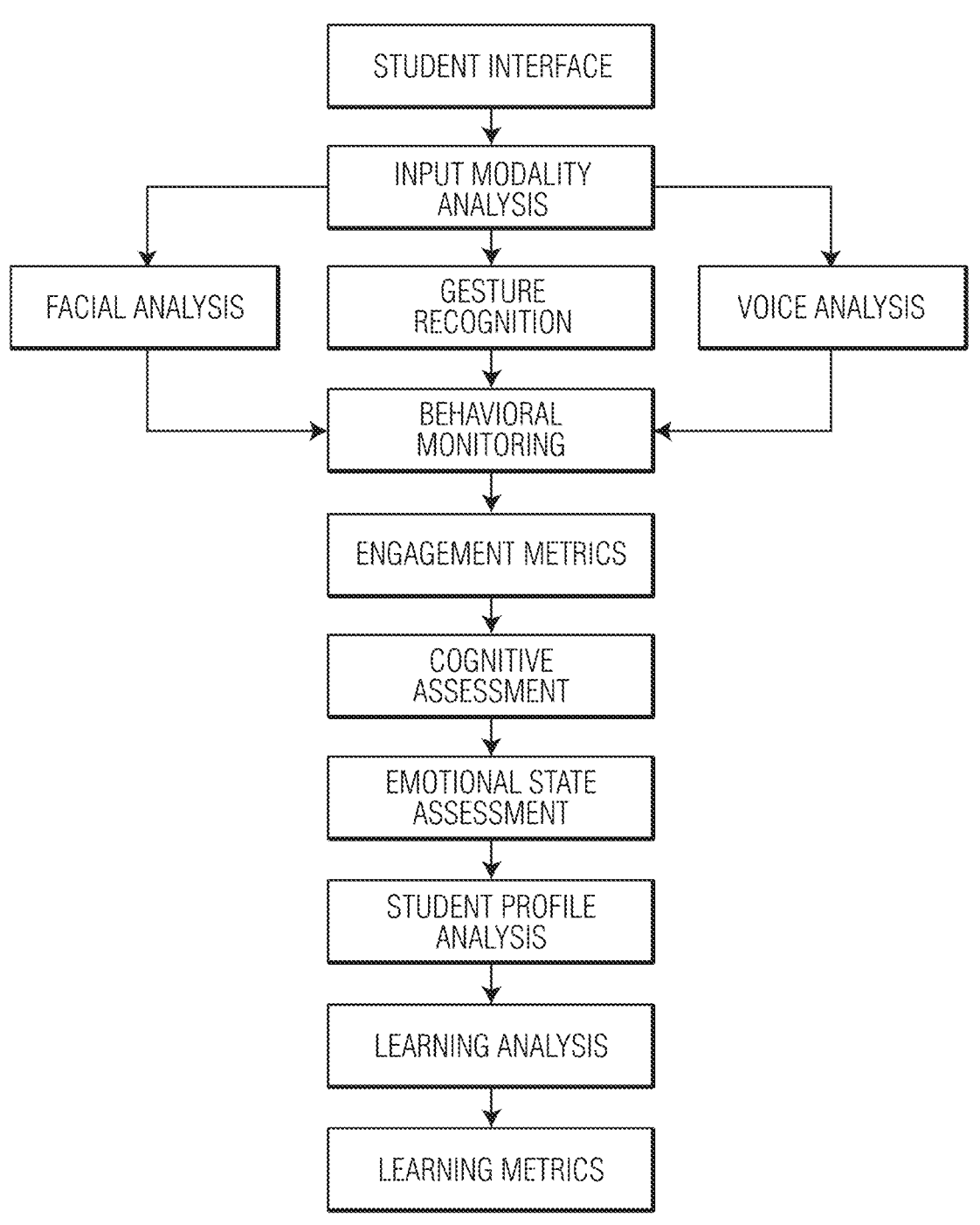
FIGS. 12A-12H illustrate exemplary workflows performed by education tool, according to example embodiments.
Figure 12B:
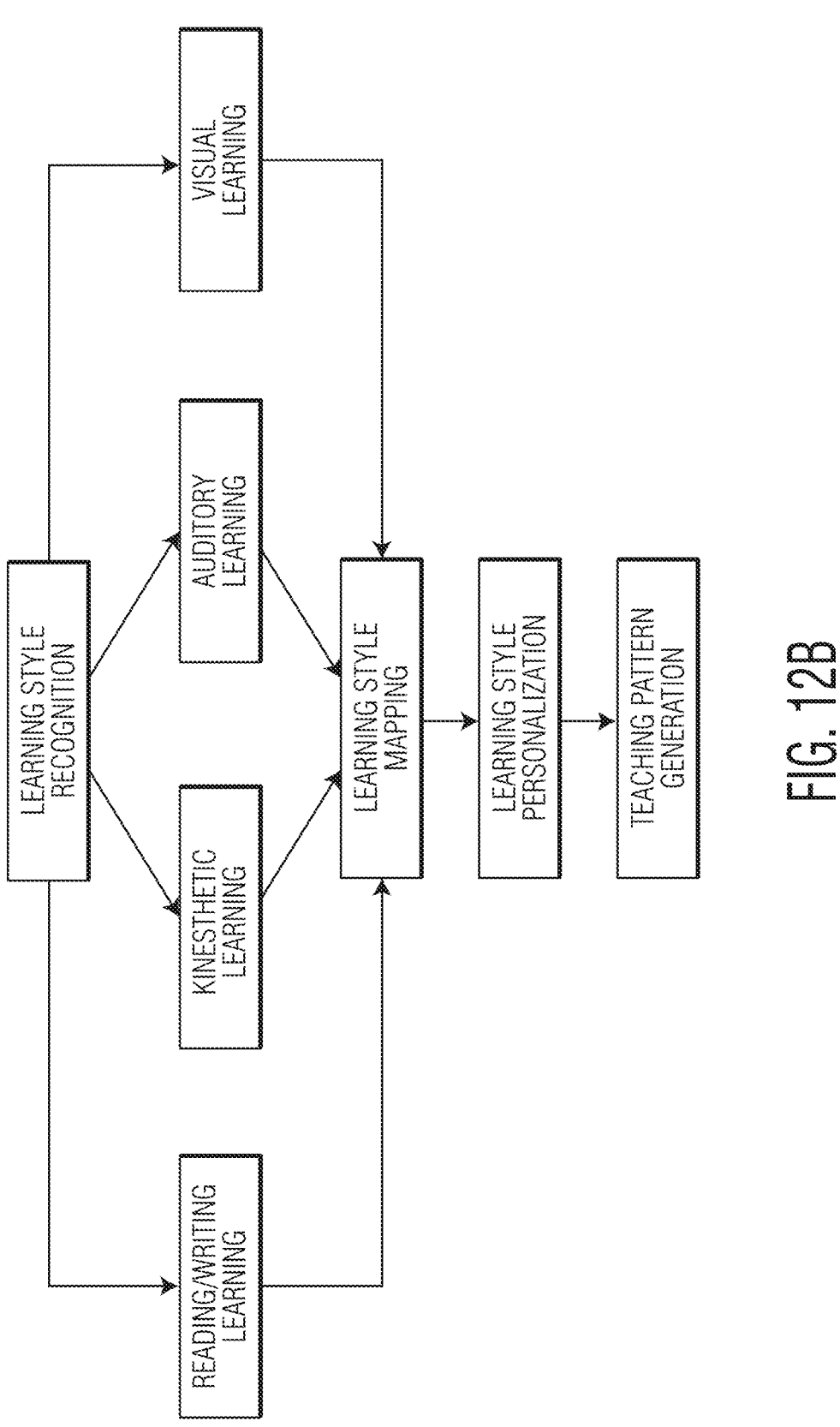
Figure 12C:
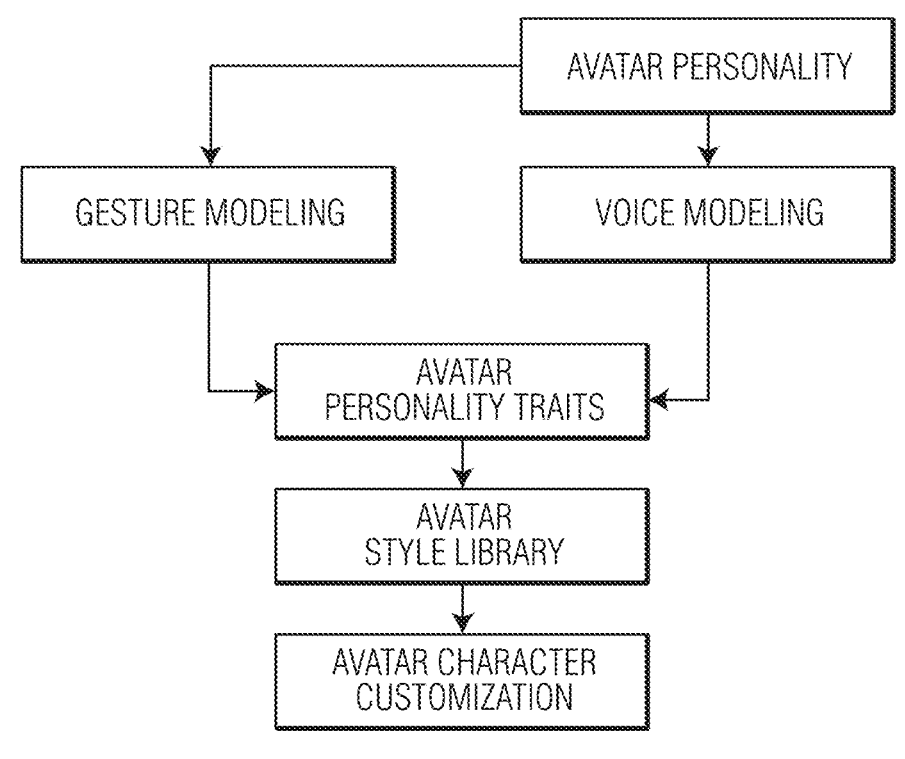
Figure 12D:
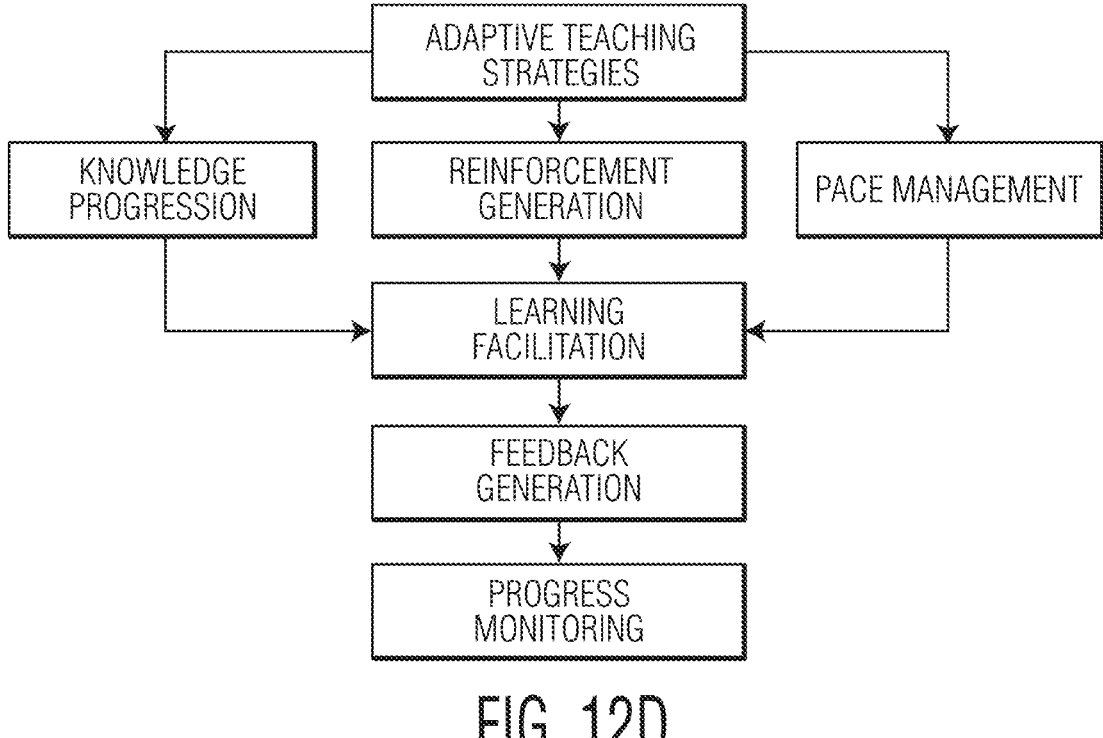
Figure 12E:
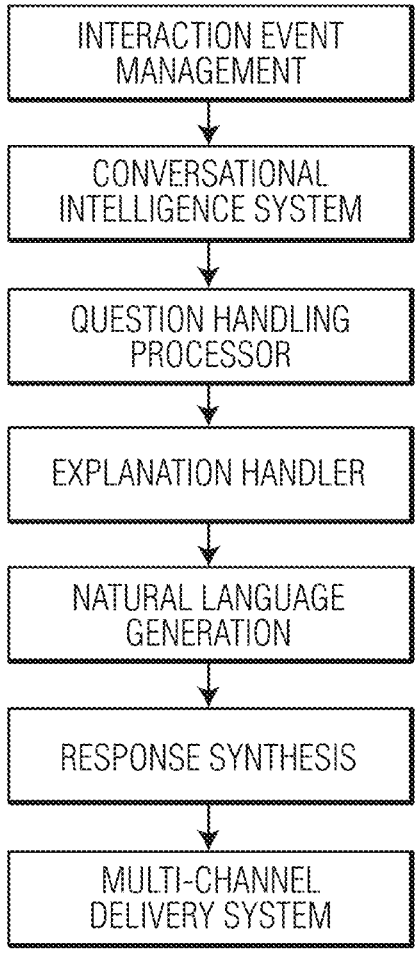
Figure 12F:
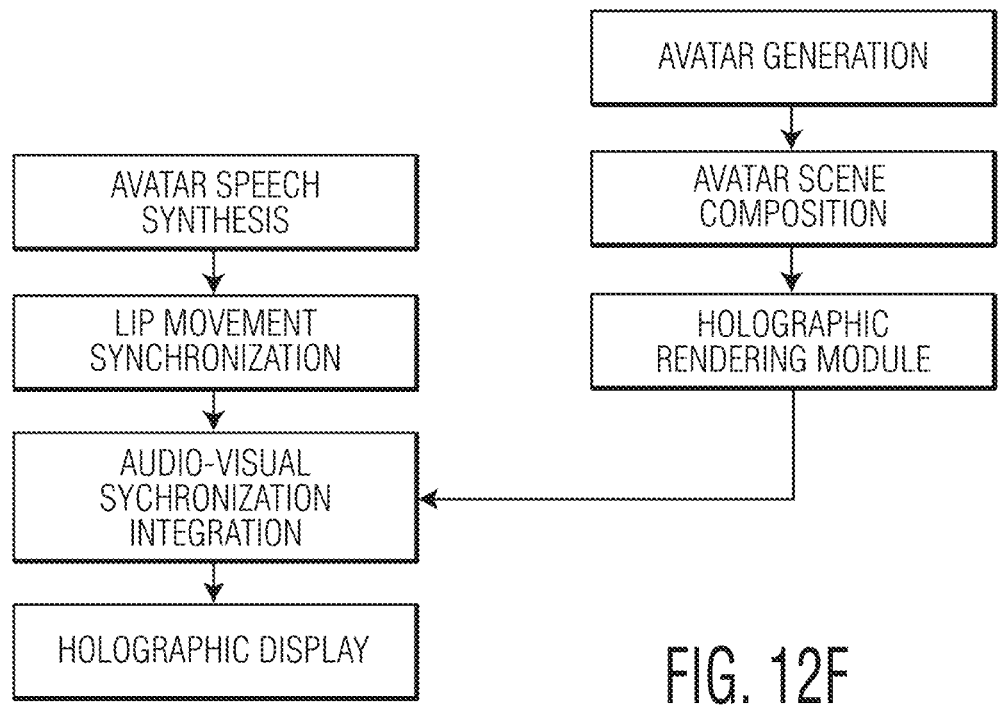
Figure 12G:
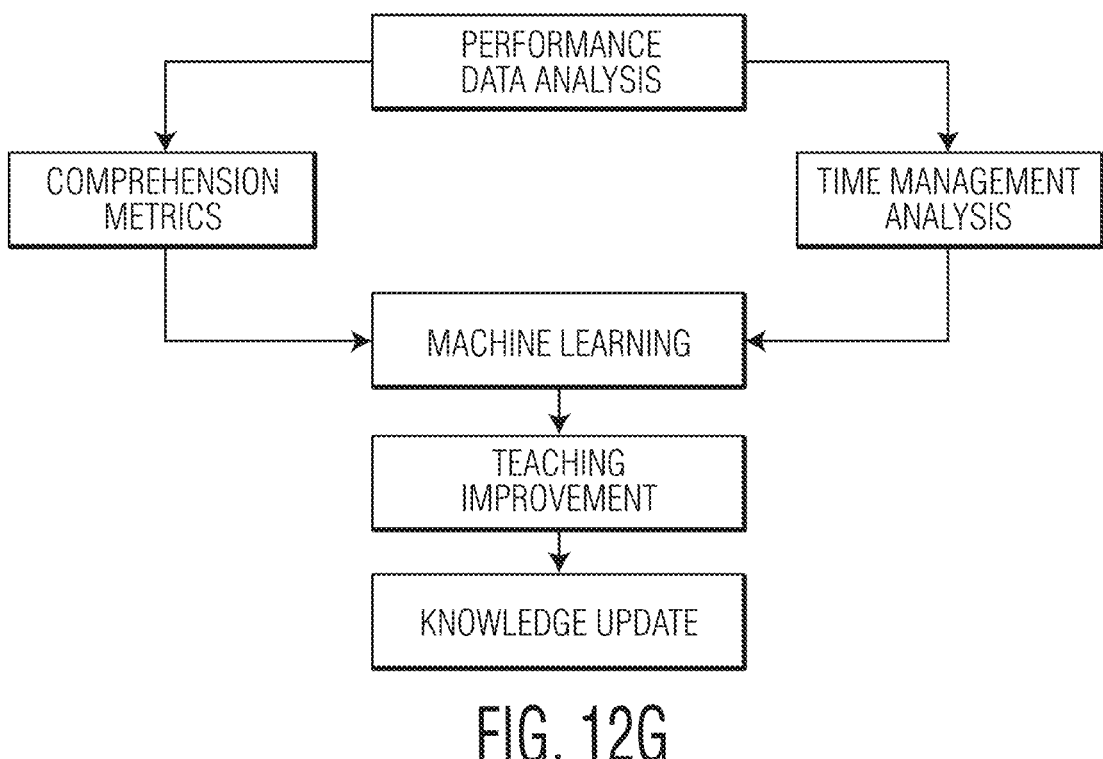
Figure 12H:
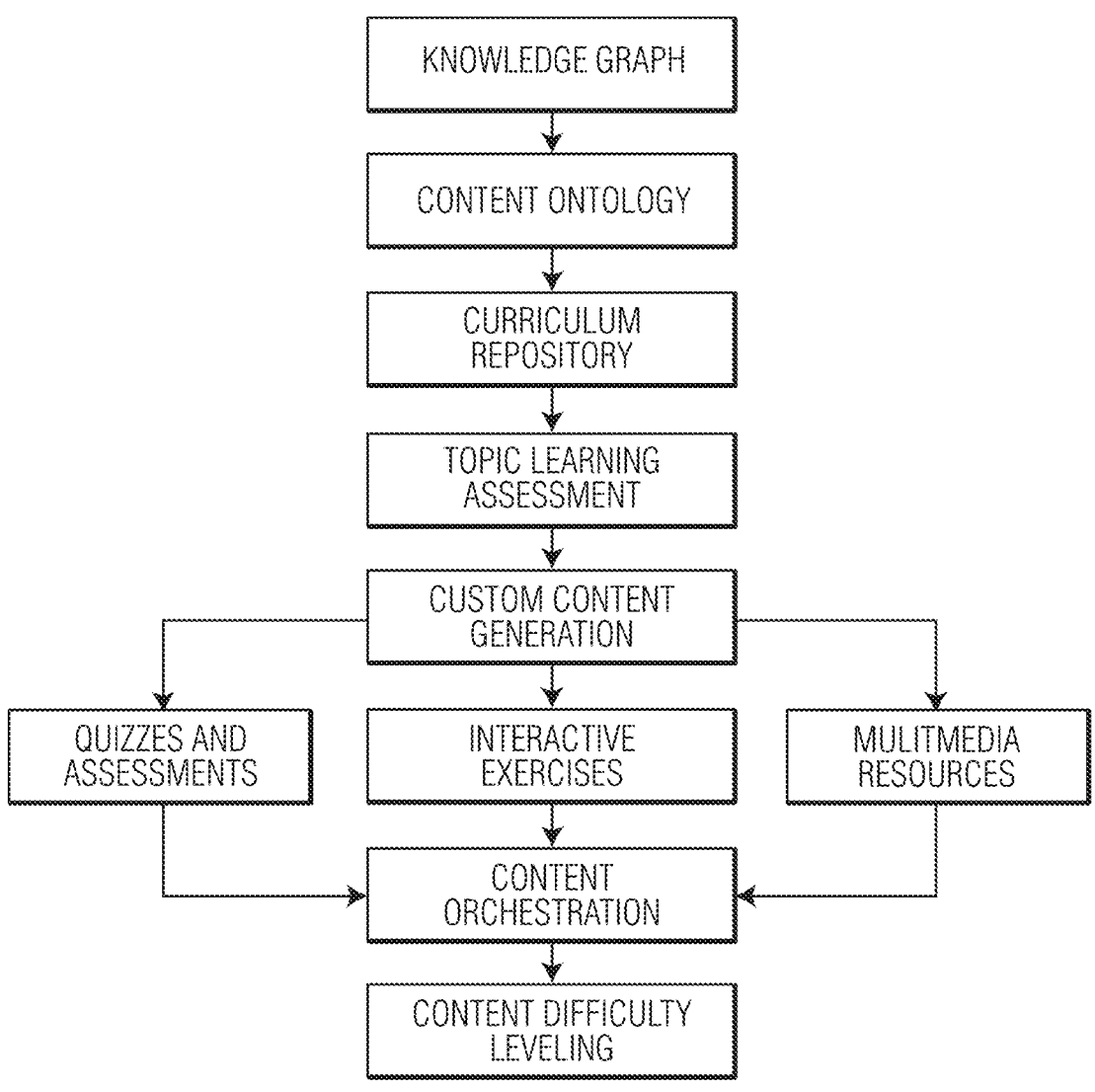

FIG. 11 is a block diagram illustrating education tool 148, according to example embodiments. Education tool 148 may include educational avatar engine 1102, learning engine 1104, interaction interface engine 1106, instructional modulation system 1108, testing module 1110, and integration module 1112.

Each of educational avatar engine 1102, learning engine 1104, interaction interface engine 1106, instructional modulation system 1108, testing module 1110, and integration module 1112 may include one or more software modules. The one or more software modules may be collections of code, or instructions stored on a media (e.g., memory of server system 104) that represent a series of machine instructions (e.g., program code) that implements one or more algorithmic steps. The machine instructions may be the actual computer code the processor of server system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Educational avatar engine 1102 may be configured to utilize one or more AI techniques to assess knowledge gaps and update lesson plans accordingly. For example, in operation, educational avatar engine 1102 may be configured to receive, as input, one or more lesson plans. Educational avatar engine 1102 may be configured to analyze those lesson plans using natural language processing techniques to identify gaps in a lesson plan. In some embodiments, educational avatar engine 1102 may be further configured to update lesson plans based on student feedback in the form of questions, test answers, quiz answers, and the like. For example, if on a given test, the majority of the class answered a question on a given topic incorrectly, educational avatar engine 1102 may identify that gap in knowledge and update the future lesson plan accordingly. In some embodiments, educational avatar engine 1102 may be configured to include various difficulty levels such that updates can be made according to a specified difficulty level.

Learning engine 1104 may be configured to generate a personalized learning loop based on student feedback. For example, learning engine 1104 may be configured to track user engagement, emotion, and performance. Based on the tracked user engagement, emotion, and performance, learning engine 1104 may be configured to adjust one or more of pacing, tone, or examples in the lesson plan for an individualized learning experience. In some embodiments, learning engine 1104 may be configured to recognize the learning style of a student. Based on student feedback on various teaching styles corresponding to one or more learning styles, learning engine 1104 may determine which learning style is best for the student. The various learning styles may include, for example, reading/writing learning, kinesthetic learning, auditory learning, visual learning, or the like. For example, if a student is not understanding a concept until a visual aid is shown, learning engine 1104 may determine that the student is likely a visual learner. Once a determination is made, learning engine 1104 may be configured to present the student with the teaching style best suited to their learning style.

Interaction interface engine 1106 may be configured to generate an avatar output. For example, interaction interface engine 1106 may be configured to project a lifelike 3D avatar using one or more of AR/VR/XR devices or holographic displays. Interaction interface engine 1106 may be configured to process questions, generate responses and/or explanations, and synthesize a response for the avatar to deliver. For example, interaction interface engine 1106 may be configured to interface with large language model 122 to process questions and generate responses. In some embodiments, interaction interface engine 1106 may be configured to interface with learning engine 1104 such that explanations that are generated may be consistent with the student's learning style. Interaction interface engine 1106 may be configured to interface with output generation module 124 to generate a synchronized avatar response with the synthesized response and selected gestures. The synchronized avatar response may be rendered and displayed on the student's device. Interaction interface engine 1106 may be configured to adjust one or more of the avatar's facial expressions, gestures, or real-time dialogue based on inferred feedback from the targets. For example, interaction interface engine 1106 may be configured to interface with empathy module 146 to adjust the avatar's facial expressions, gestures, or real-time dialogue.

Instructional modulation system 1108 may be configured to adjust the avatar's teaching style based on determined feedback from the targets (e.g., students). For example, instructional modulation system 1108 may be configured to analyze one or more of a student's vocal tone, eye movement, or posture via video and/or audio data. Exemplary emotions in this context may include frustration, confusion, and enthusiasm. Based on a determined or inferred emotion or sentiment of the student, instructional modulation system 1108 may work in conjunction with interaction interface engine 1106 to adjust the teaching style conveyed by the avatar.

Testing module 1110 may be configured to generate various tests for the students. For example, testing module 1110 may allow students to take quizzes, receive hints to quizzes, and review their performance. Testing module 1110 may be configured to support various types of inputs, such as visual and audio.

Integration module 1112 may be configured to integrate the tutor avatar with one or more third party learning platforms. For example, integration module 1112 may be configured to synchronize with one or more of learning management systems, smartboards, or mobile learning applications. In some embodiments, integration module 1112 may support integration with various devices, such as AR glasses, tablets, and holographic projectors.

Exemplary workflows executed by education tool 148 are illustrated across FIGS. 12A-12H.

Figure 13:
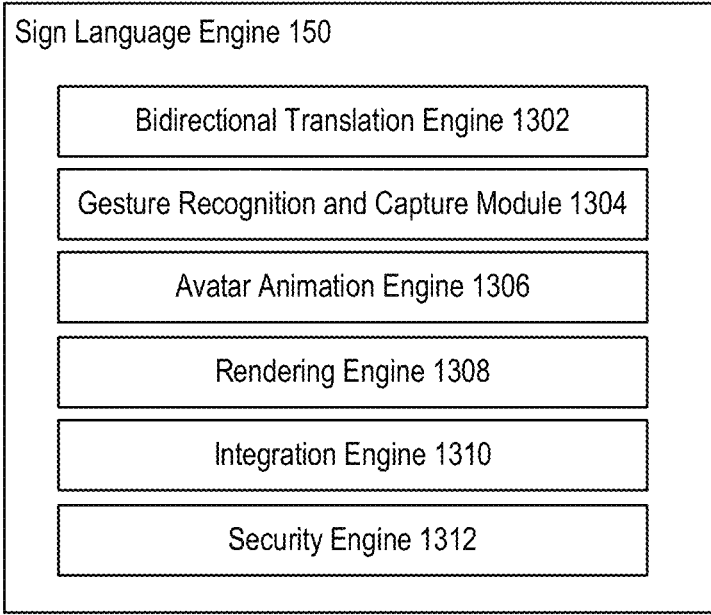
FIG. 13 is a block diagram illustrating sign language engine, according to example embodiments.
Figure 14A:
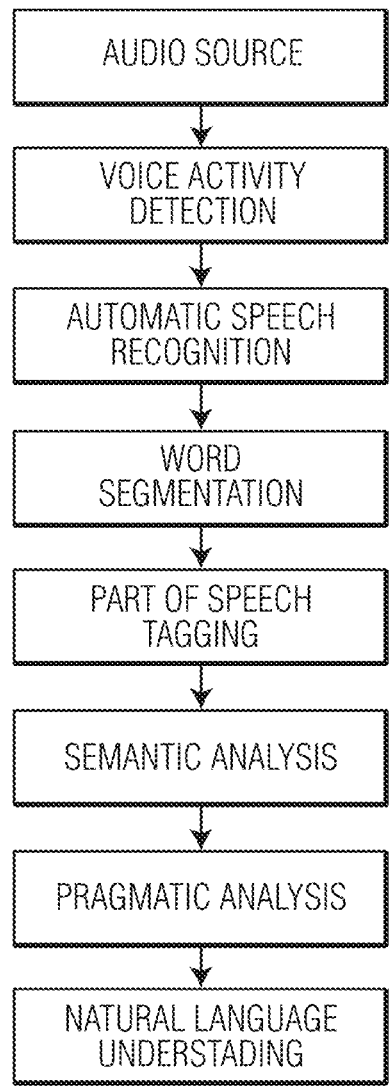
FIG. 14A-14I illustrate exemplary workflows performed using sign language engine, according to example embodiments.
Figure 14B:
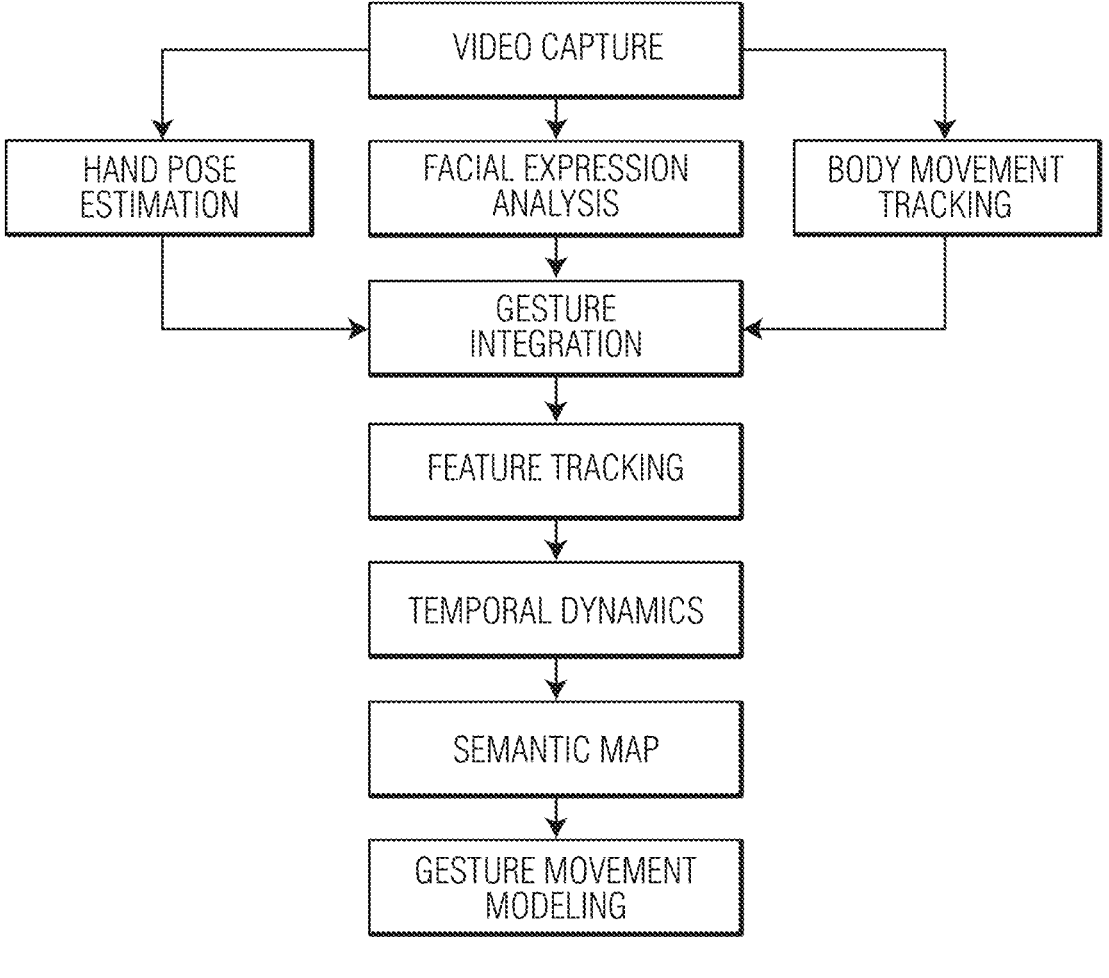
Figure 14C:
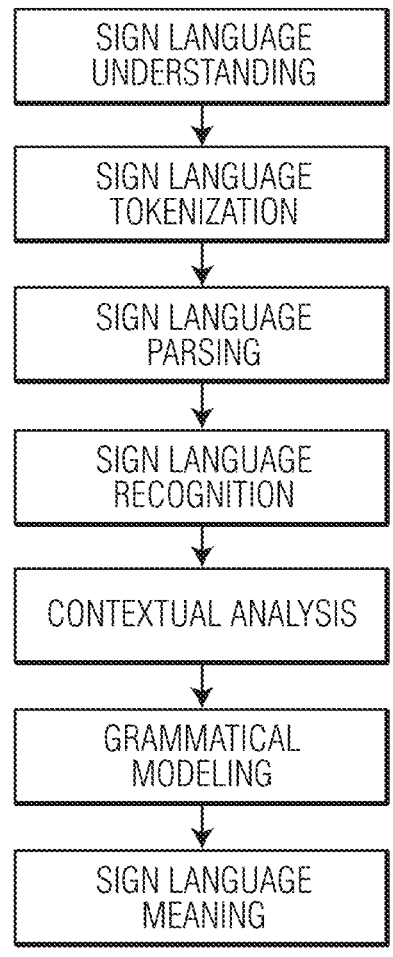
Figure 14D:
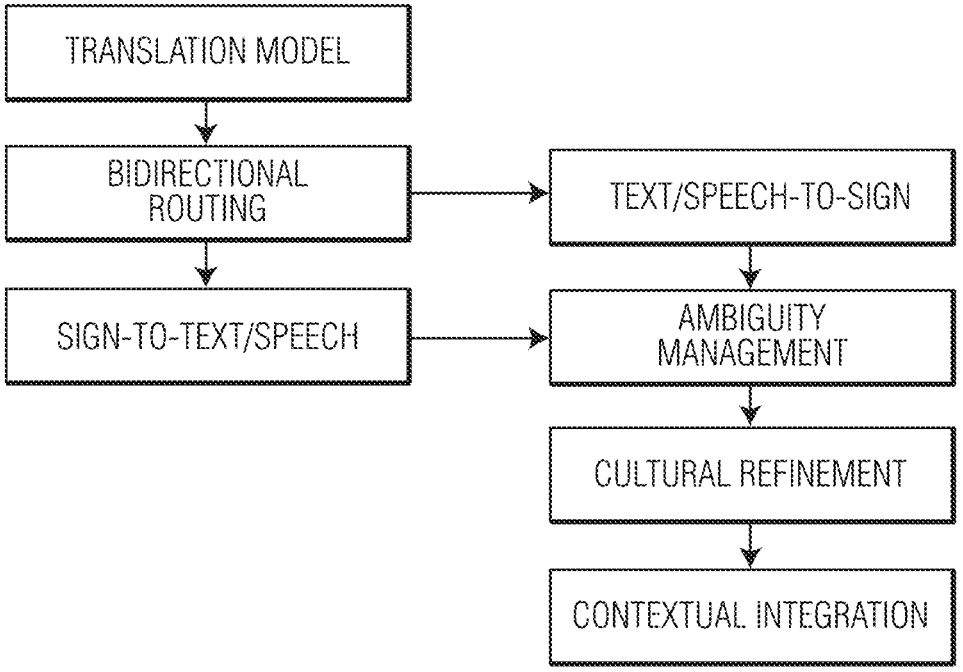
Figure 14E:
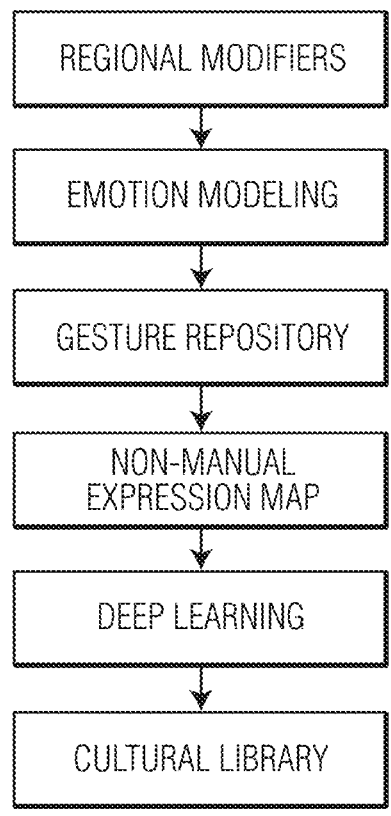
Figure 14F:
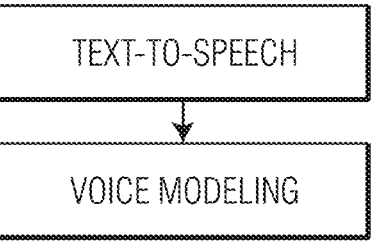
Figure 14F:
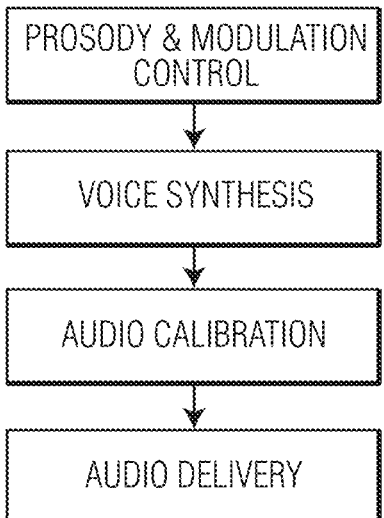
Figure 14G:
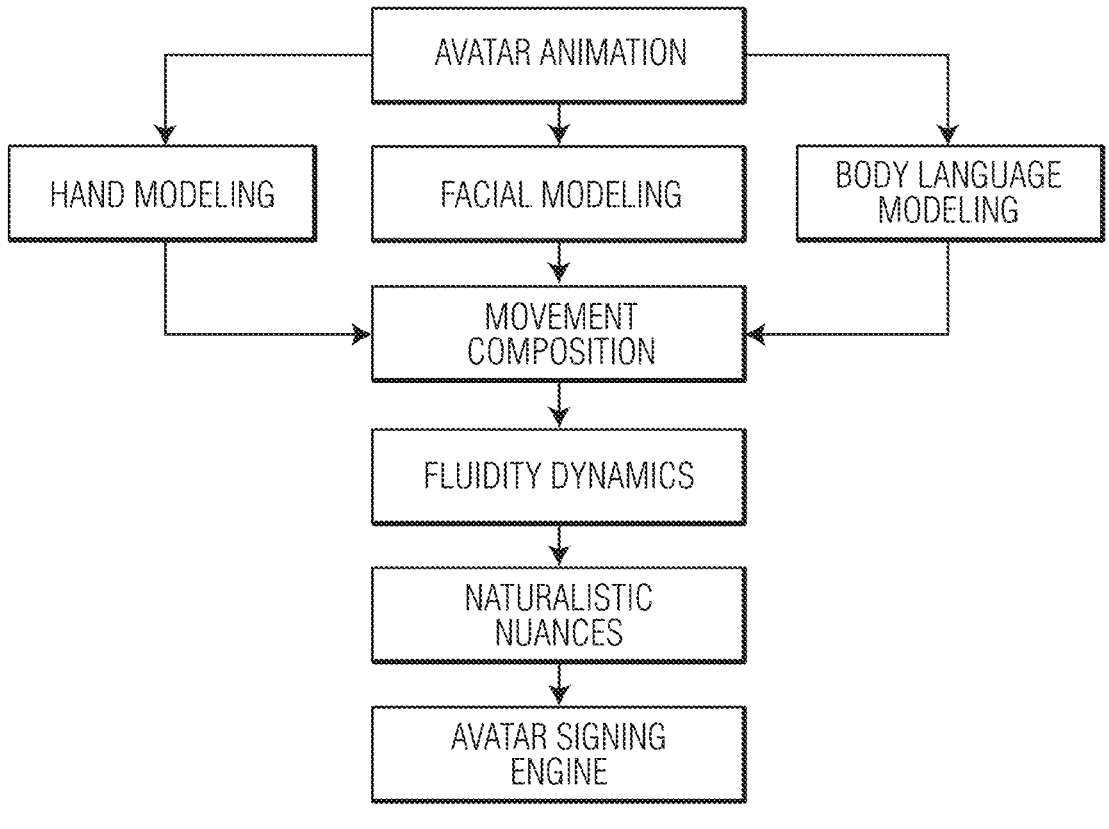
Figure 14H:
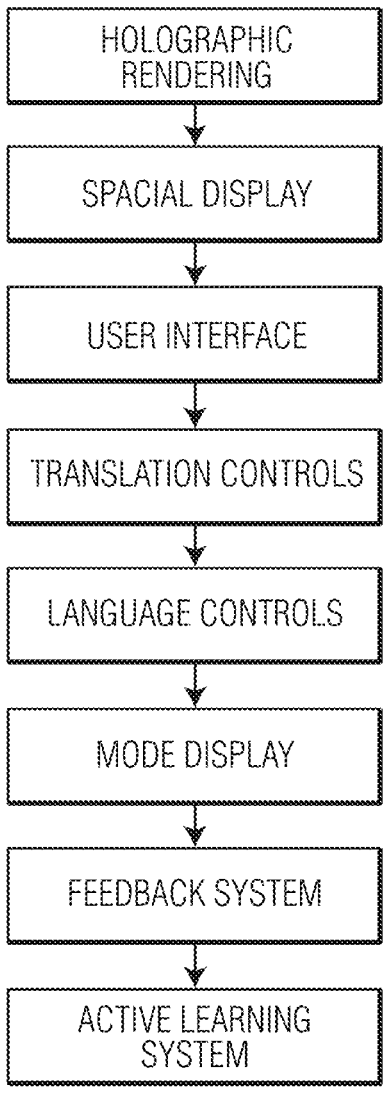
Figure 14I:
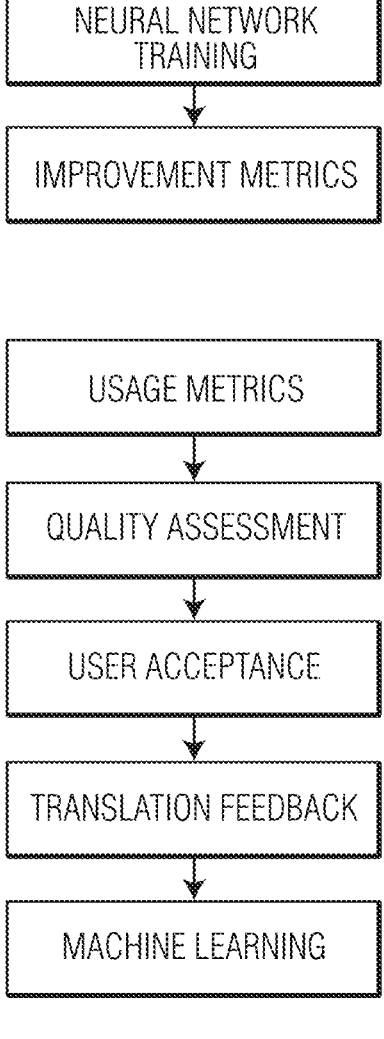
Figure 15A:
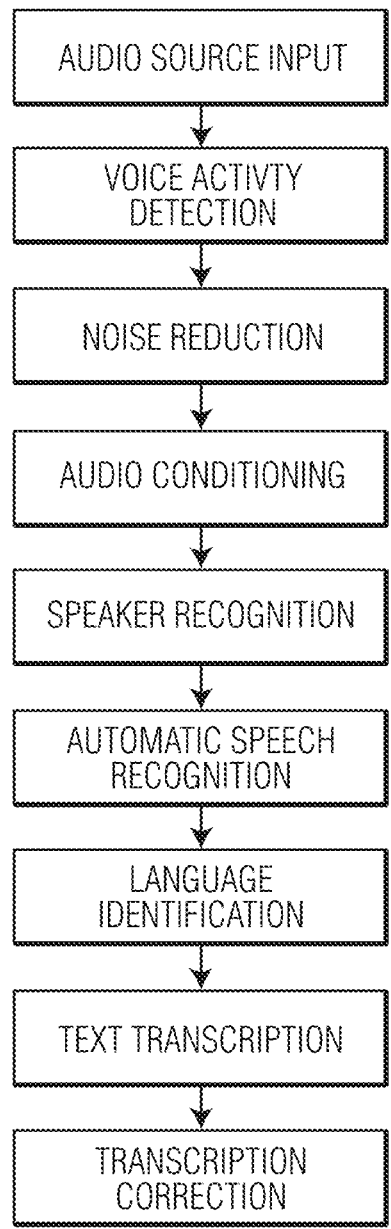
FIGS. 15A-15H illustrate exemplary workflows performed using translation module, according to example embodiments.
Figure 15B:
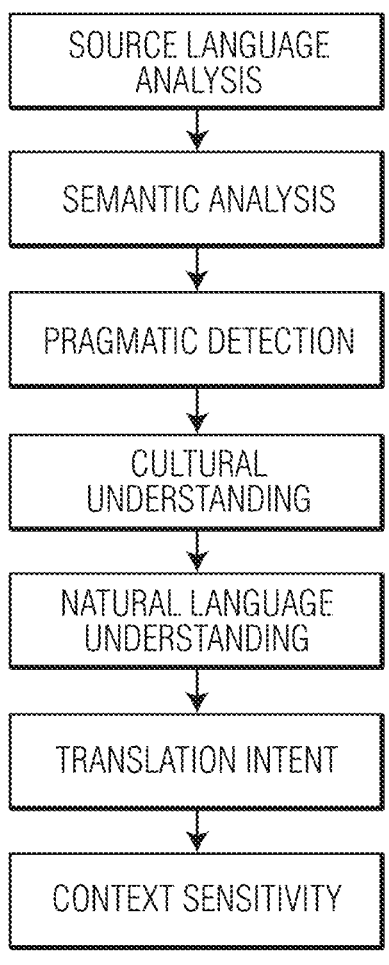
Figure 15C:
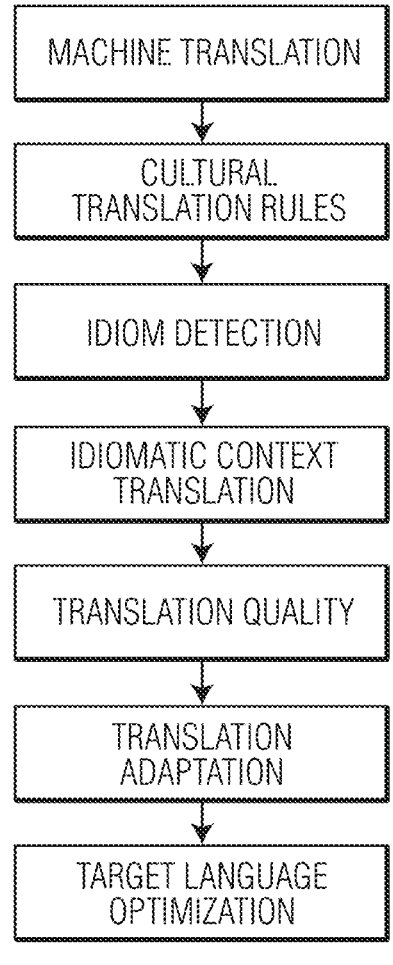
Figure 15D:
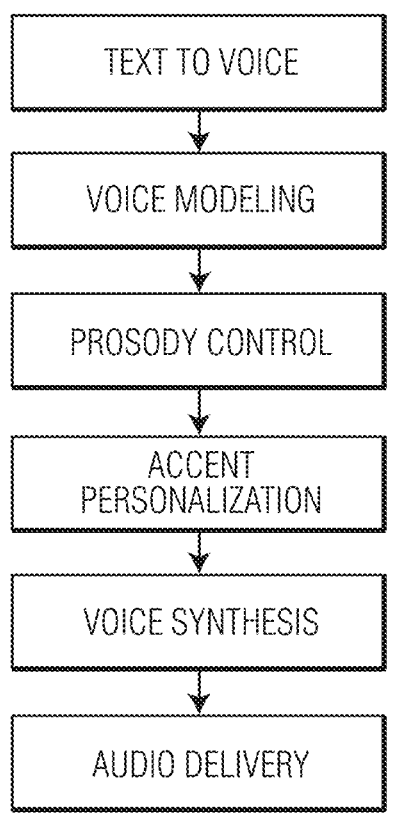
Figure 15E:
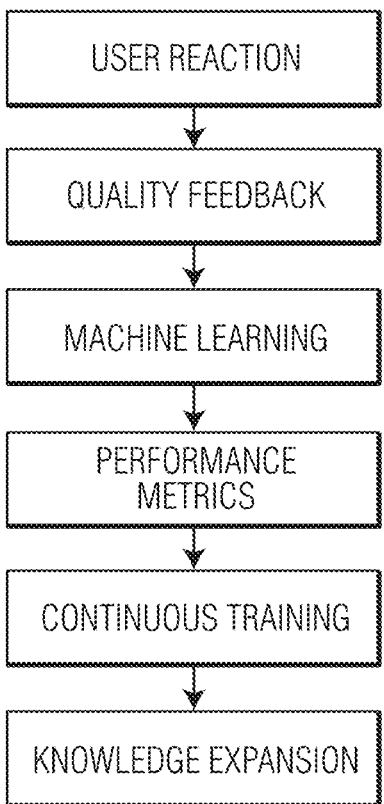
Figure 15F:
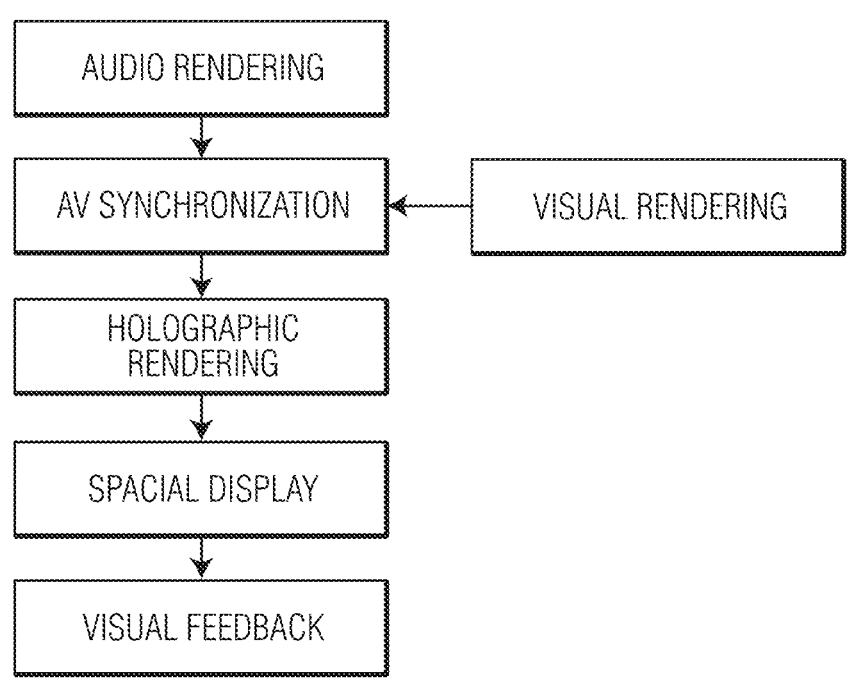
Figure 15G:
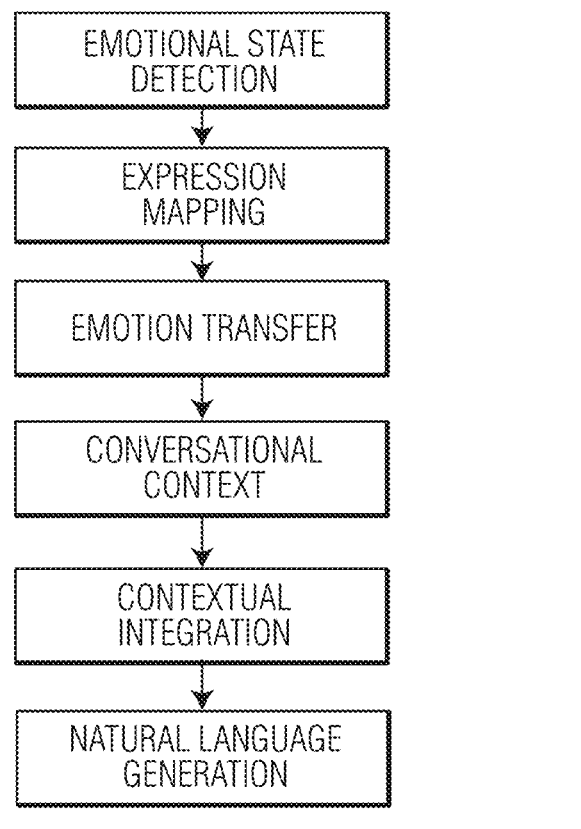
Figure 15H:
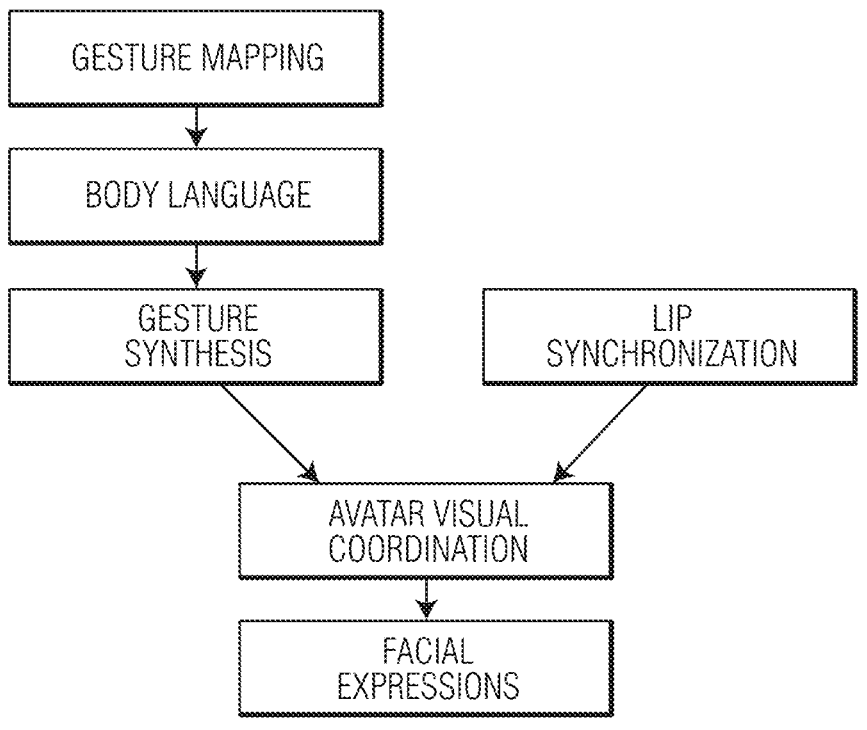

FIG. 13 is a block diagram illustrating sign language engine 150, according to example embodiments. Sign language engine 150 may include bidirectional translation engine 1302, gesture recognition and capture module 1304, avatar animation engine 1306, rendering engine 1308, integration engine 1310, and security engine 1312. In some embodiments, sign language engine 150 may be executed on one or more edge components with one or more on-device models configured to analyze one or more of a user's hand motions, facial actions, eye movements, brow movements, or the like.

Each of bidirectional translation engine 1302, gesture recognition and capture module 1304, avatar animation engine 1306, rendering engine 1308, integration engine 1310, and security engine 1312 may include one or more software modules. The one or more software modules may be collections of code, or instructions stored on a media (e.g., memory of server system 104) that represent a series of machine instructions (e.g., program code) that implements one or more algorithmic steps. The machine instructions may be the actual computer code the processor of server system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Bidirectional translation engine 1302 may be configured to convert received audible speech into sign language. Bidirectional translation engine 1302 may be configured to convert sign language into audible speech. In some embodiments, bidirectional translation engine 1302 may be configured to interface with large language model 122 and/or output generation module 124 to process received audible speech. Bidirectional translation engine 1302 may be configured to perform automatic speech recognition to process audible speech. The speech recognition may include word segmentation, part-of-speech analysis, semantic analysis, pragmatic analysis, and/or the like. In some embodiments, bidirectional translation engine 1302 may leverage one or more of natural language processing, speech-to-text, or gesture-to-text algorithms for the conversion processes. In some embodiments, bidirectional translation engine 1302 may be configured to analyze the generated translation for any ambiguities and determine which interpretation to use. For example, if received audible speech may be interpreted more than one way (e.g., there, their, or they're), bidirectional translation engine 1302 may analyze the context to determine which interpretation to use. In some embodiments, bidirectional translation engine 1302 may be configured to perform the translation based on a cultural background of the user.

Gesture recognition and capture module 1304 may be configured to capture and recognize gestures performed by a target (e.g., user or avatar). For example, gesture recognition and capture module 1304 may be configured to receive hand, facial, and/or body motion data by leveraging one or more cameras of user device 102. Gesture recognition and capture module 1304 may be configured to track features of the captured video, such as each of the fingers to identify which positions each of the fingers is in. As the order of words is important, gesture recognition and capture module 1304 may be configured to track the features along with the time such that each word signed by the user may be correctly interpreted within the proper context. Based on the captured video data, gesture recognition and capture module 1304 may interface with bidirectional translation engine 1302 to translate the identified sign language gestures into textual or spoken output.

Sign language engine 150 may include a tokenized set of sign language signs in order to recognize each sign performed by a user. Gesture recognition and capture module 1304 may be configured to parse the identified gestures and recognize which signs are being performed. Based on which signs are being performed by the user, gesture recognition and capture module 1304 may be configured to analyze the context of the signs. Bidirectional translation engine 1302 may be configured to translate the signs recognized by gesture recognition and capture module 1304 into text to be processed by large language model 122. Output generation module 124 may generate a response to the translated text. Bidirectional translation engine 1302 may be configured to translate the text response into one or more hand signs. Bidirectional translation engine 1302 may be configured to interface with avatar animation engine 1306 to generate an output corresponding to the one or more hand signs.

Avatar animation engine 1306 may be configured to generate output to be conveyed by the avatar. For example, avatar animation engine 1306 may be configured to animate the avatar so that the avatar displays or conveys grammatically correct sign language using realistic handshapes, timing, and expressions. Avatar animation engine 1306 may be configured to support various regional dialects such as, but not limited to, American Sign Language (ASL), British Sign Language (BSL), French Sign Language (LSF), and the like. Avatar animation engine 1306 may be configured to compose modeled hand movements, facial expressions, and body language gestures consistent with the generated response. In some embodiments, the composition may include ensuring fluidity of movement and gestures to provide a natural appearance.

Rendering engine 1308 may be configured to render the avatar, such that the avatar may express emotion via facial expressions and body posture. Such a process may enhance communication clarity and cultural appropriateness in sign. In some embodiments, rendering engine 1308 may be configured to interface with empathy module 146 to adjust the avatar's facial expressions and/or body posture.

Integration engine 1310 may be configured to integrate the avatar with various external systems. For example, integration engine 1310 may be configured to deploy the avatar in public spaces via kiosks or wearable devices (e.g., AR/VR/XR devices). Such an integration may enable accessibility to the avatar in real-world settings, including, but not limited to airports, banks, and classrooms. In some embodiments, integration engine 1310 may be configured to interface with a user interface such that a user may enter one or more of translation controls, language controls, avatar mode selections, feedback on the avatar, or the like. Sign language engine 150 may be configured to actively learn based on one or more of the selections entered by the user. In some embodiments, sign language engine 150 may be configured to learn based on metrics not entered by the user. For example, the metrics used by sign language engine 150 may include one or more of avatar usage metrics, an assessment of the quality of the avatar, acceptance of the avatar by the user, or such like. The metrics may be used to improve sign language engine 150 and/or avatar system 116 in generating avatars and their conversations.

Security engine 1312 may be configured to project sensitive information associated with training the avatar. For example, security engine 1312 may be configured to perform a federated learning process, such that the avatar is individually trained in isolation from other avatars. In some embodiments, security engine 1312 may enable on-device processing and anonymized logging on interactions.

Exemplary workflows executed by sign language engine 150 are illustrated across FIGS. 14A-14I.

Figure 17:
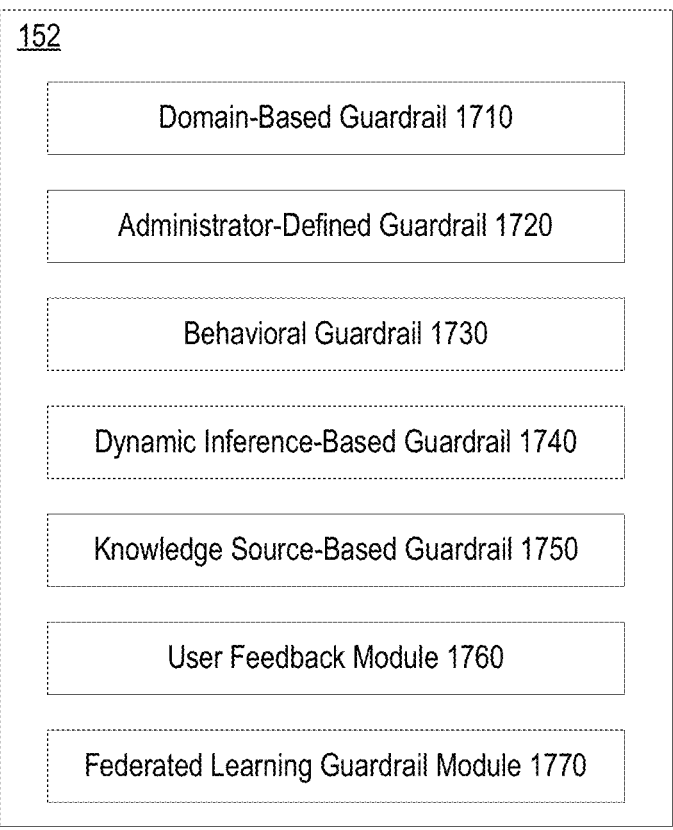
FIG. 17 is a block diagram illustrating guardrail module, according to example embodiments.

FIG. 17 is a block diagram illustrating guardrail module 152, according to example embodiments. Guardrail module 152 may include one or more of a domain-based guardrail 1710, an administrator-defined guardrail 1720, a behavioral guardrail 1730, a dynamic inference-based guardrail 1740, a knowledge source-based guardrail 1750, a user feedback module 1760, or a federated learning guardrail module 1770. Each of domain-based guardrail 1710, administrator-defined guardrail 1720, behavioral guardrail 1730, dynamic inference-based guardrail 1740, and knowledge source-based guardrail 1750 may include one or more software modules. The one or more software modules may be collections of code, or instructions stored on a media (e.g., memory of server system 104) that represent a series of machine instructions (e.g., program code) that implements one or more algorithmic steps. The machine instructions may be the actual computer code the processor of server system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions. In some embodiments, the guardrails may be defined for each session. For example, if a domain guardrail is specified for a first session with the avatar, the domain guardrail may not be pre-selected for the second session such that a guardrail may need to be selected if desired. Guardrail module 152 may be configured to deflect out-of-scope queries. Guardrail module 152 may be configured to classify prompts to detect the out-of-scope prompts/queries. In some embodiments, guardrail module 152 may be configured to adapt its detection based on user feedback.

Domain-based guardrail 1710 may be configured to limit large language model 122 to only respond to questions within a defined subject area. Domain-based guardrail 1710 may use one or more of domain-specific prompt engineering or fine-tuning, restricting access to retrieval-augmented generation (RAG) sources to relevant documents, or classifiers to detect out-of-domain queries in order to limit large language model 122. Queries detected as being out-of-domain may be deflected in order to prevent out-of-domain responses. For example, an avatar trained on HR policies may be prevented from answering queries about legal compliance beyond employment law.

Administrator-defined guardrail 1720 may be configured to allow administrators of the avatar to define one or more of topics, intents, or vocabularies that the avatar should focus on or avoid. The administrator may input one or more of a topic whitelist, a topic blacklist, allowed intents, or persona alignment. The allowed intents may include one or more of answer the prompt, deflect the prompt, escalate the prompt, or the like. Administrator-defined guardrail 1720 may use one or more lightweight natural language processor classifiers to route queries. The persona may be aligned based on one or more of tone, level or detail, or the like. Administrator-defined guardrail 1720 may provide one or more dashboards for defining scope or persona behavior. For example, administrator-defined guardrail 1720 may be the following prompt: "Only answer questions about our internal product roadmap, not about market competitors." As another example, administrator-defined guardrail 1720 may be the following prompt: "Only answer questions about mental health, not orthopedics or weight loss."

Behavioral guardrail 1730 may be configured to enforce a set of characteristics regardless of input. The set of characteristics may include one or more of tone, depth, role-behavior, or the like. The behavioral guardrails may be pre-set or may be changed by a user with appropriate access. For example, behavioral guardrail 1730 may be based on persona as in the following examples: "Always act as a mid-level IT specialist explaining to a novice," or "Speak only in compliance-approved statements." As a further example, behavioral guardrail 1730 may be based on behavior as in the following examples: "Stay neutral and factual. Never offer legal advice, only policy summaries," or "Stay non-confrontational, even when antagonized. Remain helpful at all times."

Dynamic inference-based guardrail 1740 may be configured to determine in real-time whether a topic or question is in scope using probabilistic models or classifier gates. The probabilistic models may be configured to do an action based on a confidence threshold. Dynamic inference-based guardrail 1740 may include fine-tuned classifiers to classify topics or questions as in-scope or out-of-scope. For example, dynamic inference-based guardrail 1740 may be instructed to escalate or deflect a question if the confidence that the question is in-scope is less than 80%. For example, if asked about financial forecasts, the avatar may detect it is a sensitive domain and say, "I'm not authorized to discuss financials, but I can direct you to our investor relations team." The classifiers may be further fine-tuned based on feedback for improvement on queries that were attempted but were out-of-scope.

Knowledge source-based guardrail 1750 may be configured to limit responses to pre-approved knowledge bases. The RAG pipeline may be limited to curated content such that large language model 122 may only use specified knowledge bases. In some embodiments, knowledge source-based guardrail 1750 may specify that no external web or general model memory may be used. For example, the avatar may be trained on onboarding documents and HR handbooks only.

User feedback module 1760 may be configured to receive user feedback and leverage the user feedback to iteratively improve or refine one or more guardrails of guardrail module 152. For example, user feedback module 1760 may be configured to tune one or more of domain-based guardrail 1710, administrator-defined guardrail 1720, behavioral guardrail 1730, dynamic inference-based guardrail 1740, or knowledge source-based guardrail 1750. Rather than relying solely on internal heuristics, manual evaluation, or automated logging to assess and adapt guardrail performance, user feedback module 1760 may be configured to capture explicit and/or implicit user feedback as a source of insight. Feedback can range from structured signals (e.g., thumbs-up/down, quality ratings, issue flagging) to inferred satisfaction metrics (e.g., prompt rephrasing, abandonment, escalation). The collected feedback may be used in multiple stages. For example, user feedback module 1760 may use the feedback in one or more of model alignment, adaptive guardrail weighting, personalized safety mechanisms, or feedback-driven retraining. Model alignment may include the aggregated feedback informing supervised fine-tuning of guardrail logic and policy enforcement rules. Adaptive guardrail weighting may include dynamically adjusting thresholds or prioritization of safety constraints in real-time based on the feedback. Personalized safety mechanisms may include supporting user-specific customization of boundaries and interventions based on feedback loops. Feedback-driven retraining may include periodic retraining cycles which may incorporate feedback datasets to adapt to evolving use cases or threats.

User feedback module 1760 may provide several benefits to avatar system 116. For example, incorporating user feedback may reduce manual overhead in maintaining safe and aligned behavior across different LLMs, enable rapid response to edge cases and novel failure modes, promote scalable deployment of nuanced guardrails tuned to real-world interaction patterns, and/or empower users as co-designers of model behavior and safety.

Federated learning guardrail module 1770 may be configured to utilize one or more of the guardrails of guardrail module 152 in the federated learning process for the avatar. In some embodiments, the federated learning may utilize the cloud. In some embodiments, the federated learning may utilize edge components. Federated learning guardrail module 1770 may be configured to use edge components in training local adapter weights during the federated learning process. In some embodiments, the adapters may be LoRA- or quantization-aware and may be configured to load on-device at runtime. Federated learning guardrail module 1770 may be configured to share differentially-private gradients via secure aggregation such that certain desired elements may remain private during the training of the base avatar model. For example, differentially private stochastic gradient descent may be utilized on the device for the data on the device before sending an update to federated learning guardrail module 1770 for aggregation in the cloud. In some embodiments, federated learning guardrail module 1770 may use one or more prompts to continuously train the model on the edge component and/or the base avatar model. Federated learning guardrail module 1770 may be configured to constrain the model behavior to specific domain-scoped RAG sources. For example, federated learning guardrail module 1770 may limit retrieval of information to whitelisted knowledge sources during both training and inference. In some embodiments, the RAG sources may be restricted based on one or more of the guardrails of guardrail module 152.

FIG. 18 is a block diagram illustrating lip-sync module 136, according to example embodiments. Lip-sync module 136 may include one or more of a patch generation module 1810, a phoneme prediction module 1820, a sprite layering module 1830, or a synchronization module 1840. Each of patch generation module 1810, phoneme prediction module 1820, sprite layering module 1830, and synchronization module 1840 may include one or more software modules. The one or more software modules may be collections of code, or instructions stored on a media (e.g., memory of server system 104) that represent a series of machine instructions (e.g., program code) that implements one or more algorithmic steps. The machine instructions may be the actual computer code the processor of server system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Patch generation module 1810 may be configured to generate a patch for avatar system 116. Patch generation module 1810 may be configured to generate a patch of an avatar's mouth for lip-sync module 136. Patch generation module 1810 may be configured to interface with pre-processing module 130 to receive an extracted mouth region from video information of the user captured by avatar capture module 112. The extracted mouth region may be correlated with audio captured of the user by avatar capture module 112. Patch generation module 1810 may configured to interface with machine learning module 132. Machine learning module 132 may be configured to train patch generation module 1810 on how a user's mouth region moves when they speak. In some embodiments, patch generation module 1810 may be trained on how the user's mouth region moves for various phonemes. For example, for some phonemes, the tongue may be used in articulating the phoneme. As a further example, a user's teeth may show more for certain phonemes than for other phonemes. Patch generation module 1810 may be configured to generate a patch based on the user's lip movement.

In some embodiments, patch generation module 1810 may be configured to generate lip motion using a micro-codec. The micro-codec may be a blendshape micro-codec. The patch of the mouth region may be a blendshape base which may be driven from audio using one or more blend-shape coefficients in real-time or near real-time. As an example, patch generation module 1810 may be configured to render a patch in less than about 10 ms. The one or more blendshape coefficients may be generated based on phoneme information of a generated avatar response. Using a micro-codec may provide adaptive streaming or storage of the patch with minimal overhead.

In some embodiments, patch generation module 1810 may be configured to generate lip motion using temporal diffusion. Patch generation module 1810 may include a tiny diffusion model. The tiny diffusion model may be trained on samples of the video and/or audio of the user. In some embodiments, the tiny diffusion model may be conditioned based on one or more of an identity embedding based on the face of the user, a phoneme embedding based on the voice of the user, a previous latent embedding for temporal coherence, or a noise schedule token to improve the tiny diffusion model. Patch generation module 1810 may be configured to interface with phoneme prediction module 1820 to receive a phoneme prediction. Patch generation module 1810 may be configured to execute diffusion steps to synthesize a patch based on predicted phonemes during runtime generation. This may provide a real-time or near-real time rendering of the patch. In some embodiments, the personalized tiny diffusion model one or more micro-movements to increase realism of the generated patch. For example, the one or more micro-movements may include moist lip speculars or teeth glints. The tiny diffusion model may provide a highly realistic and high quality patch for patch generation module 1810.

In some embodiments, patch generation module 1810 may be configured to generate lip motion using warp based on audio landmarks. One or more audio landmarks may be collected from the audio of the user processed by pre-processing module 130. Patch generation module 1810 may include a tiny transformer configured to predict landmarks based on audio predictions from phoneme prediction module 1820. In some embodiments, patch generation module 1810 may include a convolutional neural network configured to warp a mouth frame of the user based on the neutral lip texture and the target landmark configuration. The convolutional neural network may be configured to provide smooth transitions between the landmarks. In some embodiments, patch generation module 1810 may include a thin-plate spline configured to warp a mouth frame of the user based on the neutral lip texture and the target landmark set. In some embodiments, patch generation module 1810 may provide micro-expressions, such as lip corner micro-motions to improve realism. Patch generation module 1810 may be configured to interface with sprite layering module 1830 to add one or more sprite layers of the tongue and/or the teeth for open mouth frames. The open mouth frames may be determined based on the phoneme class. In some embodiments, the phonemes may be predicted by phoneme prediction module 1820.

In some embodiments, patch generation module 1810 may be configured to select a method of generating the patch based on one or more constraints, such as latency constraints, processing constraints, quality requirements, or the like.

Phoneme prediction module 1820 may be configured to predict phonemes of a generated avatar response. In some embodiments, phoneme prediction module 1820 may look at least one frame or frame group ahead to predict a future phoneme in a response generated by large language model 122. The prediction may enable patch generation module 1810 to quickly generate a patch to provide real-time or near real-time speech.

Sprite layering module 1830 may be configured to provide one or more sprite layers to patch generation module 1810. The one or more sprite layers may include extracted tongue and/or teeth sprites from open mouth frames. The sprite layers may be based on phoneme class. For example, phonemes of /th/ and /l/ may require a tongue sprite layer while phonemes of /sh/ and /ch/ may require a teeth sprite layer. In some embodiments, the sprite layers may be based on user video/audio information. This may provide a more personalized patch if a user shows teeth, for example, for more phonemes than an average person. In some embodiments, sprite layering module 1830 may be configured to provide different sprite layers based on the openness of the mouth. For example, if the openness of the mouth is above a certain threshold for a phoneme, a specific sprite layer may be used.

Synchronization module 1840 may be configured to synchronize the lips with the audio phonemes such that the lips may appear to move naturally during speech. In some embodiments, synchronization module 1840 may be configured to synchronize the generated patch with one or more motions of the underlying avatar. Synchronization module 1840 may be configured to interface with output generation module 124. Synchronization module 1840 may be configured to integrate the generated patch with the generated avatar. Synchronization module 1840 may be configured to match the skin tone of the patch with the skin tone of the avatar used by output generation module 124. In some embodiments, synchronization module 1840 may be configured to blend the edges of the patch to match the face of the avatar at the points of intersection between the patch and the face. In some embodiments, synchronization module 1840 may be configured to interface with shadow generation module 138. Synchronization module 1840 may be configured to use the shadow information to appropriately apply a shading correction to the patch. For example, if the avatar is in a shady environment, the patch should not appear that it is in full sun. The synchronization may provide improved realism in the speech and appearance of the avatar.

Figures 16A, 16B:
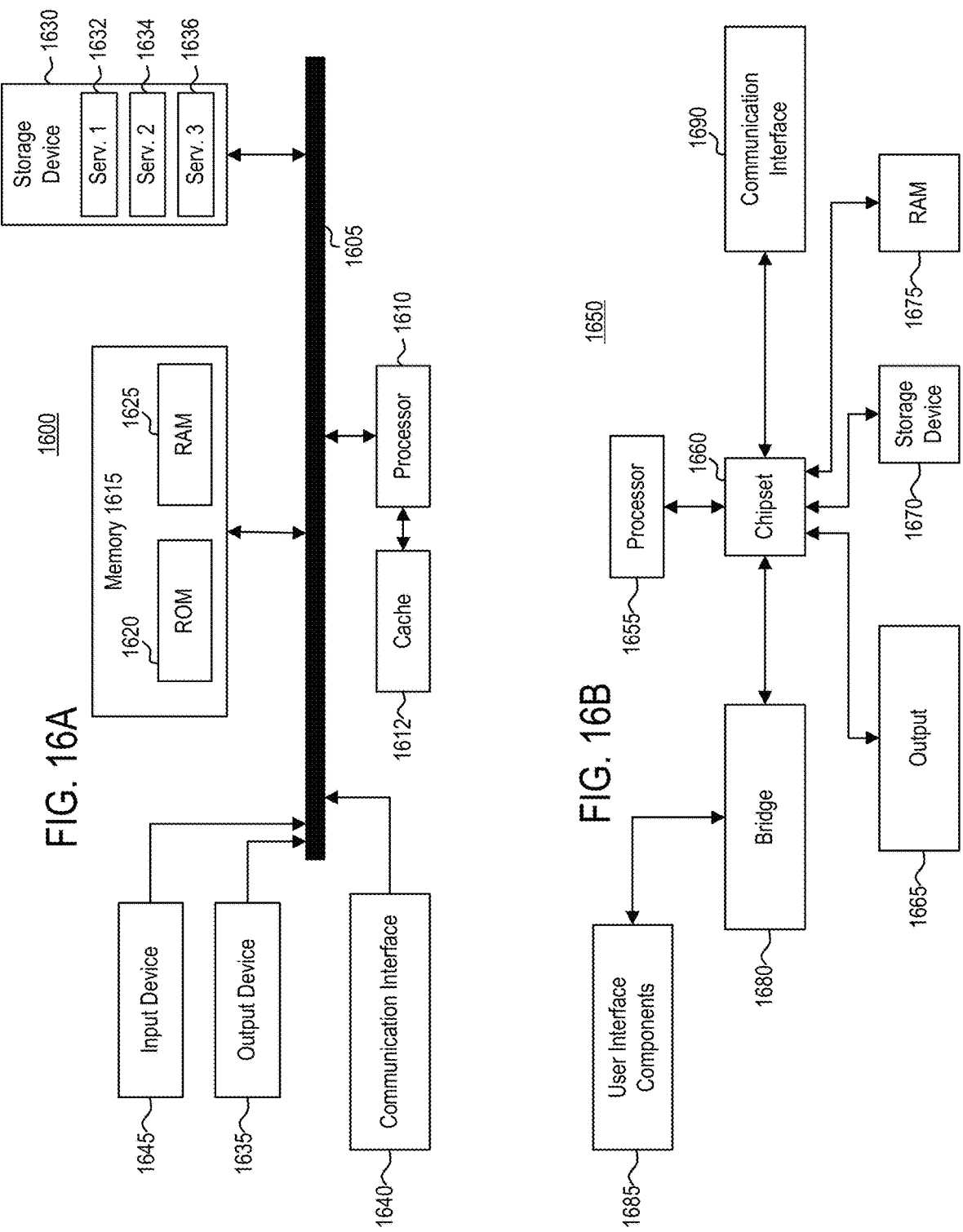
FIG. 16A is a block diagram illustrating a computing device, according to example embodiments of the present disclosure.
FIG. 16B is a block diagram illustrating a computing device, according to example embodiments of the present disclosure.

FIG. 16A illustrates a system bus architecture of computing system 1600, according to example embodiments. System 1600 may be representative of at least user device 102 or server system 104. One or more components of system 1600 may be in electrical communication with each other using a bus 1605. System 1600 may include a processing unit (CPU or processor) 1610 and a system bus 1605 that couples various system components including the system memory 1615, such as read only memory (ROM) 1620 and random-access memory (RAM) 1625, to processor 1610.

System 1600 may include a cache of high-speed memory connected directly with, in close proximity to, or integrated as part of processor 1610. System 1600 may copy data from memory 1615 and/or storage device 1630 to cache 1612 for quick access by processor 1610. In this way, cache 1612 may provide a performance boost that avoids processor 1610 delays while waiting for data. These and other modules may control or be configured to control processor 1610 to perform various actions. Other system memory 1615 may be available for use as well. Memory 1615 may include multiple different types of memory with different performance characteristics. Processor 1610 may include any general-purpose processor and a hardware module or software module, such as service 1 1632, service 2 1634, and service 3 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction with the computing system 1600, an input device 1645 may represent any number of input mechanisms, such as a microphone for speech, a touch-sensitive screen for gesture or graphical input, keyboard, mouse, motion input, speech and so forth. An output device 1635 may also be one or more of a number of output mechanisms known to those of skill in the art. In some instances, multimodal systems may enable a user to provide multiple types of input to communicate with computing system 1600. Communications interface 1640 may generally govern and manage the user input and system output. There is no restriction on operating on any particular hardware arrangement and therefore the basic features here may easily be substituted for improved hardware or firmware arrangements as they are developed.

Storage device 1630 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 1625, read only memory (ROM) 1620, and hybrids thereof.

Storage device 1630 may include services 1632, 1634, and 1636 for controlling the processor 1610. Other hardware or software modules are contemplated. Storage device 1630 may be connected to system bus 1605. In one aspect, a hardware module that performs a particular function may include the software component stored in a computer-readable medium in connection with the necessary hardware components, such as processor 1610, bus 1605, output device 1635 (e.g., display), and so forth, to carry out the function.

FIG. 16B illustrates a computer system 1650 having a chipset architecture that may represent user device 102 or server system 104. Computer system 1650 may be an example of computer hardware, software, and firmware that may be used to implement the disclosed technology. System 1650 may include a processor 1655, representative of any number of physically and/or logically distinct resources capable of executing software, firmware, and hardware configured to perform identified computations. Processor 1655 may communicate with a chipset 1660 that may control input to and output from processor 1655.

In this example, chipset 1660 outputs information to output 1665, such as a display, and may read and write information to storage device 1670, which may include magnetic media, and solid-state media, for example. Chipset 1660 may also read data from and write data to storage device 1675 (e.g., RAM). A bridge 1680 for interfacing with a variety of user interface components 1685 may be provided for interfacing with chipset 1660. Such user interface components 1685 may include a keyboard, a microphone, touch detection and processing circuitry, a pointing device, such as a mouse, and so on. In general, inputs to system 1650 may come from any of a variety of sources, machine generated and/or human generated.

Chipset 1660 may also interface with one or more communication interfaces 1690 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 1655 analyzing data stored in storage device 1670 or storage device 1675. Further, the machine may receive inputs from a user through user interface components 1685 and execute appropriate functions, such as browsing functions by interpreting these inputs using processor 1655.

It may be appreciated that example systems 1600 and 1650 may have more than one processor 1610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory (ROM)

devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:

receiving, by a computing system, video data and non-video data from a user device for generation of an avatar corresponding to a user of the user device, the video data comprising a video of the user of the user device, the non-video data comprising information associated with a desired appearance and behavior of the avatar;

generating, by the computing system, the avatar reflective of the appearance and the behavior of the user by inputting the video data and non-video data to a generative machine learning model trained to generate highly realistic avatars for users, wherein the avatar looks, behaves, sounds, and interacts like the user, wherein the video data is pre-processed to remove background information from the video data and isolate the user within the video data;

cloning, by the computing system, a voice of the user for use with the avatar, wherein the cloning comprises extracting audio data from the video data and generating a synthetic voice for the avatar using a model trained on voice characteristics of the user, wherein speech output of the avatar matches one or more of a tone, pace, inflection, or accent of the user;

storing, by the computing system, the avatar and the cloned voice of the user in a network accessible location;

deploying, by the computing system, the avatar in a third-party application for real-time or near real-time interaction with a second user, wherein responses of the avatar are generated using a large language model and are delivered with synchronized lip movements generated by a lip-sync module based on learned speech patterns of the user; and defining, by the computing system, one or more session-specific guardrails for the avatar while interacting in the third-party application, the one or more session-specific guardrails comprising domain-based, administrator-defined restrictions on avatar output, wherein the one or more session-specific guardrails limit the avatar to interfacing with one or more knowledge sources, the one or more knowledge sources comprising pre-approved, session-specific database or retrieval-augmented generation (RAG) sources.

2. The method of claim 1, wherein storing, by the computing system, the avatar and the cloned voice of the user in the network accessible location comprises:

storing the avatar and the cloned voice of the avatar on a blockchain, wherein the avatar is minted as a non-fungible token linked to a verified identity of the user.

3. The method of claim 1, wherein generating, by the computing system, the avatar reflective of the appearance and the behavior of the user comprises:

extracting one or more gestures of the user from the video data;

extracting one or more facial expressions of the user from the video data; and causing the avatar to replicate the one or more gestures and the one or more facial expressions during interaction with the avatar.

4. The method of claim 1, further comprising:

dynamically transitioning, by the computing system, the avatar between the user device, one or more of edge components, and cloud servers based on device capability.

5. The method of claim 1, wherein storing, by the computing system, the avatar and the cloned voice of the user in the network accessible location comprises:

applying one or more watermarks to the avatar, wherein the one or more watermarks are bound to an interaction session in which the avatar exists, the one or more watermarks providing authentication to the avatar.

6. A system comprising:

a non-transitory storage medium storing computer program instructions; and a processor configured to execute the computer program instructions to cause operations comprising:

receiving video data and non-video data from a user device for generation of an avatar corresponding to a user of the user device, the video data comprising a video of the user of the user device, the non-video data comprising information associated with a desired appearance and behavior of the avatar;

generating the avatar reflective of the appearance and the behavior of the user by inputting the video data and non-video data to a generative machine learning model trained to generate highly realistic avatars for users, wherein the avatar looks, behaves, sounds, and interacts like the user, wherein the video data is pre-processed to remove background information from the video data and isolate the user within the video data;

cloning a voice of the user for use with the avatar, wherein the cloning comprises extracting audio data from the video data and generating a synthetic voice for the avatar using a model trained on voice characteristics of the user, wherein speech output of the avatar matches one or more of a tone, pace, inflection, or accent of the user;

storing the avatar and the cloned voice of the user in a network accessible location;

deploying the avatar in a third-party application for real-time or near real-time interaction with a second user, wherein responses of the avatar are generated using a large language model and are delivered with synchronized lip movements generated by a lip-sync module based on learned speech patterns of the user; and defining one or more session-specific guardrails for the avatar while interacting in the third-party application, the one or more session-specific guardrails comprising domain-based, administrator-defined restrictions on avatar output, wherein the one or more session-specific guardrails limit the avatar to interfacing with one or more knowledge sources, the one or more knowledge sources comprising pre-approved, session-specific database or retrieval-augmented generation (RAG) sources.

7. The system of claim 6, wherein storing the avatar and the cloned voice of the user in the network accessible location comprises:

storing the avatar and the cloned voice of the avatar on a blockchain, wherein the avatar is minted as a non-fungible token linked to a verified identity of the user.

8. The system of claim 6, wherein generating the avatar reflective of the appearance and the behavior of the user comprises:

extracting one or more gestures of the user from the video data;

extracting one or more facial expressions of the user from the video data; and causing the avatar to replicate the one or more gestures and the one or more facial expressions during interaction with the avatar.

9. The system of claim 6, the operations further comprising:

dynamically transitioning, the avatar between the user device, one or more of edge components, and cloud servers based on device capability.

10. The system of claim 6, wherein storing the avatar and the cloned voice of the user in the network accessible location comprises:

applying one or more watermarks to the avatar, wherein the one or more watermarks are bound to an interaction session in which the avatar exists, the one or more watermarks providing authentication to the avatar.

11. A method, comprising:

receiving, by a computing system, video data and non-video data from a user device for generation of an avatar corresponding to a user of the user device, the video data comprising a video of the user of the user device, the non-video data comprising information associated with a desired appearance and behavior of the avatar;

generating, by the computing system, the avatar reflective of the appearance and the behavior of the user by inputting the video data and non-video data to a generative machine learning model trained to generate highly realistic avatars for users, wherein the avatar looks, behaves, sounds, and interacts like the user, wherein the video data is pre-processed to remove background information from the video data and isolate the user within the video data;

cloning, by the computing system, a voice of the user for use with the avatar, wherein the cloning comprises extracting audio data from the video data and generating a synthetic voice for the avatar using a model trained on voice characteristics of the user, wherein speech output of the avatar matches one or more of a tone, pace, inflection, or accent of the user;

storing, by the computing system, the avatar and the cloned voice of the user in a network accessible location;

deploying, by the computing system, the avatar in a third-party application for real-time or near real-time interaction with a second user, wherein responses of the avatar are generated using a large language model and are delivered with synchronized lip movements generated by a lip-sync module based on learned speech patterns of the user; and dynamically transitioning, by the computing system, the avatar between the user device, one or more of edge components, and cloud servers based on device capability.

12. The method of claim 11, further comprising:

defining, by the computing system, one or more session-specific guardrails for the avatar while interacting in the third-party application, the one or more session-specific guardrails comprising domain-based, administrator-defined restrictions on avatar output.

13. The method of claim 12, wherein the one or more session-specific guardrails limit the avatar to interfacing with one or more knowledge sources, the one or more knowledge sources comprising pre-approved, session-specific database or retrieval-augmented generation (RAG) sources.

14. The method of claim 11, wherein storing, by the computing system, the avatar and the cloned voice of the user in the network accessible location comprises:

storing the avatar and the cloned voice of the avatar on a blockchain, wherein the avatar is minted as a non-fungible token linked to a verified identity of the user.

15. The method of claim 11, wherein generating, by the computing system, the avatar reflective of the appearance and the behavior of the user comprises:

extracting one or more gestures of the user from the video data;

extracting one or more facial expressions of the user from the video data; and causing the avatar to replicate the one or more gestures and the one or more facial expressions during interaction with the avatar.

16. The method of claim 11, wherein storing, by the computing system, the avatar and the cloned voice of the user in the network accessible location comprises:

applying one or more watermarks to the avatar, wherein the one or more watermarks are bound to an interaction session in which the avatar exists, the one or more watermarks providing authentication to the avatar.

17. A system comprising:

a non-transitory storage medium storing computer program instructions; and a processor configured to execute the computer program instructions to cause operations comprising:

receiving video data and non-video data from a user device for generation of an avatar corresponding to a user of the user device, the video data comprising a video of the user of the user device, the non-video data comprising information associated with a desired appearance and behavior of the avatar;

generating the avatar reflective of the appearance and the behavior of the user by inputting the video data and non-video data to a generative machine learning model trained to generate highly realistic avatars for users, wherein the avatar looks, behaves, sounds, and interacts like the user, wherein the video data is pre-processed to remove background information from the video data and isolate the user within the video data;

cloning a voice of the user for use with the avatar, wherein the cloning comprises extracting audio data from the video data and generating a synthetic voice for the avatar using a model trained on voice characteristics of the user, wherein speech output of the avatar matches one or more of a tone, pace, inflection, or accent of the user;

storing the avatar and the cloned voice of the user in a network accessible location;

deploying the avatar in a third-party application for real-time or near real-time interaction with a second user, wherein responses of the avatar are generated using a large language model and are delivered with synchronized lip movements generated by a lip-sync module based on learned speech patterns of the user; and dynamically transitioning the avatar between the user device, one or more of edge components, and cloud servers based on device capability.

18. The system of claim 17, the operations further comprising:

defining one or more session-specific guardrails for the avatar while interacting in the third-party application, the one or more session-specific guardrails comprising domain-based, administrator-defined restrictions on avatar output.

19. The system of claim 18, wherein the one or more session-specific guardrails limit the avatar to interfacing with one or more knowledge sources, the one or more knowledge sources comprising pre-approved, session-specific database or retrieval-augmented generation (RAG) sources.

20. The system of claim 17, wherein storing the avatar and the cloned voice of the user in the network accessible location comprises:

storing the avatar and the cloned voice of the avatar on a blockchain, wherein the avatar is minted as a non-fungible token linked to a verified identity of the user.

21. The system of claim 17, wherein generating the avatar reflective of the appearance and the behavior of the user comprises:

extracting one or more gestures of the user from the video data;

extracting one or more facial expressions of the user from the video data; and causing the avatar to replicate the one or more gestures and the one or more facial expressions during interaction with the avatar.

22. The system of claim 17, wherein storing the avatar and the cloned voice of the user in the network accessible location comprises:

applying one or more watermarks to the avatar, wherein the one or more watermarks are bound to an interaction session in which the avatar exists, the one or more watermarks providing authentication to the avatar.

* * * * *